United States Patent
Chen et al.

(10) Patent No.: US 12,516,070 B2
(45) Date of Patent: Jan. 6, 2026

(54) FUSED RING DERIVATIVES AND USE THEREOF IN PHARMACY

(71) Applicant: CISEN PHARMACEUTICAL CO., LTD, Shandong (CN)

(72) Inventors: Shuhui Chen, Shanghai (CN); Jiajie Feng, Shanghai (CN); Wei Wei, Shanghai (CN); Peng Li, Shanghai (CN); Haiying He, Shanghai (CN); Jinxin Liu, Shanghai (CN); Jian Li, Shanghai (CN)

(73) Assignee: CISEN PHARMACEUTICAL CO., LTD, Shandong (CN)

( * ) Notice: Subject to any disclaimer, the term of this patent is extended or adjusted under 35 U.S.C. 154(b) by 546 days.

(21) Appl. No.: 17/926,285

(22) PCT Filed: May 18, 2021

(86) PCT No.: PCT/CN2021/094384
§ 371 (c)(1),
(2) Date: Nov. 18, 2022

(87) PCT Pub. No.: WO2021/233302
PCT Pub. Date: Nov. 25, 2021

(65) Prior Publication Data
US 2023/0212187 A1    Jul. 6, 2023

(30) Foreign Application Priority Data

| May 21, 2020 | (CN) | 202010435705.1 |
| Jul. 20, 2020 | (CN) | 202010699302.8 |
| Sep. 9, 2020 | (CN) | 202010941000.7 |
| Nov. 11, 2020 | (CN) | 202011257770.6 |
| Jan. 14, 2021 | (CN) | 202110059299.8 |

(51) Int. Cl.
C07D 498/14   (2006.01)
A61P 31/16   (2006.01)

(52) U.S. Cl.
CPC .......... *C07D 498/14* (2013.01); *A61P 31/16* (2018.01)

(58) Field of Classification Search
None
See application file for complete search history.

(56) References Cited

U.S. PATENT DOCUMENTS

| 2013/0197219 A1 | 8/2013 | Takahashi et al. |
| 2018/0118760 A1 | 5/2018 | Kawai et al. |
| 2021/0122751 A1 | 4/2021 | Taoda et al. |
| 2021/0155622 A1 | 5/2021 | Taoda |

FOREIGN PATENT DOCUMENTS

| WO | WO-2012039414 A1 | 3/2012 |
| WO | WO-2016175224 A1 | 11/2016 |
| WO | WO-2019230857 A1 | 12/2019 |
| WO | WO-2019230858 A1 | 12/2019 |
| WO | WO-2020075080 A1 | 4/2020 |

OTHER PUBLICATIONS

Feng. Journal of Medicinal Chemistry, 2024, 67, 2570-2583, published Feb. 1, 2024 (Year: 2024).*
Oct. 12, 2023 1st Chinese Office Action issued in Chinese Patent Application No. CN202180036796.4.
Oct. 12, 2023 Chinese Search Report issued in Chinese Patent Application No. CN202180036796.4.
Nov. 14, 2023 Japan Authorization Notice issued in Japanese Patent Application No. 2022-571342.
Jan. 18, 2024 2nd Chinese Office Action issued in Chinese Patent Application No. CN202180036796.4.
May 16, 2024 Extended European Search Report issued in European Patent Application No. 21809650.1.
Aug. 25, 2021 International Search Report issued in International Patent Application No. PCT/CN2021/094384.
Aug. 25, 2021 Written Opinion of the International Searching Authority issued in International Patent Application No. PCT/CN2021/094384.

* cited by examiner

*Primary Examiner* — Noble E Jarrell
(74) *Attorney, Agent, or Firm* — Harness, Dickey & Pierce, P.L.C.

(57) ABSTRACT

Disclosed are a kind of fused ring derivatives, and specifically disclosed are compounds as shown in formula (I) and pharmaceutically acceptable salts thereof.

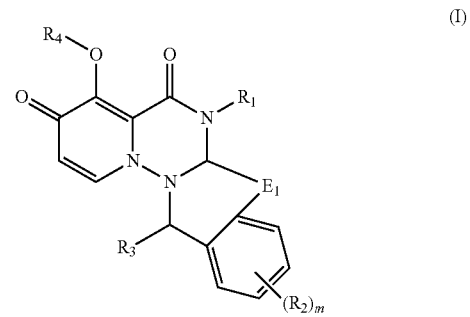

(I)

16 Claims, 4 Drawing Sheets

FUSED RING DERIVATIVES AND USE THEREOF IN PHARMACY

CROSS-REFERENCE TO RELATED APPLICATIONS

This application is a U.S. National Phase Application under 35 U.S.C. 371 of International Application No. PCT/CN2021/094384, filed on May 18, 2021, which claims the benefit of Chinese Patent Application No. 202010435705.1, filed on May 21, 2020, Chinese Patent Application No. 202010699302.8, filed on Jul. 20, 2020, Chinese Patent Application No. 202010941000.7, filed on Sep. 9, 2020, Chinese Patent Application No. 202011257770.6, filed on Nov. 11, 2020, and Chinese Patent Application No. 202110059299.8, filed on Jan. 14, 2021. The entire disclosures of the above applications are incorporated herein by reference.

The present application claims the following priorities
CN202010435705.1, application date: May 21, 2020;
CN202010699302.8, application date: Jul. 20, 2020;
CN202010941000.7, application date: Sep. 9, 2020;
CN202011257770.6, application date: Nov. 11, 2020;
CN202110059299.8, application date: Jan. 14, 2021.

TECHNICAL FIELD

The present disclosure relates to a class of fused ring derivatives, in particular to a compound represented by formula (I) and a pharmaceutically acceptable salt thereof.

BACKGROUND

Influenza virus (IFV) is a segmented single-stranded antisense RNA virus that can cause influenza in humans and animals. Influenza viruses can cause very high morbidity and mortality, especially influenza A viruses can also lead to global pandemics, such as the 1918-1920 "Spanish flu" (H1N1 subtype), 1957-1958 "Asian flu" (H2N2 subtype), 1968-1969 "Asian flu" (H3N2 subtype), 1977-1978 "Hong Kong flu" (H1N1 subtype), and influenza A (H1N1) that first broke out in Mexico in March 2009. The influenza outbreaks have killed thousands of people, leading to great social panic and increasing social instability.

Influenza A virus is a single negative-strand RNA virus with the genome containing 8 RNA segments encoding 11 kinds of proteins: hemagglutinin (HA), neuraminidase (NA), nucleoprotein (NP), M1, M2, NS1, NS2, PA, PB1, PB1-F2, and PB2. Influenza A viruses can be classified into several subtypes based on two proteins, hemagglutinin (HA) and neuraminidase (NA) on the surface of the virus. There are currently 18 known HA subtypes and 11 NA subtypes. Among them, hemagglutinin (HA) of influenza virus is responsible for recognizing the sialic acid glycoprotein of the host cell and mediating the fusion of the viral outer membrane with the intracellular vesicle membrane to release the viral nucleocapsid into the cytoplasm. Neuraminidase (NA) of influenza virus removes sialic acid from the surface of viral particles during replication so that viral particles cannot continue to accumulate on the surface of host cells, thus facilitating the release of virions and further infection of additional host cells.

The synthesis of influenza virus protein is based on host cell translation mechanisms, and even the virus can suspend the translation of host proteins and speed up the synthesis of its own protein. Viral mRNA needs to be capped at the 5' end of host mRNA to start translation in the process called "cap snatching", which is mainly completed by the viral RNA-dependent RNA polymerase (RdRp), whose PA subunit has RNA endonuclease activity, responsible for cleaving host mRNA. After the polyadenylation process and the capping process are completed, the viral mRNA is exported from the nucleus, enters the cytoplasm and is translated like the host cell mRNA. The nuclear export of viral vRNA fragments is mediated by the viral M1 protein and NS2 protein, in which M1 protein can interact with vRNA and NP protein while also interacting with the nuclear export protein NS2; thus, the nuclear export protein NS2 mediates the export of M1-RNP in the form of nuclear protein into the cytoplasm of the host cell.

Current influenza treatment options include vaccination and chemotherapy and chemoprophylaxis with antiviral drugs. High-risk groups, such as children and the elderly, or people with asthma, diabetes or heart disease, are often recommended to vaccinate against influenza. However, vaccination cannot completely protect against influenza, and some degree of antigenic drift of the influenza virus can occur. If more than one virus infects a single cell, eight separate vRNA segments in the genome mix or reassort, resulting in rapid changes in viral genetics that can produce an antigenic shift and allow the virus to infect a new host species and rapidly overcome protective immunity.

Antiviral drugs can be used to treat influenza, wherein neuraminidase (NA) inhibitors, such as oseltamivir (Tamiflu), are significantly effective for influenza A virus, but clinical observations have revealed that resistant strains of the virus have emerged for this type of neuraminidase inhibitors. In the field of anti-influenza virus, there is an urgent clinical need for anti-influenza viral drugs with novel mechanisms of action, which can support the use of single agents in the treatment of influenza A, or can be used for the prevention and treatment of influenza A by combining with other anti-influenza viral drugs already on the market with other mechanisms of action. Among them, WO2016175224 reports a compound as shown below and a prodrug thereof:

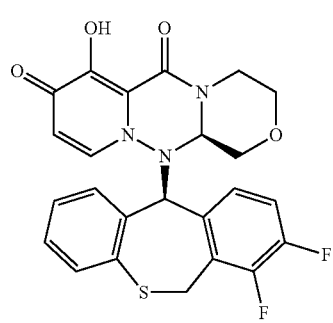

S-033447

CONTENT OF THE PRESENT INVENTION

The present disclosure provides a compound represented by formula (I) or a pharmaceutically acceptable salt thereof,

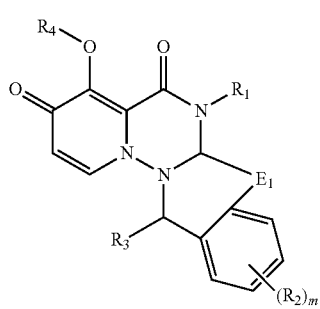

(I)

wherein,

R₁ is selected from H, $C_{1-3}$ alkyl, $C_{3-4}$ cycloalkyl and oxetanyl;

R₂ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

m is selected from 0, 1 and 2;

R₃ is selected from

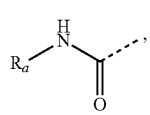

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;

$R_a$ is selected from phenyl and benzyl;

$R_b$ is each independently selected from H, halogen, hydroxyl, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

R₄ is selected from H,

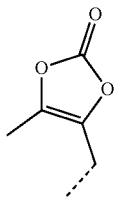

and —C(R_c)₂—O—C(=O)—O—R_d;

$R_c$ is each independently selected from hydrogen and $C_{1-3}$ alkyl;

$R_d$ is selected from hydrogen and $C_{1-3}$ alkyl, and the $C_{1-3}$ alkyl is optionally substituted by 1, 2 or 3 R;

R is each independently selected from halogen, $C_{1-3}$ alkylamino, hydroxyl and $C_{1-3}$ alkoxy;

E₁ is selected from —(CH₂)ₙ—, —(CH₂)ₙO— and —CH=CH—CH₂O—;

each n is selected from 1, 2 and 3;

the 5- to 6-membered heteroaryl contains 1, 2 or 3 heteroatoms or heteroatom groups independently selected from O, S, N and NH.

In some embodiments of the present disclosure, the R₁ is selected from H, methyl, isopropyl, cyclopropyl, cyclobutyl and

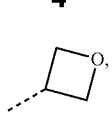

and other variables are as defined in the present disclosure.

In some embodiments of the present disclosure, the R₂ is selected from F, Cl, Br, methyl and methoxy, wherein the methyl and methoxy are optionally substituted by 1, 2 or 3 halogens, and other variables are as defined in the present disclosure.

In some embodiments of the present disclosure, the R₂ is selected from F, Cl and methyl, and other variables are as defined in the present disclosure.

In some embodiments of the present disclosure, the R₃ is selected from phenyl, wherein the phenyl is optionally substituted by 1, 2 or 3 $R_b$, and other variables are as defined in the present disclosure.

In some embodiments of the present disclosure, the R₃ is selected from

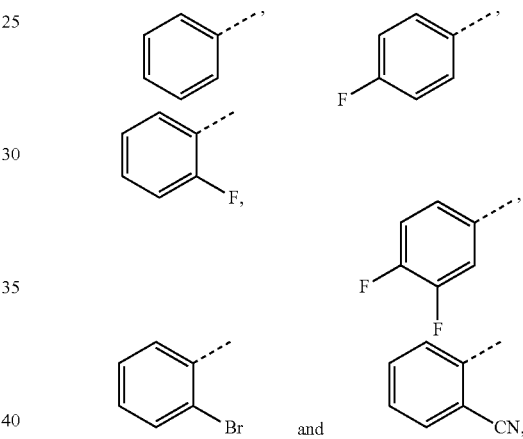

and other variables are as defined in the present disclosure.

In some embodiments of the present disclosure, the $R_c$ is selected from H, and other variables are as defined in the present disclosure.

In some embodiments of the present disclosure, the $R_d$ is selected from H, methyl, ethyl and isopropyl, and other variables are as defined in the present disclosure.

In some embodiments of the present disclosure, the R₄ is selected from H,

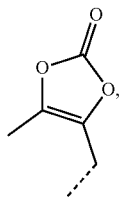

—CH₂—O—C(=O)—OH, —CH₂—O—C(=O)—OCH₃, —CH₂—O—C(=O)—OCH₂CH₃ and —CH₂—O—C(=O)—OCH(CH₃)₂, and other variables are as defined in the present disclosure.

In some embodiments of the present disclosure, the $E_1$ is selected from —$CH_2$—, —$(CH_2)_3$—, —$CH_2O$—, —$(CH_2)_2O$—, —$(CH_2)_3O$— and —CH=CH—$CH_2O$—, and other variables are as defined in the present disclosure.

The present disclosure provides a compound represented by formula (I) or a pharmaceutically acceptable salt thereof,

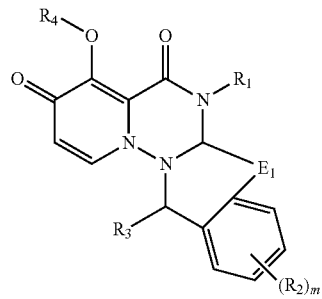

(I)

wherein,
$R_1$ is selected from H and $C_{1-3}$ alkyl;
$R_2$ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;
m is selected from 0, 1 and 2;
$R_3$ is selected from

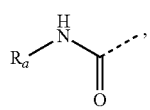

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;
$R_a$ is selected from phenyl and benzyl;
$R_b$ is each independently selected from halogen, hydroxyl, $C_{1-3}$ alkyl and $C_{1-3}$ alkoxy, and the $C_{1-3}$ alkyl and $C_{1-3}$ alkoxy are optionally substituted by 1, 2 or 3 halogens;
$R_4$ is selected from H and —$C(R_c)_2$—O—C(=O)—O—$R_d$;
$R_c$ is each independently selected from hydrogen and $C_{1-3}$ alkyl;
$R_d$ is selected from hydrogen and $C_{1-3}$ alkyl, and the $C_{1-3}$ alkyl is optionally substituted by 1, 2 or 3 R;
R is each independently selected from halogen, $C_{1-3}$ alkylamino, hydroxyl and $C_{1-3}$ alkoxy;
$E_1$ is selected from —$(CH_2)_n$— and —$(CH_2)_nO$—;
each n is selected from 1, 2 and 3;
the 5- to 6-membered heteroaryl contains 1, 2 or 3 heteroatoms or heteroatom groups independently selected from O, S and N.

In some embodiments of the present disclosure, the $R_1$ is selected from H and methyl, and other variables are as defined in the present disclosure.

In some embodiments of the present disclosure, the $R_2$ is selected from F, Cl, Br, methyl and methoxy, wherein the methyl and methoxy are optionally substituted by 1, 2 or 3 halogens, and other variables are as defined in the present disclosure.

In some embodiments of the present disclosure, the $R_2$ is selected from F, Cl and methyl, and other variables are as defined in the present disclosure.

In some embodiments of the present disclosure, the $R_3$ is selected from phenyl, wherein the phenyl is optionally substituted by 1, 2 or 3 $R_b$, and other variables are as defined in the present disclosure.

In some embodiments of the present disclosure, the $R_3$ is selected from phenyl, and other variables are as defined in the present disclosure.

In some embodiments of the present disclosure, the $R_c$ is selected from H, and other variables are as defined in the present disclosure.

In some embodiments of the present disclosure, the $R_d$ is selected from H, methyl and ethyl, and other variables are as defined in the present disclosure.

In some embodiments of the present disclosure, the $E_1$ is selected from —$CH_2$—, —$(CH_2)_3$—, —$CH_2O$— and —$(CH_2)_2O$—, and other variables are as defined in the present disclosure.

The present disclosure provides a compound represented by formula (I) or a pharmaceutically acceptable salt thereof,

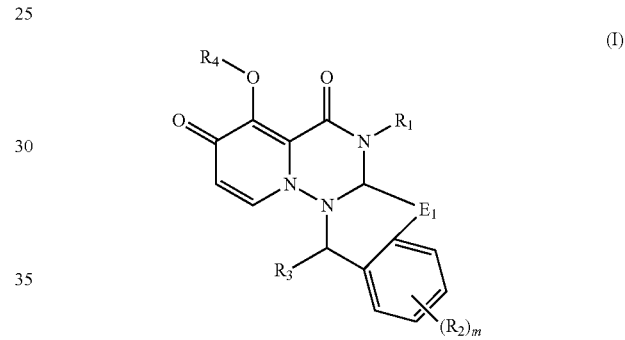

(I)

wherein,
$R_1$ is selected from H, $C_{1-3}$ alkyl, $C_{3-4}$ cycloalkyl and oxetanyl;
$R_2$ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;
m is selected from 0, 1 and 2;
$R_3$ is selected from

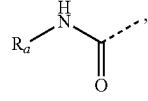

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;
$R_a$ is selected from phenyl and benzyl;
$R_b$ is each independently selected from halogen, hydroxyl, $C_{1-3}$ alkyl and $C_{1-3}$ alkoxy, and the $C_{1-3}$ alkyl and $C_{1-3}$ alkoxy are optionally substituted by 1, 2 or 3 halogens;
$R_4$ is selected from H and —$C(R_c)_2$—O—C(=O)—O—$R_d$;
$R_c$ is each independently selected from hydrogen and $C_{1-3}$ alkyl;

$R_d$ is selected from hydrogen and $C_{1-3}$ alkyl, and the $C_{1-3}$ alkyl is optionally substituted by 1, 2 or 3 R;

R is each independently selected from halogen, $C_{1-3}$ alkylamino, hydroxyl and $C_{1-3}$ alkoxy;

$E_1$ is selected from —(CH$_2$)$_n$— and —(CH$_2$)$_n$O—;

each n is selected from 1, 2 and 3;

the 5- to 6-membered heteroaryl contains 1, 2 or 3 heteroatoms or heteroatom groups independently selected from O, S and N.

In some embodiments of the present disclosure, the $R_1$ is selected from H, methyl, cyclopropyl, cyclobutyl and

and other variables are as defined in the present disclosure.

In some embodiments of the present disclosure, the $R_4$ is selected from H, —CH$_2$—O—C(=O)—OH, —CH$_2$—O—C(=O)—OCH$_3$ and —CH$_2$—O—C(=O)—OCH$_2$CH$_3$, and other variables are as defined in the present disclosure.

The present disclosure provides a compound represented by formula (I) or a pharmaceutically acceptable salt thereof,

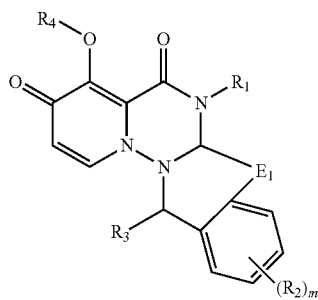

$R_1$ is selected from H, $C_{1-3}$ alkyl, $C_{3-4}$ cycloalkyl and oxetanyl;

$R_2$ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

m is selected from 0, 1 and 2;

$R_3$ is selected from

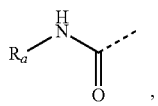

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;

$R_a$ is selected from phenyl and benzyl;

$R_b$ is each independently selected from halogen, hydroxyl, $C_{1-3}$ alkyl and $C_{1-3}$ alkoxy, and the $C_{1-3}$ alkyl and $C_{1-3}$ alkoxy are optionally substituted by 1, 2 or 3 halogens;

$R_4$ is selected from H and —C(R$_c$)$_2$—O—C(=O)—O—R$_d$;

$R_c$ is each independently selected from hydrogen and $C_{1-3}$ alkyl;

$R_d$ is selected from hydrogen, $C_{1-3}$ alkyl and —(CH$_2$CH$_2$O)$_2$CH$_3$, and the $C_{1-3}$ alkyl is optionally substituted by 1, 2 or 3 R;

R is each independently selected from halogen, $C_{1-3}$ alkylamino, hydroxyl and $C_{1-3}$ alkoxy;

$E_1$ is selected from —(CH$_2$)$_n$—, —(CH$_2$)$_n$O— and —CH=CH—CH$_2$O—;

each n is selected from 1, 2 and 3;

the 5- to 6-membered heteroaryl contains 1, 2 or 3 heteroatoms or heteroatom groups independently selected from O, S and N.

In some embodiments of the present disclosure, the $R_1$ is selected from H, methyl, isopropyl, cyclopropyl, cyclobutyl and

and other variables are as defined in the present disclosure.

In some embodiments of the present disclosure, the $R_d$ is selected from H, methyl, ethyl, isopropyl and —(CH$_2$CH$_2$O)$_2$CH$_3$, and other variables are as defined in the present disclosure.

In some embodiments of the present disclosure, the $R_4$ is selected from H, —CH$_2$—O—C(=O)—OH, —CH$_2$—O—C(=O)—OCH$_3$, —CH$_2$—O—C(=O)—OCH$_2$CH$_3$, —CH$_2$—O—C(=O)—OCH(CH$_3$)$_2$ and —CH$_2$—O—C(=O)—O(CH$_2$CH$_2$O)$_2$CH$_3$, and other variables are as defined in the present disclosure.

In some embodiments of the present disclosure, the $E_1$ is selected from —CH$_2$—, —(CH$_2$)$_3$—, —CH$_2$O—, —(CH$_2$)$_2$O—, —(CH$_2$)$_3$O— and —CH=CH—CH$_2$O—, and other variables are as defined in the present disclosure.

In some embodiments of the present disclosure, the $R_2$ is selected from F, Cl and methyl, and other variables are as defined in the present disclosure.

In some embodiments of the present disclosure, the $R_3$ is selected from phenyl, wherein the phenyl is optionally substituted by 1, 2 or 3 $R_b$, and other variables are as defined in the present disclosure.

In some embodiments of the present disclosure, the $R_3$ is selected from phenyl and p-fluorophenyl, and other variables are as defined in the present disclosure.

The present disclosure provides a compound represented by formula (I) or a pharmaceutically acceptable salt thereof,

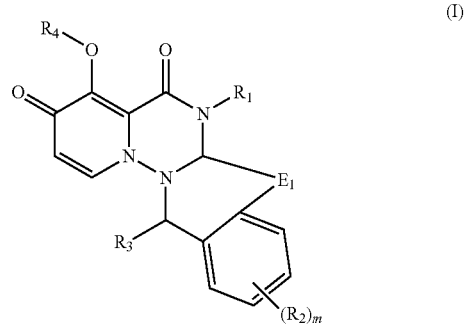

wherein, $R_1$ is selected from H, $C_{1-3}$ alkyl, $C_{3-4}$ cycloalkyl and oxetanyl;

$R_2$ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

m is selected from 0, 1 and 2;

$R_3$ is selected from

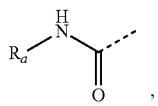

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;

$R_a$ is selected from phenyl and benzyl;

$R_b$ is each independently selected from halogen, hydroxyl, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

$R_4$ is selected from H and —C($R_c$)$_2$—O—C(=O)—O—$R_d$;

$R_c$ is each independently selected from hydrogen and $C_{1-3}$ alkyl;

$R_d$ is selected from hydrogen and $C_{1-3}$ alkyl, and the $C_{1-3}$ alkyl is optionally substituted by 1, 2 or 3 R;

R is each independently selected from halogen, $C_{1-3}$ alkylamino, hydroxyl and $C_{1-3}$ alkoxy;

$E_1$ is selected from —(CH$_2$)$_n$—, —(CH$_2$)$_n$O— and —CH=CH—CH$_2$O—;

each n is selected from 1, 2 and 3;

the 5- to 6-membered heteroaryl contains 1, 2 or 3 heteroatoms or heteroatom groups independently selected from O, S, N and NH.

In some embodiments of the present disclosure, the $R_1$ is selected from H, methyl, isopropyl, cyclopropyl, cyclobutyl and

and other variables are as defined in the present disclosure.

In some embodiments of the present disclosure, the $R_2$ is selected from F, Cl, Br, methyl and methoxy, wherein the methyl and methoxy are optionally substituted by 1, 2 or 3 halogens, and other variables are as defined in the present disclosure.

In some embodiments of the present disclosure, the $R_2$ is selected from F, Cl and methyl, and other variables are as defined in the present disclosure.

In some embodiments of the present disclosure, the $R_3$ is selected from phenyl, wherein the phenyl is optionally substituted by 1, 2 or 3 $R_b$, and other variables are as defined in the present disclosure.

In some embodiments of the present disclosure, the $R_3$ is selected from

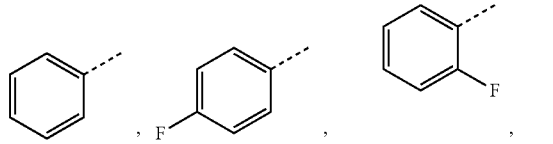

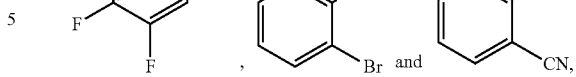

and other variables are as defined in the present disclosure.

In some embodiments of the present disclosure, the $R_c$ is selected from H, and other variables are as defined in the present disclosure.

In some embodiments of the present disclosure, the $R_d$ is selected from H, methyl, ethyl, and isopropyl, and other variables are as defined in the present disclosure.

In some embodiments of the present disclosure, the $R_4$ is selected from H, —CH$_2$—O—C(=O)—OH, —CH$_2$—O—C(=O)—OCH$_3$, —CH$_2$—O—C(=O)—OCH$_2$CH$_3$ and —CH$_2$—O—C(=O)—OCH(CH$_3$)$_2$, and other variables are as defined in the present disclosure.

In some embodiments of the present disclosure, the $E_1$ is selected from —CH$_2$—, —(CH$_2$)$_3$—, —CH$_2$O—, —(CH$_2$)$_2$O—, —(CH$_2$)$_3$O— and —CH=CH—CH$_2$O—, and other variables are as defined in the present disclosure.

There are also some embodiments of the present disclosure which are any combination of the above variables.

The present disclosure also provides compounds represented by formulas (V-1), (V-2), (V-3) and (VI-1) or pharmaceutically acceptable salts thereof,

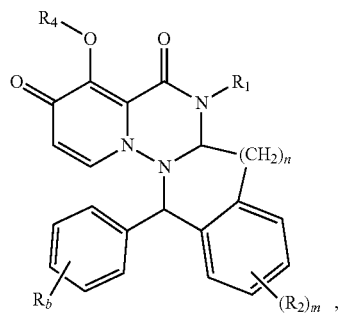

(V-1)

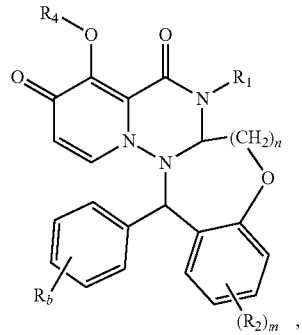

(V-2)

-continued
(V-3)
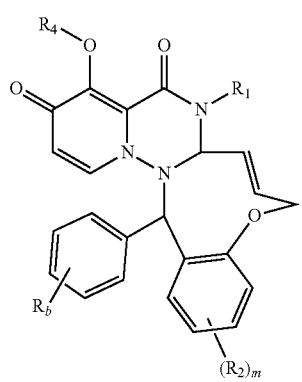
(VI-1)
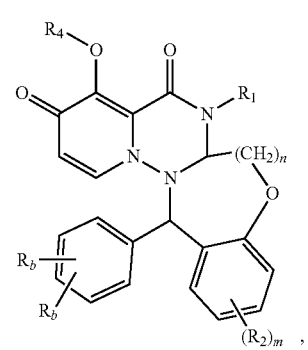
wherein, $R_1$, $R_2$, $R_4$, $R_b$, m and n are as defined in the present disclosure.
The present disclosure also provides the following compounds or pharmaceutically acceptable salts thereof, which are selected from:
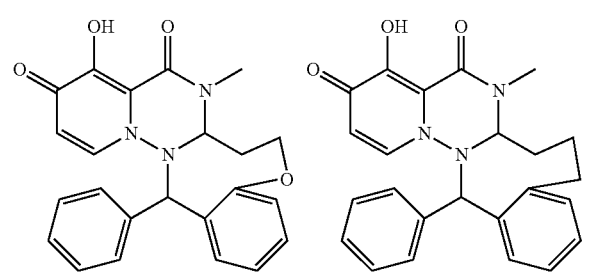
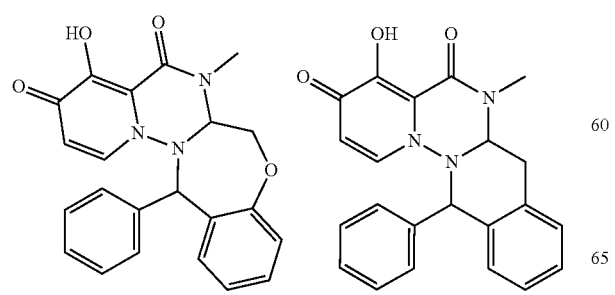
-continued
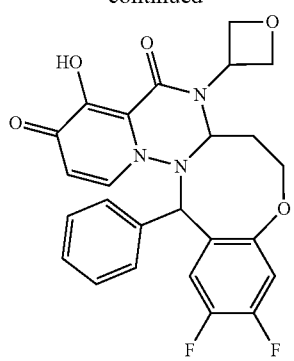
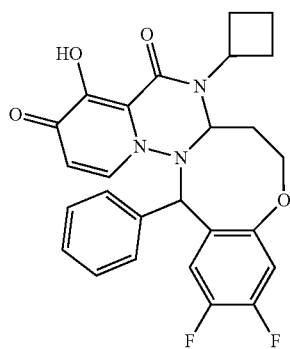
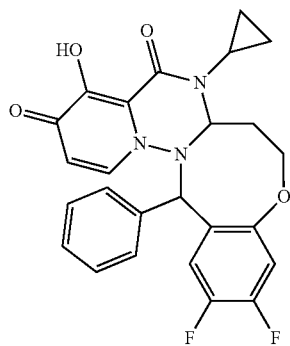
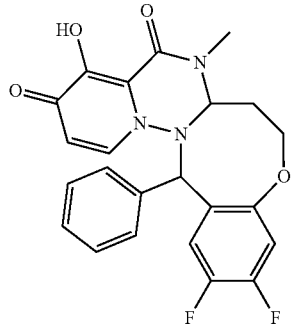
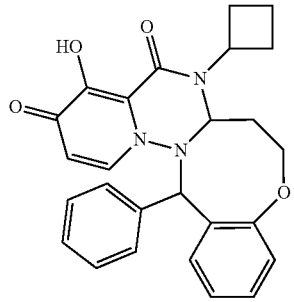

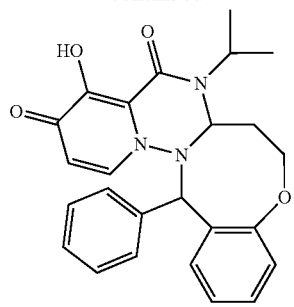
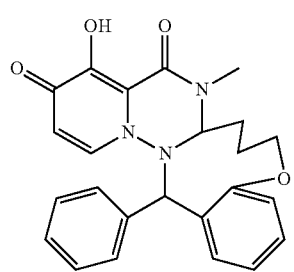
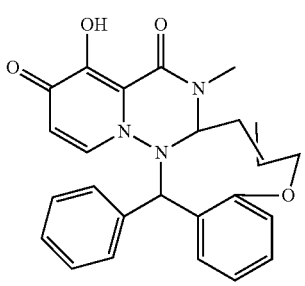
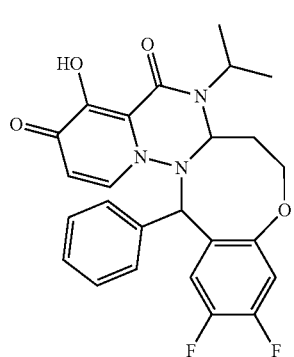
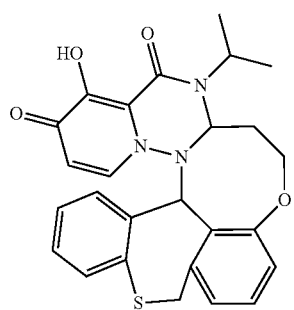
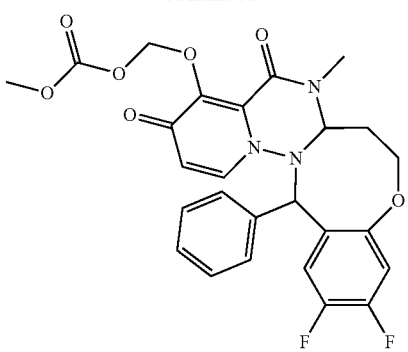
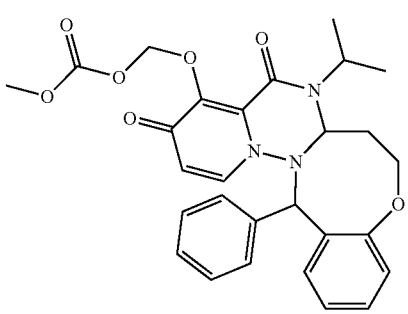
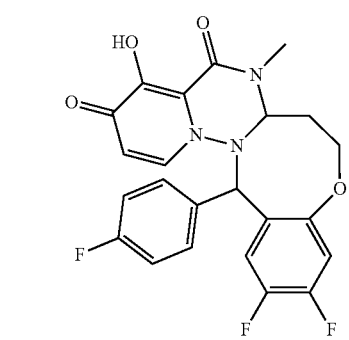
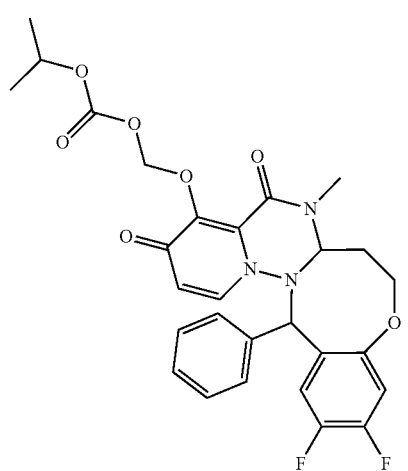

-continued
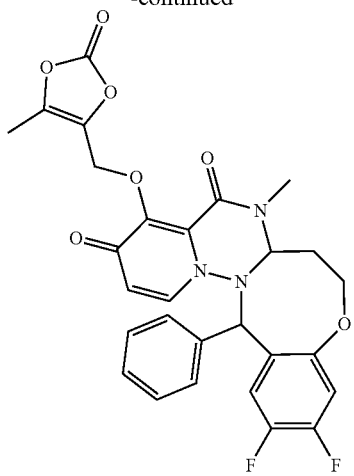
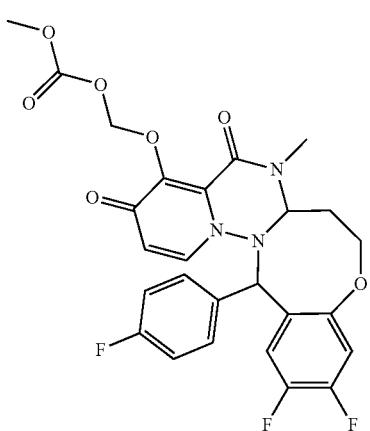
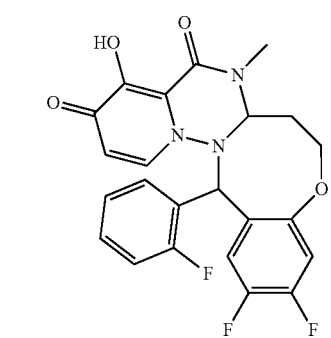
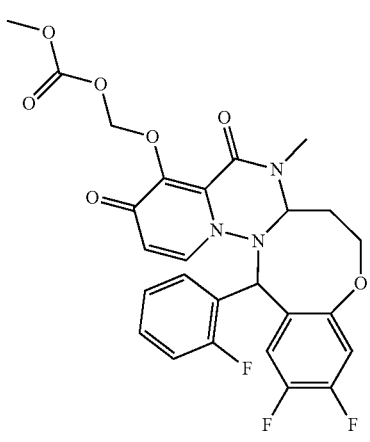
-continued
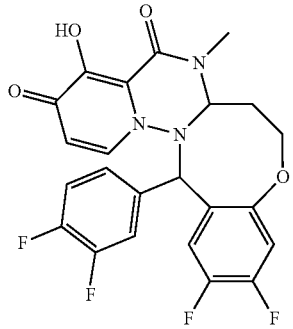
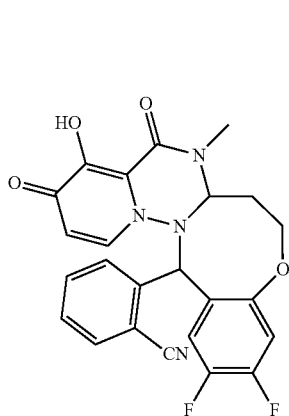
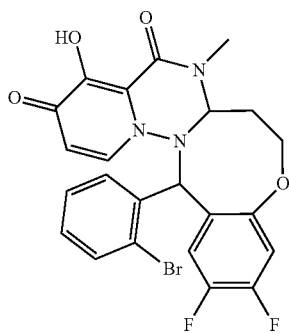
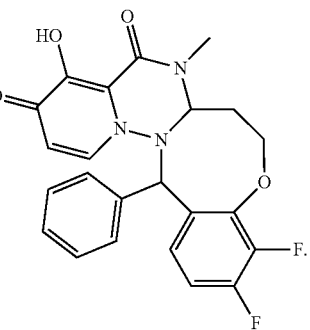
The present disclosure also provides the compounds or pharmaceutically acceptable salts thereof, which are selected from:

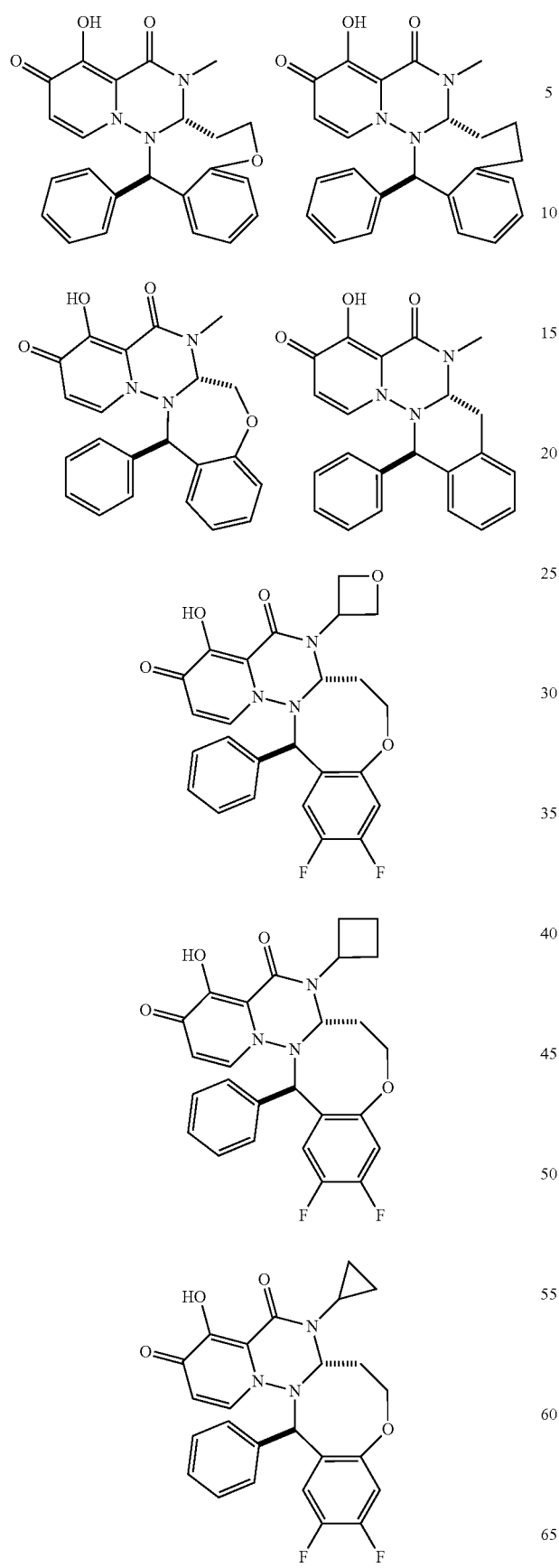
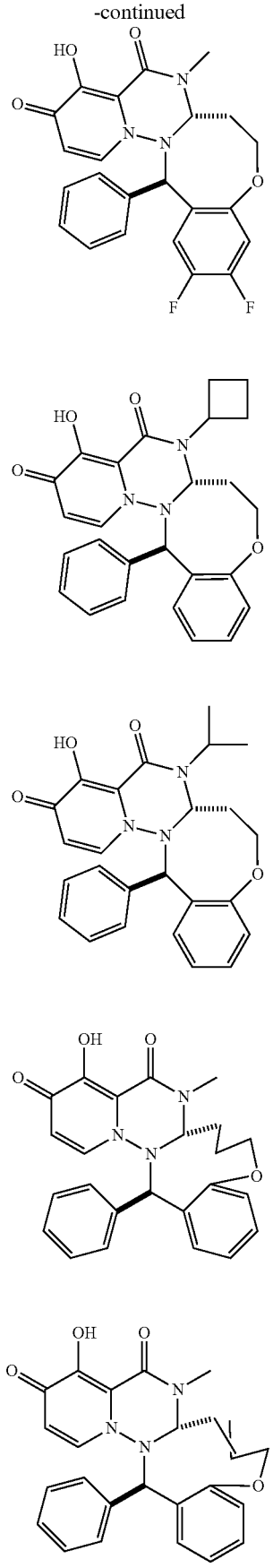

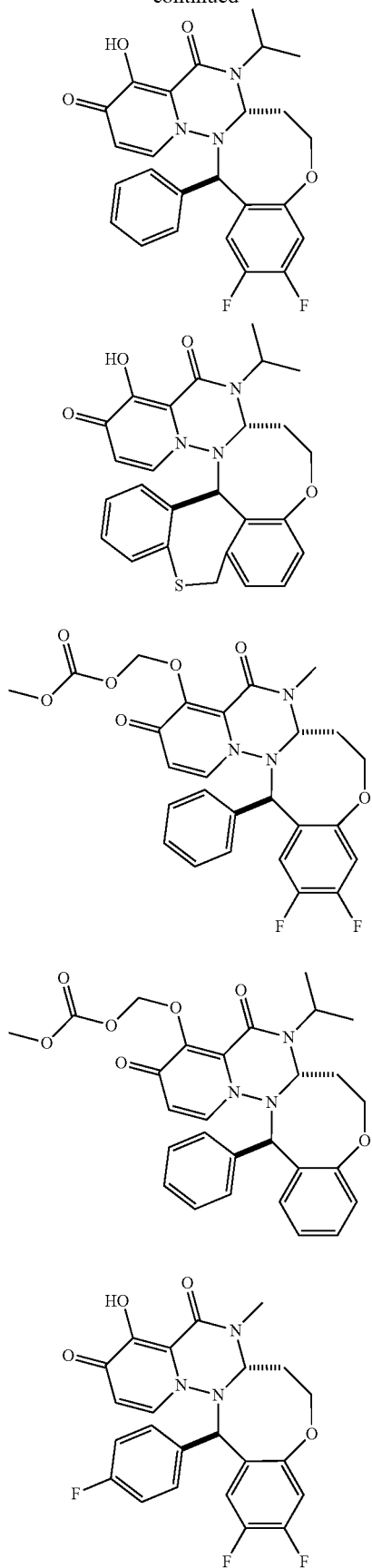
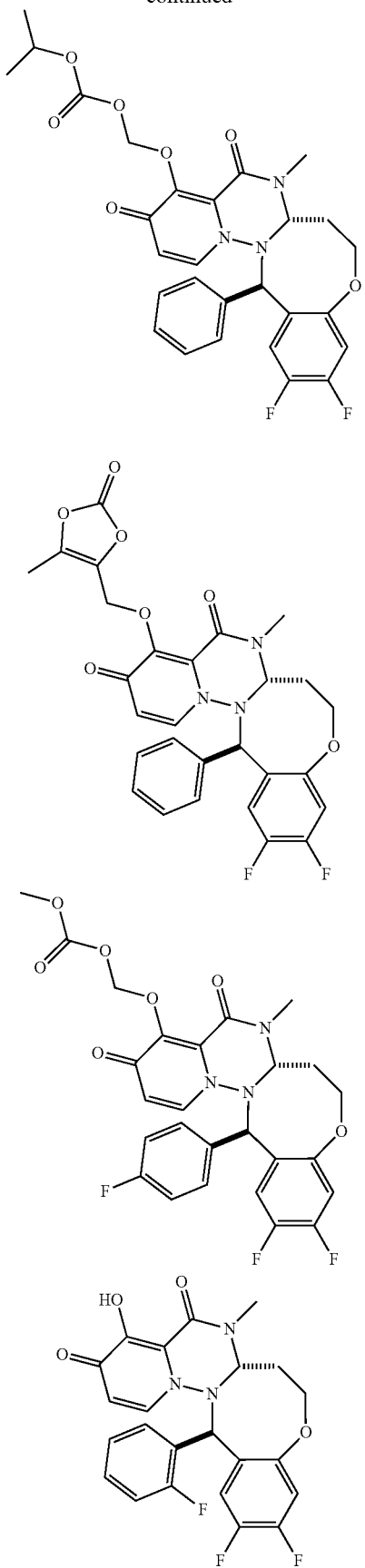

-continued
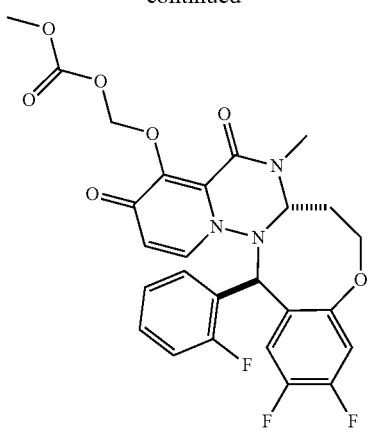
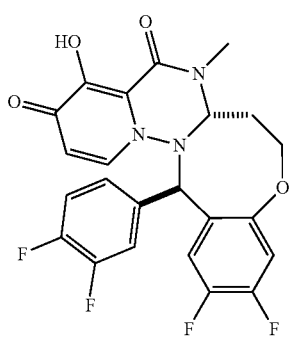
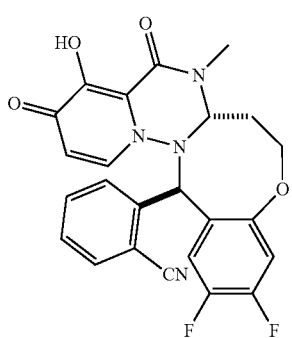
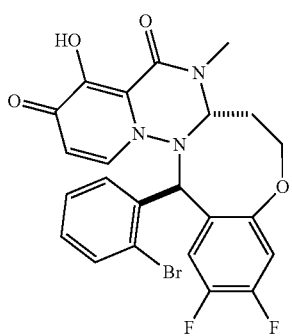
-continued
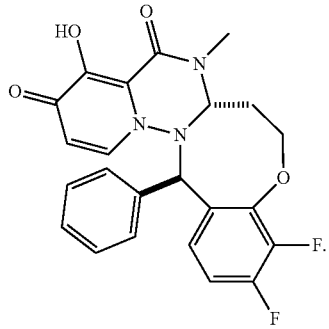
The present disclosure also provides the compounds or pharmaceutically acceptable salts thereof, which are selected from:
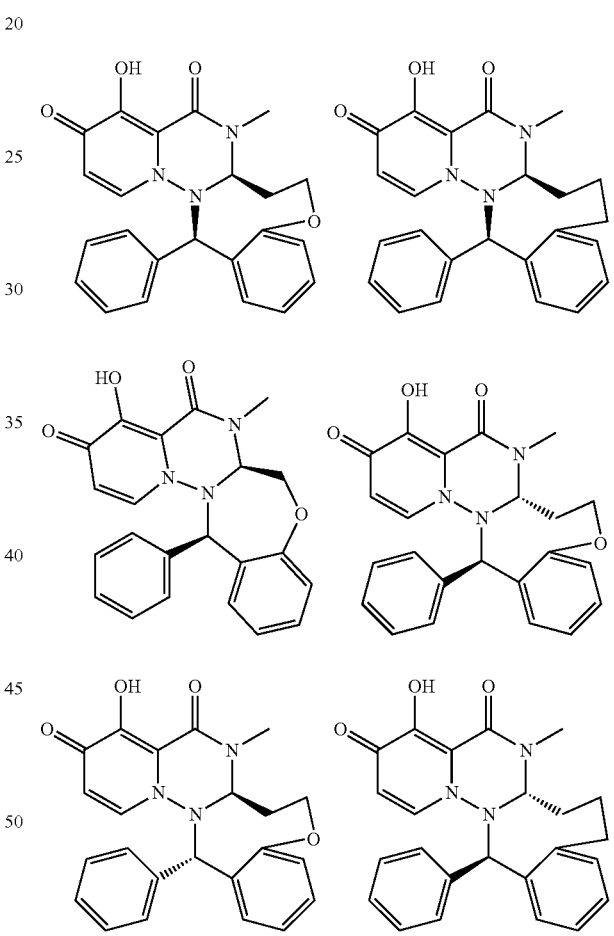

-continued
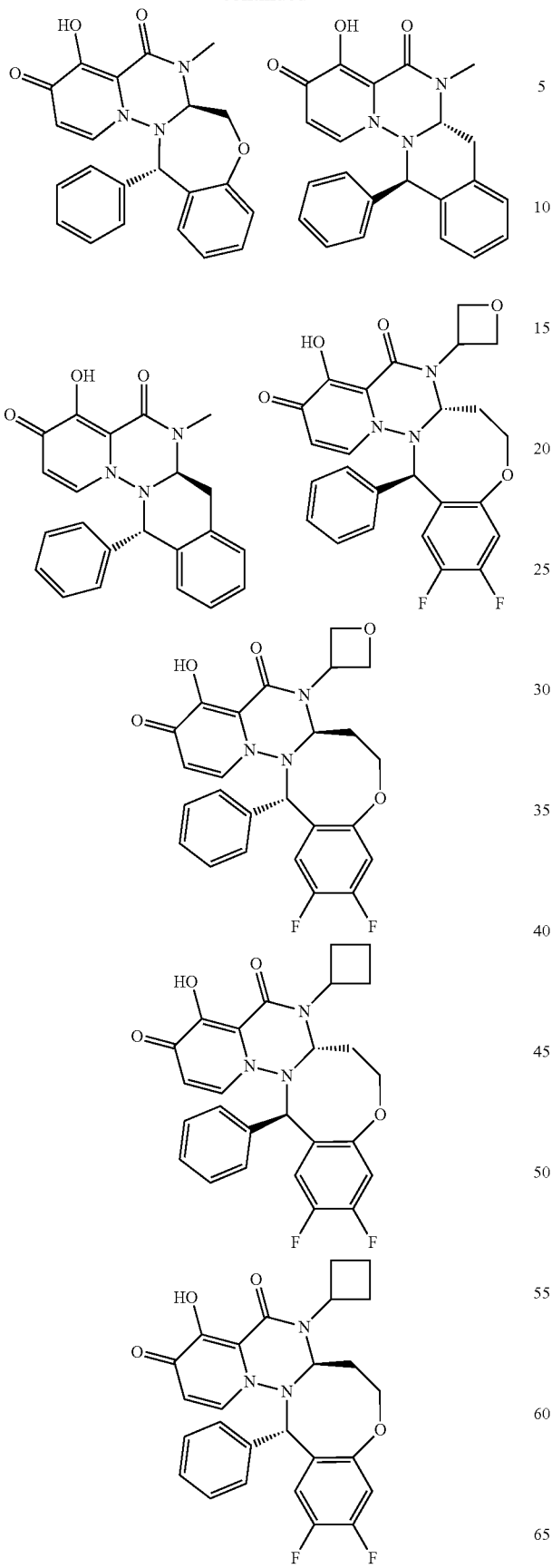
-continued
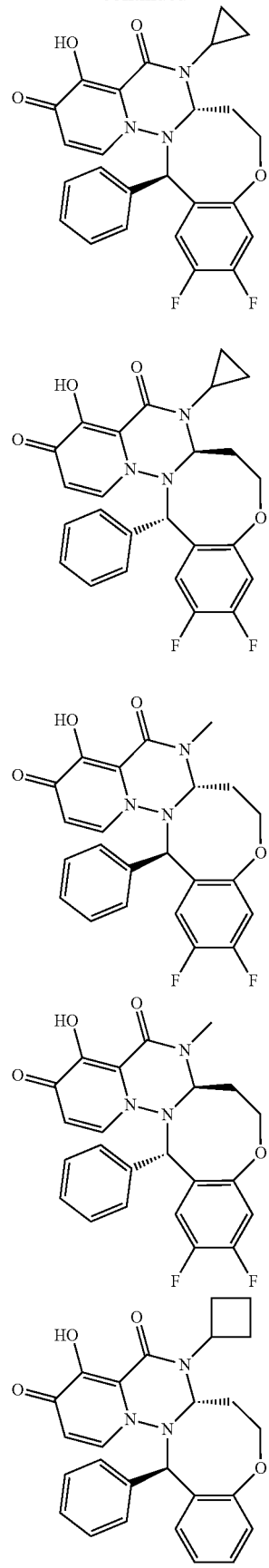

25
-continued
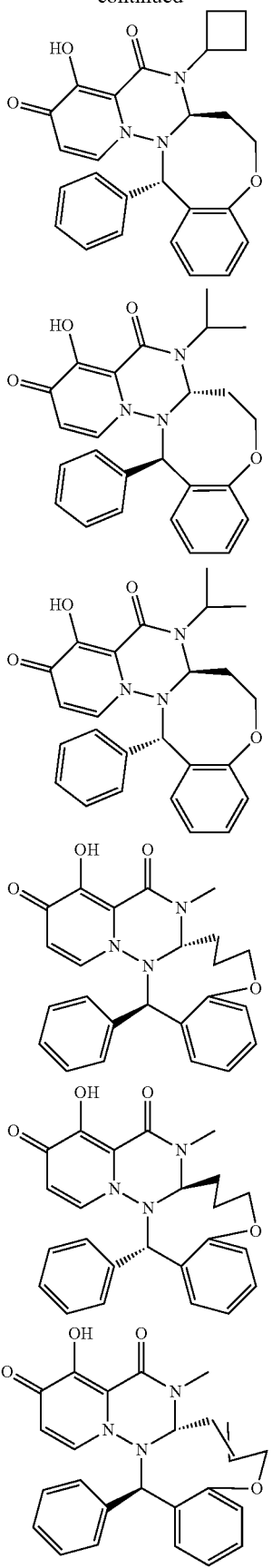
26
-continued
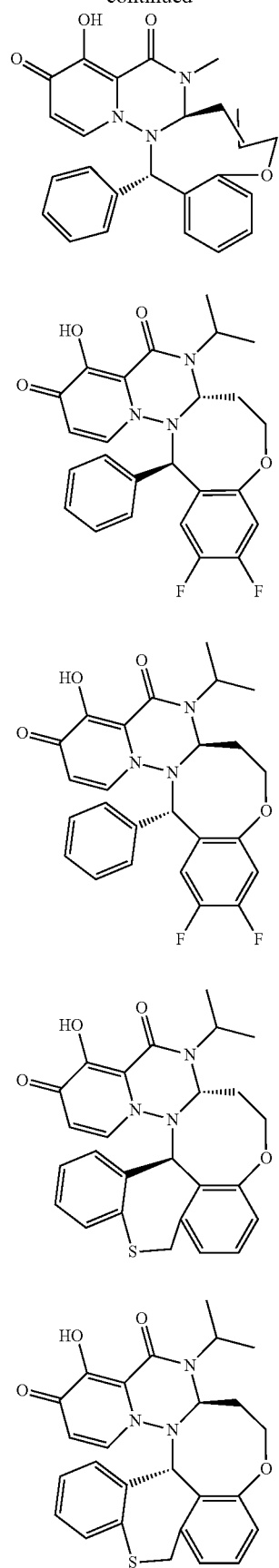

27
-continued
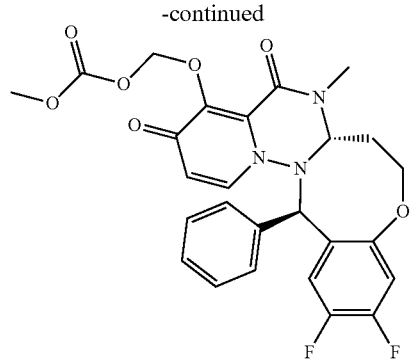
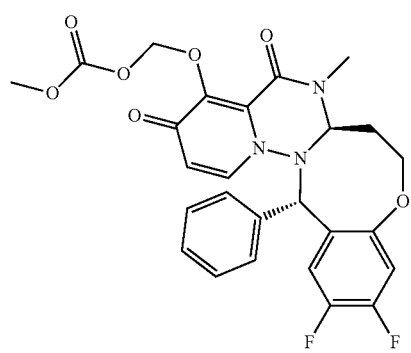
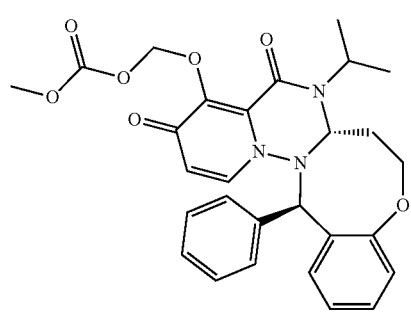
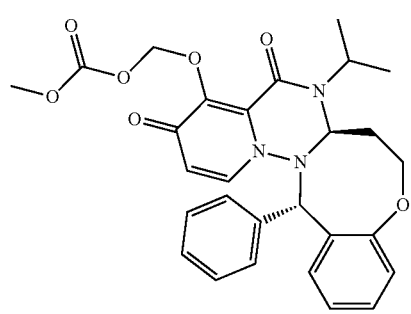
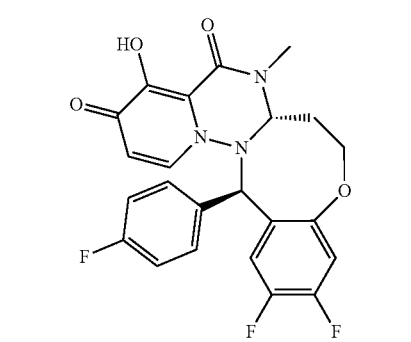
28
-continued
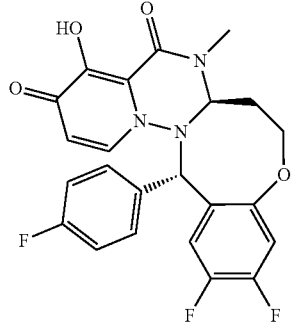
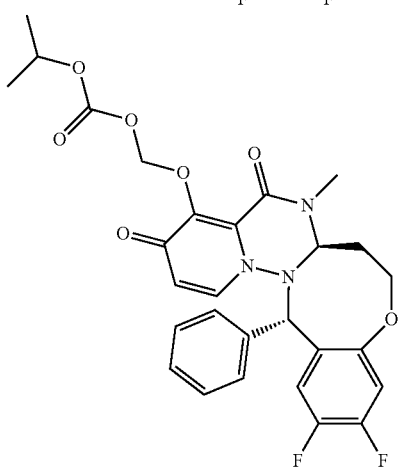
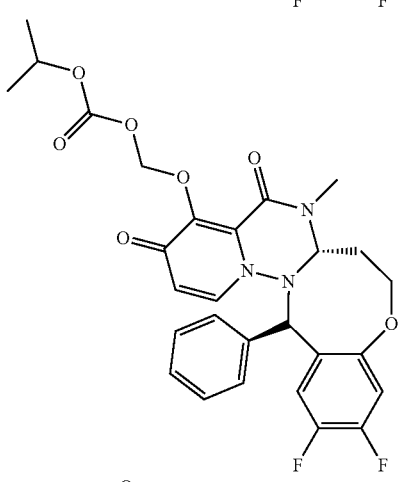
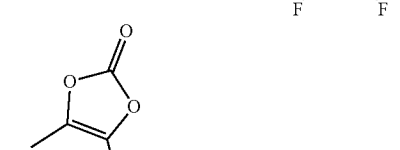
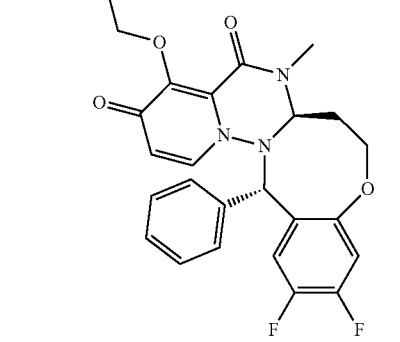

-continued
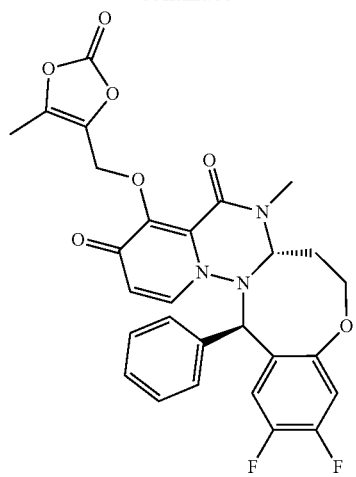
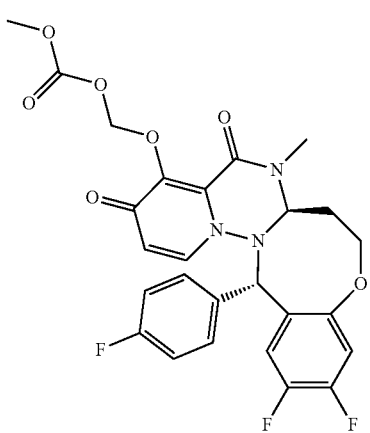
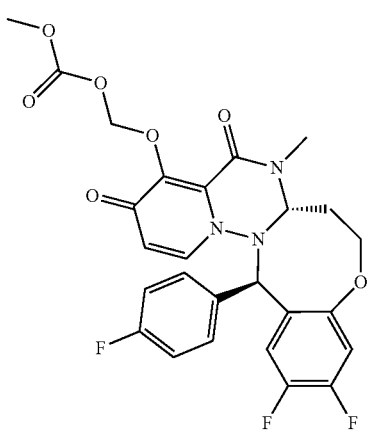
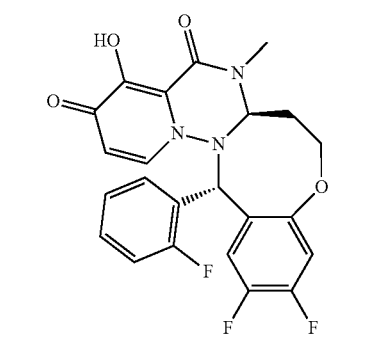
-continued
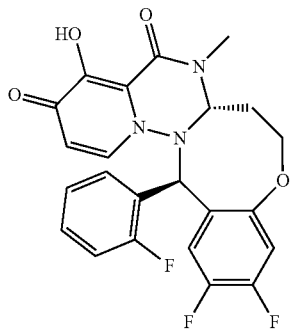
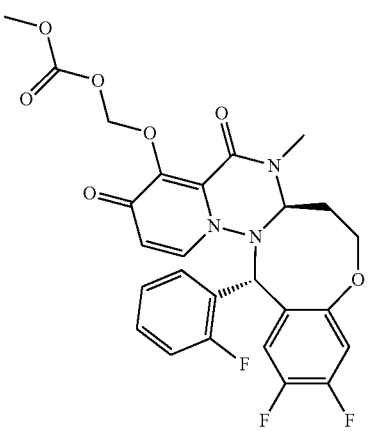
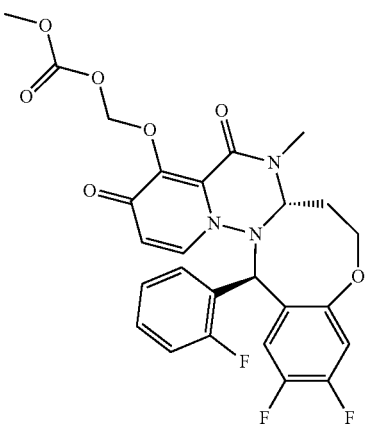
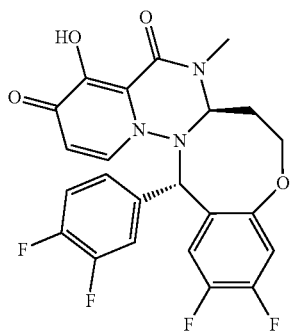

31
-continued

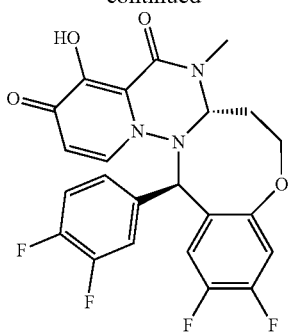

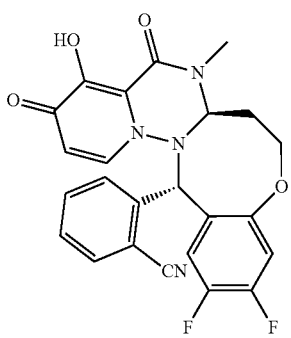

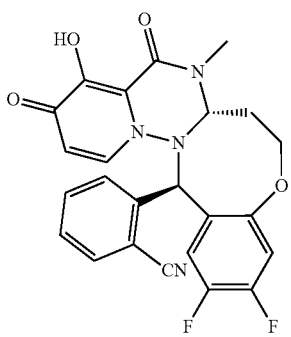

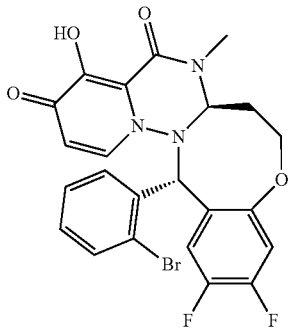

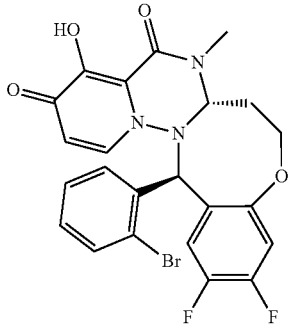

32
-continued

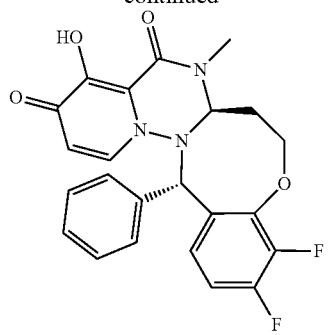

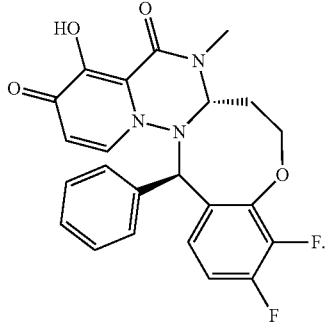

The present disclosure also provides a use of the compound or the pharmaceutically acceptable salt thereof in the manufacture of a medicament for the treatment of diseases related to an influenza virus RNA endonuclease inhibitor.

The present disclosure also provides the use, characterized in that the medicament related to the RNA endonuclease inhibitor is a medicament for anti-influenza virus.

The present disclosure also provides the following synthetic routes:

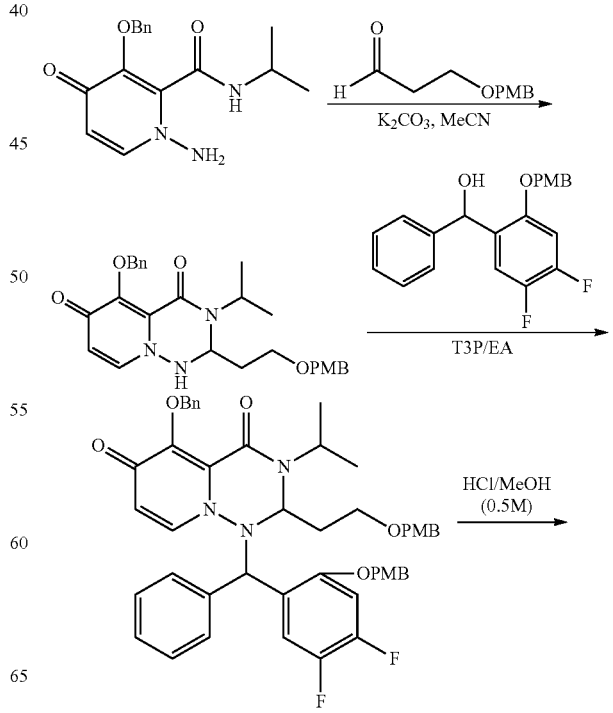

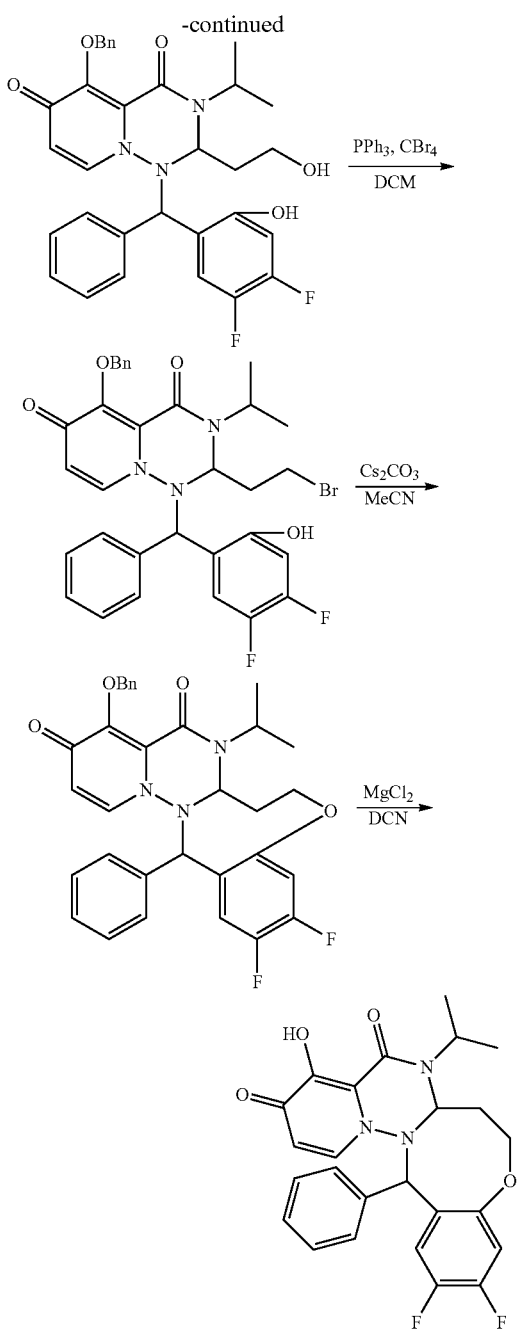

Definition and Description

Unless otherwise specified, the following terms and phrases when used herein have the following meanings. A specific term or phrase should not be considered indefinite or unclear in the absence of a particular definition, but should be understood in the ordinary sense. When a trading name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing the compound into contact with a sufficient amount of base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by bringing the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method.

Generally, such salt can be prepared by reacting the free acid or base form of the compound with a stoichiometric amount of an appropriate base or acid in water or an organic solvent or a mixture thereof.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl and the like; it can be monovalent (such as methyl), divalent (such as methylene) or multivalent (such as methine). Examples of $C_{1-3}$ alkyl include, but are not limited to, methyl (Me), ethyl (Et), propyl (including n-propyl and isopropyl) and the like.

Unless otherwise specified, the term "$C_{1-3}$ alkoxy" refers to an alkyl containing 1 to 3 carbon atoms that are connected to the rest of the molecule through an oxygen atom. The $C_{1-3}$ alkoxy includes $C_{1-2}$, $C_{2-3}$, $C_3$ and $C_2$ alkoxy and the like. Examples of $C_{1-3}$ alkoxy include, but are not limited to, methoxy, ethoxy, propoxy (including n-propoxy and isopropoxy) and the like.

Unless otherwise specified, "$C_{3-6}$ cycloalkyl" refers to a saturated cyclic hydrocarbon group consisting of 3 to 6 carbon atoms, which is a monocyclic and bicyclic ring system, and the $C_{3-6}$ cycloalkyl includes $C_{3-5}$, $C_{4-5}$ and $C_{5-6}$ cycloalkyl and the like; it can be monovalent, divalent or multivalent. Examples of $C_{3-6}$ cycloalkyl include, but are not limited to, cyclopropyl, cyclobutyl, cyclopentyl, cyclohexyl and the like.

Unless otherwise specified, "$C_{3-4}$ cycloalkyl" refers to a saturated cyclic hydrocarbon group consisting of 3 to 4 carbon atoms, which is a monocyclic ring system, and it can be monovalent, divalent or multivalent. Examples of $C_{3-4}$ cycloalkyl include, but are not limited to, cyclopropyl, cyclobutyl and the like.

Unless otherwise specified, the terms "5- to 6-membered heteroaryl ring" and "5- to 6-membered heteroaryl" in the present disclosure can be used interchangeably, and the term "5- to 6-membered heteroaryl" refers to a monocyclic group consisting of 5 to 6 ring atoms with a conjugated π-electron system, wherein 1, 2, 3 or 4 ring atoms are heteroatoms independently selected from O, S and N, and the rest are carbon atoms. Where nitrogen atoms are optionally quaternized, and nitrogen and sulfur heteroatoms can be optionally oxidized (i.e., NO and $S(O)_p$, p is 1 or 2). The 5- to 6-membered heteroaryl can be connected to the rest of the molecule through a heteroatom or a carbon atom. The 5- to 6-membered heteroaryl includes 5-membered and 6-membered heteroaryl. Examples of the 5- to 6-membered heteroaryl include, but are not limited to, pyrrolyl (including N-pyrrolyl, 2-pyrrolyl, 3-pyrrolyl and the like), pyrazolyl (including 2-pyrazolyl, 3-pyrazolyl and the like), imidazolyl (including N-imidazolyl, 2-imidazolyl, 4-imidazolyl, 5-imidazolyl and the like), oxazolyl (including 2-oxazolyl, 4-oxazolyl, 5-oxazolyl and the like), triazolyl (1H-1,2,3-triazolyl, 2H-1,2,3-triazolyl, 1H-1,2,4-triazolyl, 4H-1,2,4-triazolyl and the like), tetrazolyl, isoxazolyl (3-isoxazolyl, 4-isoxazolyl, 5-isoxazolyl and the like), thiazolyl (including 2-thiazolyl, 4-thiazolyl, 5-thiazolyl and the like), furyl (including 2-furyl, 3-furyl and the like), thienyl (including 2-thienyl, 3-thienyl and the like), pyridyl (including 2-pyridyl, 3-pyridyl, 4-pyridyl and the like), pyrazinyl or pyrimidyl (including 2-pyrimidyl, 4-pyrimidyl and the like).

Unless otherwise specified, the term "halo" or "halogen" by itself or as part of another substituent refers to fluorine, chlorine, bromine or iodine atom.

Unless otherwise specified, the term "isomer" is intended to include geometric isomers, cis-trans isomers, stereoisomers, enantiomers, optical isomers, diastereomers and tautomers.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereomers, (D)-isomers, (L)-isomers, and racemic and other mixtures thereof, such as enantiomers or diastereomers enriched mixtures, all of which are within the scope of the present disclosure. Additional asymmetric carbon atoms may be present in substituents such as alkyl. All these isomers and their mixtures are included within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and "(±)" refers to racemic.

Unless otherwise specified, the absolute configuration of a stereogenic center is represented by a wedged solid bond (✦) and a wedged dashed bond (✦), and the relative configuration of a stereogenic center is represented by a straight solid bond (✦) and a straight dashed bond (✦), a wavy line (✦) is used to represent a wedged solid bond (✦) or a wedged dashed bond (✦), or the wavy line (✦) is used to represent a straight solid bond (✦) or a straight dashed bond (✦).

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomeric excess (ee value) is 80%.

Optically active (R)- and (S)-isomers, or D and L isomers can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomer which is then subjected to diastereomeric resolution through the conventional method in the art to obtain the pure enantiomer. In addition, the enantiomer and the diastereomer are generally isolated through chromatography which uses a chiral stationary phase and optionally combines with a chemical derivative method (such as carbamate generated from amine).

The compound of the present disclosure may contain an unnatural proportion of atomic isotope at one or more than one atom(s) that constitute the compound. For example, the compound can be radiolabelled with a radioactive isotope, such as tritium (3H), iodine-125 ($^{125}I$) or C-14 ($^{14}C$). For another example, deuterated drugs can be formed by replacing hydrogen with heavy hydrogen, the bond formed by deuterium and carbon is stronger than that of ordinary hydrogen and carbon, compared with non-deuterated drugs, deuterated drugs have the advantages of reduced toxic and side effects, increased drug stability, enhanced efficacy, extended biological half-life of drugs and the like. All isotopic variations of the compound of the present disclosure, whether radioactive or not, are encompassed within the scope of the present disclosure.

The term "optional" or "optionally" means that the subsequent event or condition may occur but not requisite, that the term includes the instance in which the event or condition occurs and the instance in which the event or condition does not occur.

The term "substituted" means one or more than one hydrogen atom(s) on a specific atom are substituted with the substituent, including deuterium and hydrogen variables, as long as the valence of the specific atom is normal and the substituted compound is stable. When the substituent is an oxygen (i.e., =O), it means two hydrogen atoms are substituted. The oxygen substitution does not occur on the aromatic group. The term "optionally substituted" means an atom can be substituted with a substituent or not, unless otherwise specified, the type and number of the substituent may be arbitrary as long as is chemically achievable.

When any variable (such as R) occurs in the constitution or structure of the compound more than once, the definition of the variable at each occurrence is independent. Thus, for example, if a group is substituted with 0-2 R, the group can be optionally substituted with up to two R, wherein the definition of R at each occurrence is independent. Moreover, a combination of substituents and/or variables thereof is allowed only when such combination can result in a stable compound.

When the number of a linking group is 0, such as —(CRR)$_0$—, it means that the linking group is a single bond.

When the number of substituent is 0, it means that the substituent does not exist, for example, -A-(R)$_0$ means that its structure is actually A.

When a substituent is vacant, it means that the substituent does not exist, for example, when X is vacant in A-X, the structure of A-X is actually A.

When one of the variables is selected from a single bond, it means that the two groups linked by the single bond are connected directly. For example, when L in A-L-Z represents a single bond, the structure of A-L-Z is actually A-Z.

When the bond of a substituent can be cross-connected to two or more atoms on a ring, the substituent can be bonded to any atom on the ring, for example, the structural moiety

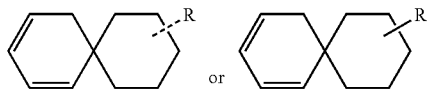

means that the substitution can take place with the substituent R at any position on cyclohexyl or cyclohexadiene. When the enumerative substituent does not indicate by which atom it is linked to the group to be substituted, such substituent can be bonded by any atom thereof. For example, when pyridyl acts as a substituent, it can be linked to the group to be substituted by any carbon atom on the pyridine ring.

When the enumerative linking group does not indicate the direction for linking, the direction for linking is arbitrary, for example, the linking group L contained in

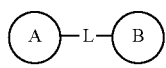

is -M-W—, then -M-W— can link ring A and ring B to form

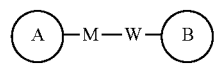

in the direction same as left-to-right reading order, and form

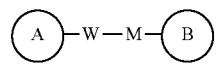

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of the chemical bond linking thereto so as to meet the corresponding valence. The chemical bond between the site and other groups can be represented by a straight solid bond (╱), a straight dashed bond (╱) or a wavy line (⌇). For example, the straight solid bond in —OCH$_3$ means that it is linked to other groups through the oxygen atom in the group; the straight dashed bond in

means that it is linked to other groups through the two ends of nitrogen atom in the group; the wavy line in

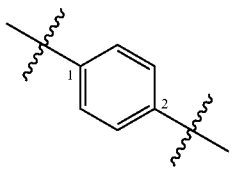 [SMILES: *c1ccc(*)cc1]

means that the phenyl group is linked to other groups through carbon atoms at position 1 and position 2;

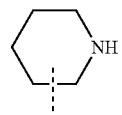

means that it can be linked to other groups through any linkable sites on the piperidinyl by one chemical bond, including at least four types of linkage, including

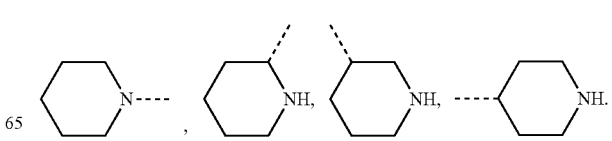

Even though the H atom is drawn on the —N—,

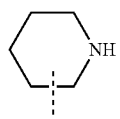

still includes the linkage of

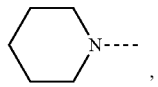

merely when one chemical bond was connected, the H of this site will be reduced by one to the corresponding monovalent piperidinyl.

The term "protecting group" includes, but is not limited to "amino protecting group", "hydroxyl protecting group" or "thio protecting group". The term "amino protecting group" refers to a protecting group suitable for blocking the side reaction on the nitrogen of an amino.

Representative amino protecting groups include, but are not limited to: formyl; acyl, such as chain alkanoyl (e.g., acetyl, trichloroacetyl or trifluoroacetyl); alkoxycarbonyl, such as tert-butoxycarbonyl (Boc); arylmethoxycarbonyl, such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl)methyl; silyl, such as trimethylsilyl (TMS) and tert-butyldimethylsilyl (TBS) and the like. The term "hydroxyl protecting group" refers to a protecting group suitable for blocking the side reaction on hydroxyl. Representative hydroxyl protecting groups include, but are not limited to: alkyl, such as methyl, ethyl, and tert-butyl; acyl, such as chain alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS) and the like.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97).

The following abbreviations are used in the present disclosure: aq. and $H_2O$ refer to water; eq refers to equivalence or equivalent; BOC refers to tert-butoxycarbonyl; PE refers to petroleum ether; ACN refers to acetonitrile; EtOAc refers to ethyl acetate; EtOH refers to ethanol; MeOH refers to methanol; Allyl refers to allyl; DBU refers to 1,8-diazabicycloundec[5,4,0]undec-7-ene; PPTS refers to pyridinium p-toluenesulfonate; DMA refers to dimethylacetamide; DMP refers to Dess-Martin periodinane; $T_3P$ refers to propylphosphonic anhydride; HPLC refers to high performance liquid chromatography; LCMS refers to liquid chromatography mass spectrometry; r.t. refers to room temperature; mp refers to melting point; °C. refers to degrees Celsius; h refers to hours; mL refers to milliliters; mM refers to millimoles per liter; mmol refers to millimoles; mol refers to micromoles; HNMR refers to hydrogen nuclear magnetic resonance; MS refers to mass spectrum; min refers to minutes; pH refers to negative logarithm of molar concentration of hydrogen ions.

Technical Effect

The compounds of the present disclosure exhibit positive effects in influenza virus replication inhibition assays at the cellular level and protective effects in animal treatment model drug efficacy assays, with pharmacokinetic properties consistent with the requirements of pharmaceutical preparations.

DETAILED DESCRIPTION OF THE PREFERRED EMBODIMENTS

Figure 1:
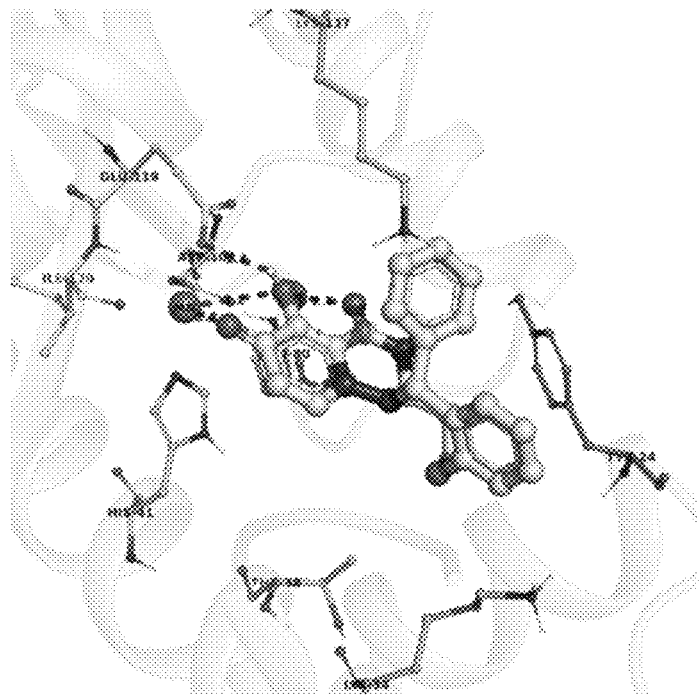
FIG. 1. Simulation on superimposition of compound 1 and S-033447.
Figure 2:
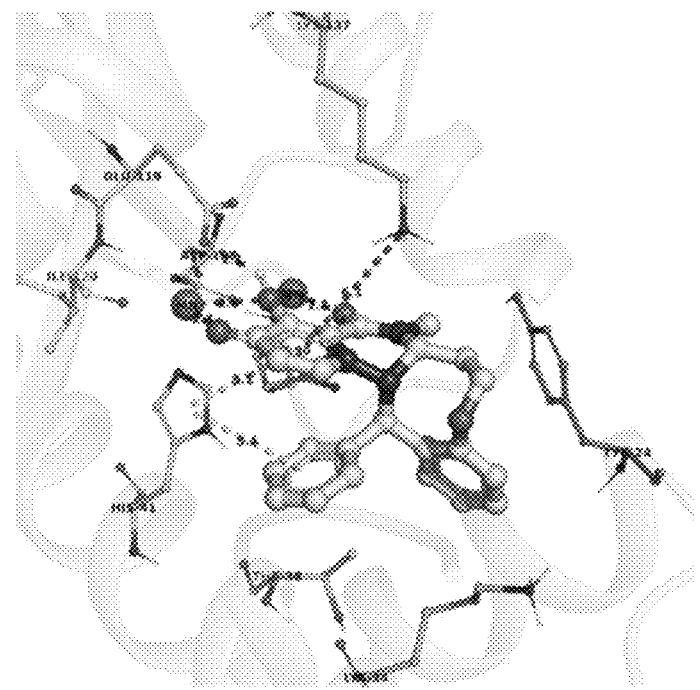
FIG. 2. Simulation on superimposition of compound 2 and S-033447.
Figure 3:
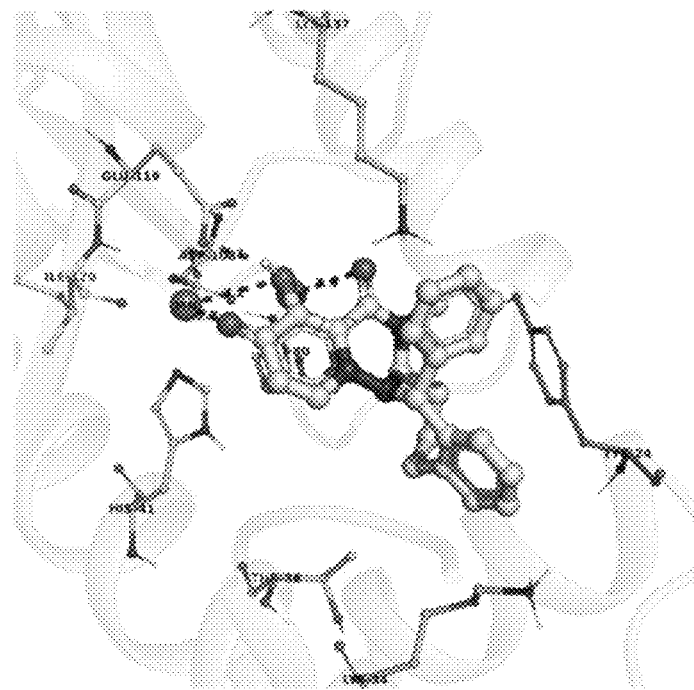
FIG. 3. Simulation on superimposition of compound 3 and S-033447.
Figure 4:
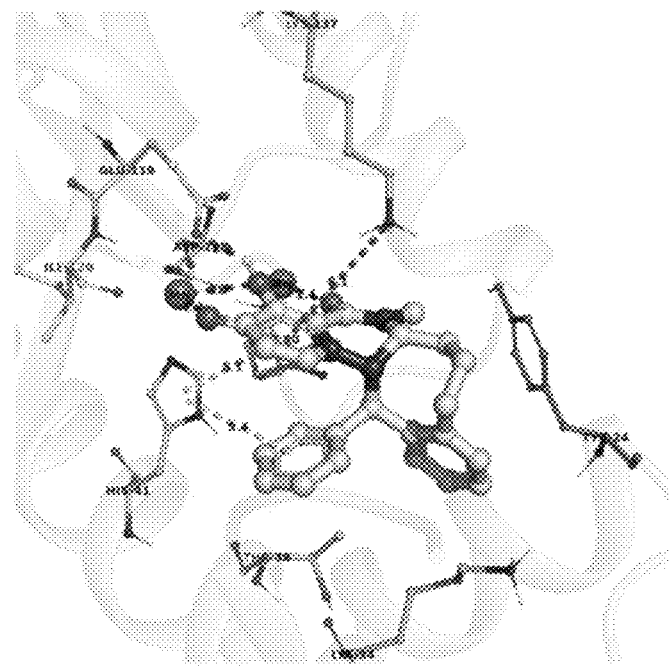
FIG. 4. Simulation on superimposition of compound 4 and S-033447.
Figure 5:
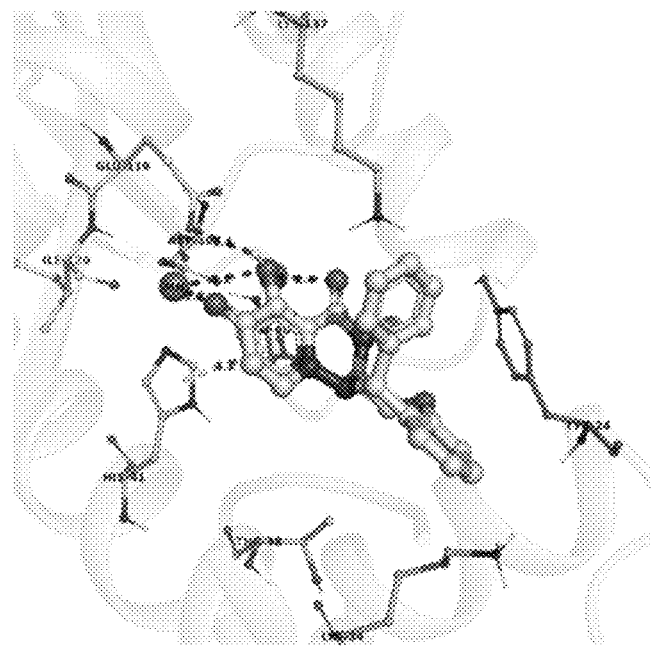
FIG. 5. Simulation on superimposition of compound 5 and S-033447.
Figure 6:
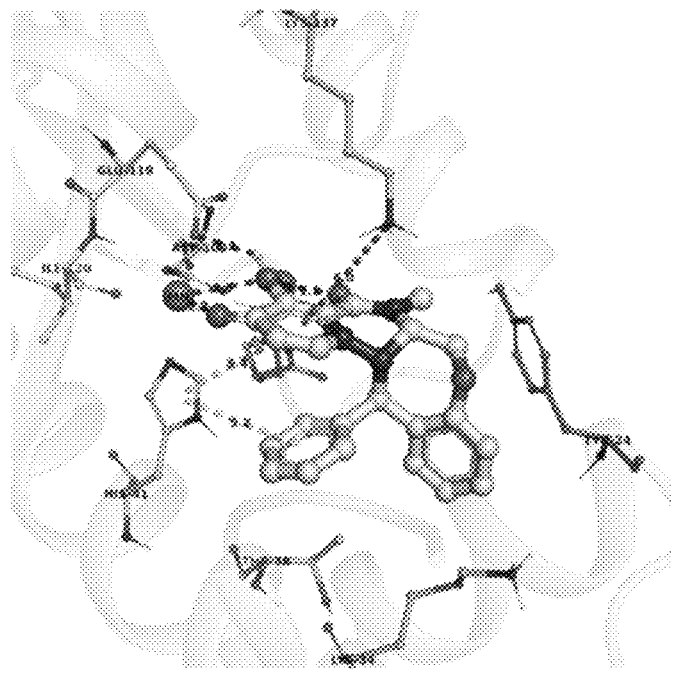
FIG. 6. Simulation on superimposition of compound 6 and S-033447.
Figure 7:
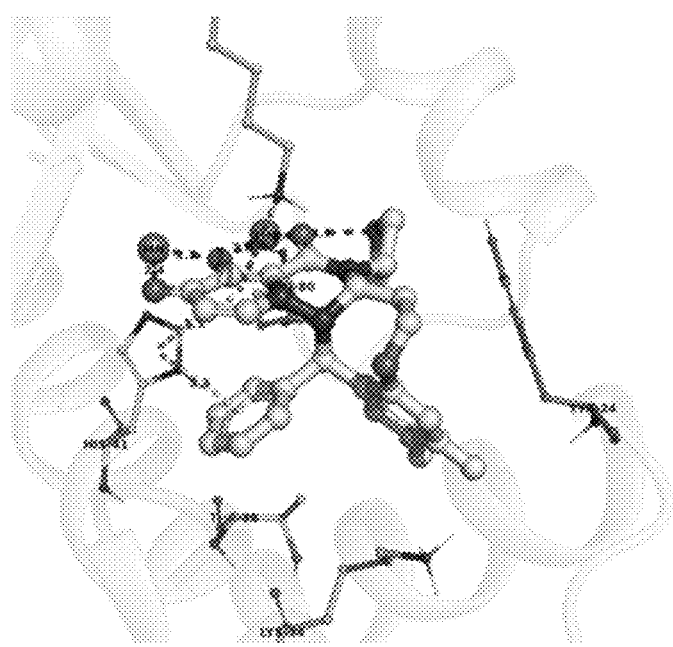
FIG. 7. Simulation on superimposition of compound 7 and S-033447.

The following embodiment further illustrates the present disclosure, but the present disclosure is not limited thereto. The present disclosure has been described in detail herein, and its specific embodiments have also been disclosed; for one skilled in the art, it is obvious to make various modifications and improvements to the embodiments of the present disclosure without departing from the spirit and scope of the present disclosure.

Calculation Embodiment 1

Simulations on superimposition of compound 1 to 7 and S-033447:

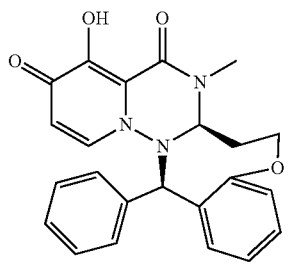

1

2

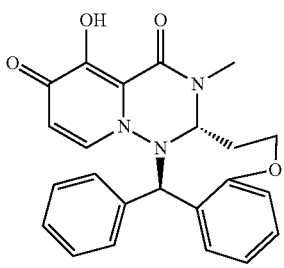

3

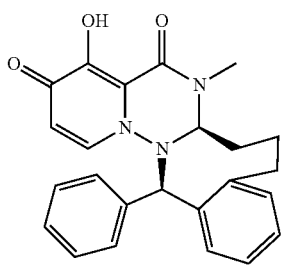

4

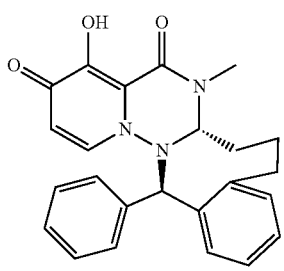

5

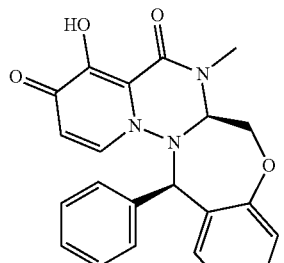

6

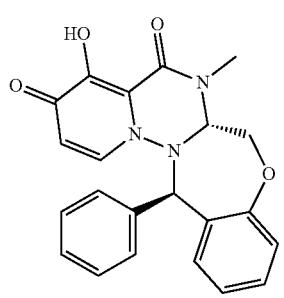

7

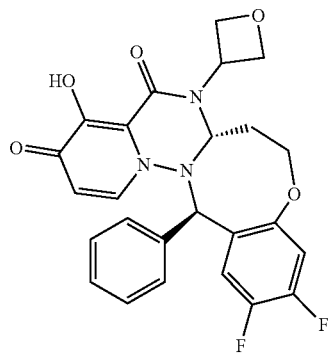

The molecular docking process was performed by using GlideSP [1] in Maestro (Schrödinger version 2017-2) with default options. The crystal structures with PDB ID codes 6FS6 and 6FS7 were selected as docking templates. To prepare proteins, hydrogen atoms were added using the protein preparation wizard module of Maestro [2] as well as the OPLS3 force field. For the preparation of ligands, 3D structures were generated and energy minimization was performed using LigPrep [3]. A 30 Å docking grid was generated using the ligand mass centers in the 6FS6 and 6FS7 crystal structures. The ligand was then removed and the embodiment compounds were placed during molecular docking. The type of interaction between the protein receptor and the ligand was analyzed, and a reasonable docking conformation was selected and saved based on the calculated docking score and globalStrain values. Simulations on superimposition of compound 1 to 7 and S-033447 are shown in drawings.

[1] Glide, Schrödinger, LLC, New York, NY, 2017.

[2] Maestro, Schrödinger, LLC, New York, NY, 2017.

[3] LigPrep, Schrödinger, LLC, New York, NY, 2017.

Conclusion: The molecules of the present disclosure can form key interactions through docking with template proteins, including coordination bonds with metal ions, π-π interactions, and hydrophobic interactions. The conformation is similar to that of the reference molecule S-033447 inside the target cavity with a good superposition.

Embodiment 1

1A

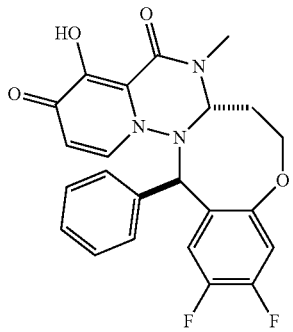

Synthetic Route:
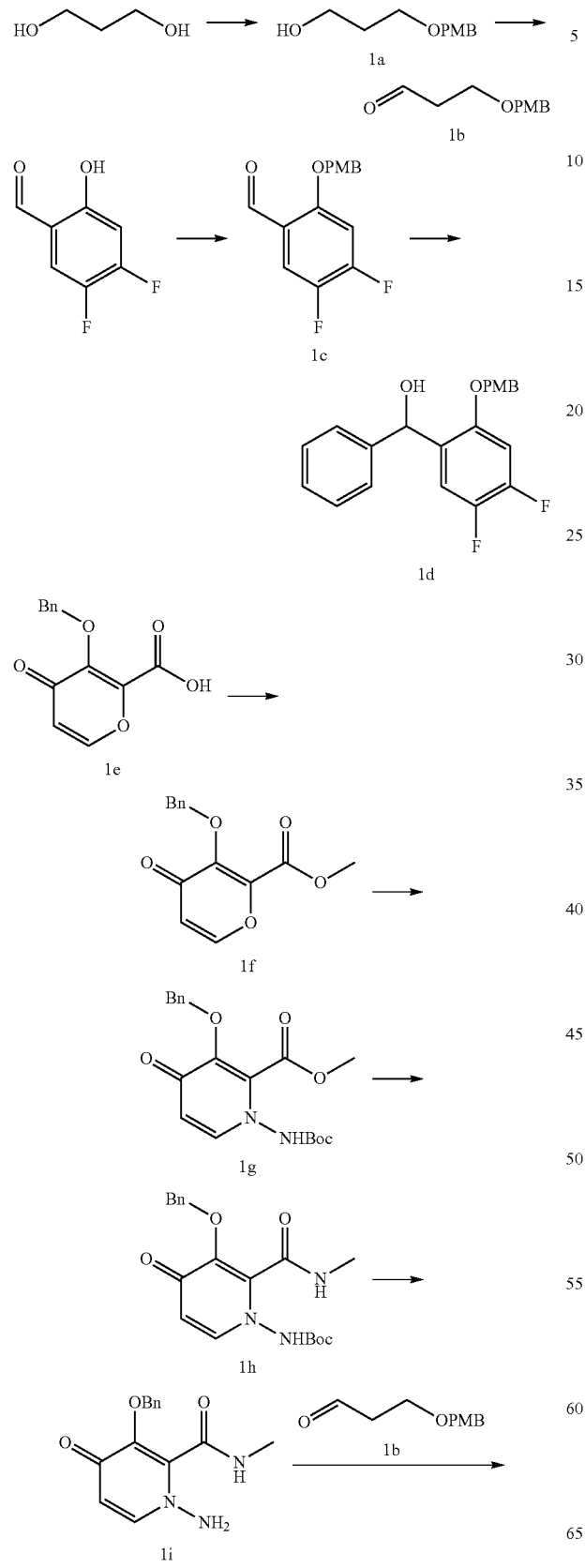
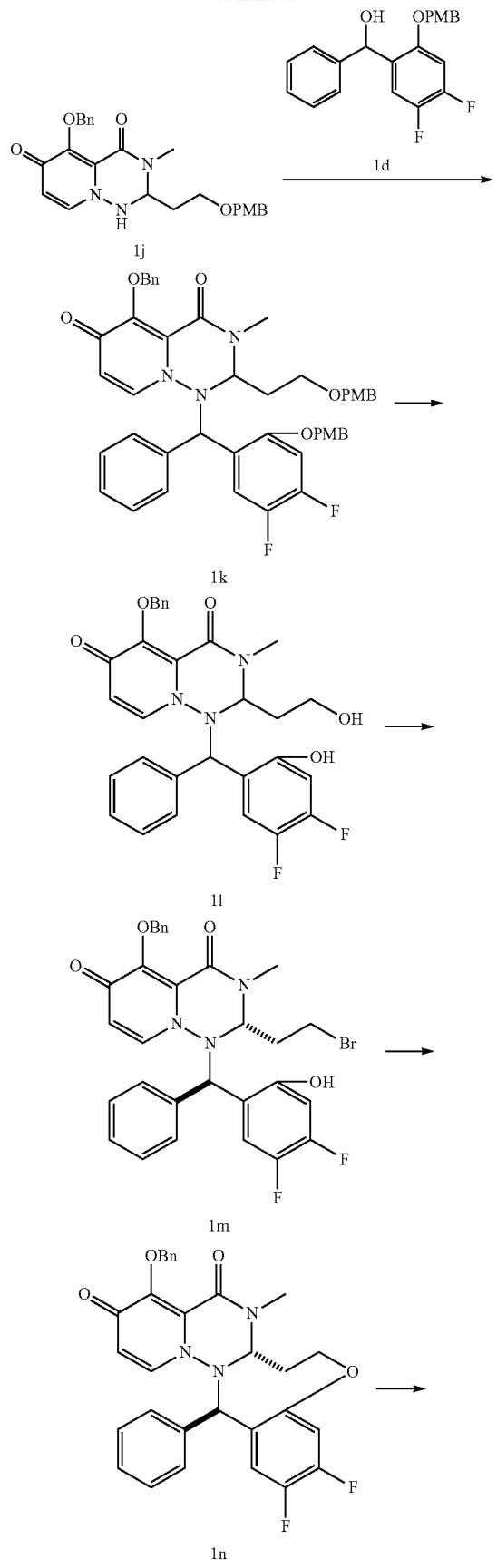

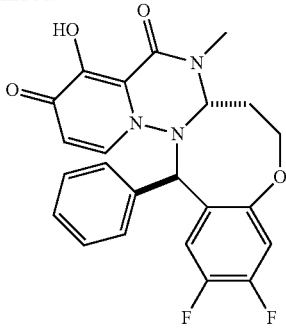

1A

Step 1: Synthesis of Compound 1a 1,3-Propanediol (25.0 g, 328.54 mmol, 23.81 mL, 1 eq) was dissolved in dimethyl sulfoxide (120 mL), then potassium hydroxide (18.43 g, 328.54 mmol, 1 eq) and p-methoxybenzyl chloride (51.45 g, 328.54 mmol, 44.74 mL, 1 eq) were added thereto, and the reaction mixture was stirred at 25° C. for 14 hours. The reaction mixture was poured into water (125 mL), and then extracted with ethyl acetate (150 mL×2). The organic phases were combined, washed with water (250 mL) and saturated brine (250 mL×3), dried over anhydrous sodium sulfate, and concentrated to obtain a crude product. The crude product was purified by silica gel column chromatography (petroleum ether/ethyl acetate=100:0-50:50) to obtain compound 1a.

$^1$H NMR (400 MHz, CDCl$_3$) δ=7.26 (br d, J=8.6 Hz, 2H), 6.89 (br d, J=8.6 Hz, 2H), 4.46 (s, 2H), 3.81 (s, 3H), 3.77 (t, J=5.7 Hz, 2H), 3.64 (t, J=5.8 Hz, 2H), 1.90-1.81 (m, 2H).

Step 2: Synthesis of Compound 1b 1a (10.0 g, 50.96 mmol, 1 eq) was dissolved in dichloromethane (130 mL), then DMP (22.69 g, 53.51 mmol, 16.56 mL, 1.05 eq) was slowly added thereto in batches, and the reaction mixture was stirred at 25° C. for 1 hour under the protection of nitrogen. The reaction mixture was filtered with silica gel, then the filter cake was washed with dichloromethane (25 mL×4), and the filtrate was combined and concentrated. Petroleum ether/ethyl acetate (5:1, 50 mL) was added to the concentrated filtrate, and the mixture was stirred for 20 minutes and filtered. The filter cake was washed with petroleum ether/ethyl acetate (5:1, 30 mL×2), and the filtrate was combined and concentrated. The concentrated filtrate was subjected to the previous operation three times to obtain a crude product. The crude product was purified by silica gel column chromatography (petroleum ether/ethyl acetate=100:0-80:20) to obtain compound 1b.

$^1$H NMR (400 MHz, CDCl$_3$) δ=9.79 (t, J=1.9 Hz, 1H), 7.28-7.24 (m, 2H), 6.92-6.86 (m, 2H), 4.47 (s, 2H), 3.81 (s, 3H), 3.81-3.78 (m, 2H), 2.69 (dt, J=1.9, 6.1 Hz, 2H).

Step 3: Synthesis of Compound 1c 4,5-Difluorosalicylaldehyde (40 g, 253.00 mmol, 1 eq), p-methoxybenzyl chloride (43.58 g, 278.30 mmol, 37.90 mL, 1.1 eq) and potassium carbonate (52.45 g, 379.50 mmol, 1.5 eq) were added to a three-necked flask filled with MeCN (30 mL) at 25° C., and the mixture was stirred, and then the reaction was carried out at 55° C. for 3 hours. After the reaction mixture was filtered to remove insoluble impurities, the filter cake was washed with dichloromethane (2×50 mL), and the organic phases were combined and concentrated under reduced pressure to remove the solvent to obtain a crude product. The crude product was slurried with petroleum ether (200 mL) and ethyl acetate (20 mL) at 20° C., filtered to obtain a solid as compound 1c.

$^1$H NMR (400 MHz, CDCl$_3$) δ=10.36 (d, J=3.0 Hz, 1H), 7.66 (t, J=9.7 Hz, 1H), 7.34 (d, J=8.8 Hz, 2H), 6.97-6.85 (m, 3H), 5.07 (s, 2H), 3.83 (s, 3H).

Step 4: Synthesis of Compound 1d

A diethyl ether solution of phenyl Grignard reagent (3 M, 44.03 mL, 1.05 eq) was added dropwise to a solution of 1c (35 g, 125.79 mmol, 1 eq) in tetrahydrofuran (70 mL) at 0° C. under the protection of nitrogen, and then the reaction mixture was stirred at 20° C. for 4 hours. The two parallel reactions were combined, and the reaction mixture was quenched with saturated ammonium chloride aqueous solution (80 mL), and then extracted with ethyl acetate (4×90 mL), and the obtained organic phase was dried over anhydrous sodium sulfate and concentrated under reduced pressure to obtain a crude product. The crude product was purified by silica gel column chromatography (petroleum ether/ethyl acetate=100:0-70:30) to obtain compound 1d.

$^1$H NMR (400 MHz, CDCl$_3$) δ=7.32-7.20 (m, 6H), 7.11 (d, J=8.5 Hz, 2H), 6.91-6.84 (m, 2H), 6.74 (dd, J=6.5, 12.0 Hz, 1H), 5.99 (d, J=4.8 Hz, 1H), 4.88 (s, 2H), 3.82 (s, 3H);

$^{19}$F NMR (377 MHz, CDCl$_3$) δ=−136.47−−137.23 (m, 1F), −147.20−−147.96 (m, 1F).

Step 5: Synthesis of Compound 1f 1e (100 g, 406.15 mmol, 1 eq) was added to DMA (500 mL), and then sodium bicarbonate (40.94 g, 487.38 mmol, 18.96 mL, 1.2 eq) and dimethyl sulfate (56.74 g, 449.85 mmol, 42.66 mL, 1.11 eq) were added to the mixture, and the reaction mixture was stirred at 20° C. for 12 hours. Water (750 mL) was added and extracted twice with ethyl acetate (1000 mL+500 mL). The organic phases were combined, washed with water (450 mL) and saturated brine (300 mL), dried over anhydrous sodium sulfate, filtered, and the filtrate was concentrated to dryness under reduced pressure. Compound 1f was obtained and used directly in the next step without purification.

$^1$H NMR (400 MHz, CDCl$_3$) δ=7.74 (d, J=5.6 Hz, 1H), 7.45 (br d, J=6.5 Hz, 2H), 7.39-7.28 (m, 3H), 6.47 (d, J=5.5 Hz, 1H), 5.30 (s, 2H), 3.86 (s, 3H).

Step 6: Synthesis of Compound 1g 1f (126 g, 484.16 mmol, 1 eq) was added to DMA (650 mL), then PPTS (316.35 g, 1.26 mol, 2.6 eq) was added thereto, and the reaction mixture was stirred at 60° C. A solution of Boc-hydrazine (83.18 g, 629.41 mmol, 1.3 eq) in DMA (100 mL) was added dropwise, and the reaction mixture was stirred at 60° C. for 4 hours. The reaction mixture was cooled to room temperature, added with water (1.55 L) under stirring, washed twice with ethyl acetate (2×1 L), and the organic phases were combined and washed once with saturated brine (1 L). The organic phases were concentrated under reduced pressure, and ethyl acetate (500 mL) was added to the oily liquid, added with water (1 L) under stirring. A solid was precipitated, then the mixture was filtered, and the filter cake was washed with ethyl acetate. Compound 1g was obtained after drying.

¹H NMR (400 MHz, CDCl₃) δ=7.35-7.30 (m, 2H), 7.30-7.26 (m, 2H), 7.25-7.21 (m, 2H), 7.19 (s, 1H), 6.35 (d, J=7.9 Hz, 1H), 5.18 (s, 2H), 3.70 (s, 3H), 1.38 (s, 9H).

Step 7: Synthesis of Compound 1h 1g (20 g, 53.42 mmol, 1 eq) was added to tetrahydrofuran (200 mL), then DBU (2.44 g, 16.03 mmol, 2.42 mL, 0.3 eq) and methylamine solution (50.28 g, 534.21 mmol, concentration: 33%, 10 eq) were added successively. The reaction mixture was reacted at 60° C. for 12 hours. Dichloromethane (50 mL) was added to the reaction mixture, and washed twice with citric acid aqueous solution (2×50 mL). The organic phase was concentrated under reduced pressure, then ethyl acetate (20 mL) was added to the concentrated solution, and the mixture was slurried at 20° C. for 2 hours to obtain compound 1h.

Step 8: Synthesis of the Hydrochloride of Compound 1i 1h (13 g, 34.82 mmol, 1 eq) was added to ethyl acetate (130 mL), and a solution of hydrochloric acid in ethyl acetate (4 M, 130 mL, 14.32 eq) was added successively. The reaction mixture was reacted at 25° C. for 12 hours. The reaction mixture was concentrated under reduced pressure, and the solvent was removed. The hydrochloride of compound 1i was obtained and used directly in the next step without purification.

¹H NMR (400 MHz, CD₃OD) δ=8.37 (br d, J=7.3 Hz, 1H), 7.47-7.34 (m, 5H), 7.30-7.24 (m, 1H), 5.24 (s, 2H), 2.91 (s, 3H).

Step 9: Synthesis of Compound 1j

Potassium carbonate (1.43 g, 10.33 mmol, 4 eq) was added to a suspension of the hydrochloride of compound 1i (800 mg, 2.58 mmol, 1 eq) and 1b (551.80 mg, 2.84 mmol, 1.1 eq) in acetonitrile (8 mL), and the reaction mixture was stirred at 20° C. for 18 hours. The reaction mixture was diluted with ethyl acetate/water (1:1, 20 mL), filtered, and the filter cake was washed three times with water (3×5 mL) and three times with ethyl acetate (3×5 mL). The phases of the filtrate were separated, and the organic phase was directly concentrated and evaporated to dryness. The crude product was purified by silica gel column chromatography (dichloromethane/methanol=100:0-95:5), and the product fraction was concentrated and combined with the previously obtained filter cake to obtain compound 1j.

¹H NMR (400 MHz, CDCl₃) δ=7.46 (dd, J=1.6, 7.7 Hz, 2H), 7.28-7.21 (m, 6H), 6.91 (d, J=8.5 Hz, 2H), 6.32 (d, J=7.5 Hz, 1H), 6.21 (d, J=2.8 Hz, 1H), 5.42 (d, J=10.5 Hz, 1H), 5.21 (d, J=10.5 Hz, 1H), 4.53-4.46 (m, 1H), 4.46-4.38 (m, 2H), 3.84 (s, 3H), 3.46-3.37 (m, 1H), 3.30 (td, J=5.2, 10.0 Hz, 1H), 2.89 (s, 3H), 1.58-1.41 (m, 2H).

Step 10: Synthesis of Compound 1k 1j (800 mg, 1.78 mmol, 1 eq) and 1d (951.36 mg, 2.67 mmol, 1.5 eq) were dissolved in ethyl acetate (25 mL), then a solution of T₃P in ethyl acetate (2.27 g, 3.56 mmol, 2.12 mL, concentration: 50%, 2 eq) was added, and the reaction mixture was stirred at 65° C. for 12 hours. A solution of T₃P in ethyl acetate (1.13 g, 1.78 mmol, 1.06 mL, concentration: 50%, 1 eq) was added, and the reaction mixture was stirred for 30 hours. 1d (317.12 mg, 889.88 μmol, 0.5 eq) was added, and the reaction mixture was stirred for 12 hours, cooled to 20° C., and the solvent was concentrated and evaporated to dryness. Dichloromethane (15 mL) was added, and the organic phase was washed twice with water (2×20 mL), added with silica gel, concentrated and evaporated to dryness. The crude product was purified by silica gel column chromatography (dichloromethane/methanol=100:0-95:5) to obtain compound 1k.

Step 11: Synthesis of Compound 1l 1k (1.33 g, 1.69 mmol, 1 eq) was dissolved in a premixed solution (about 0.5 M) of hydrochloric acid (12 M, 557.04 μL, 3.96 eq) in methanol (12.8 mL), and the reaction mixture was stirred at 60° C. for 14.5 hours. The reaction mixture was cooled to 20° C., and saturated sodium bicarbonate aqueous solution (10 mL) was added, then the mixture was extracted four times with dichloromethane/methanol (10:1, 10 mL×4). The organic phases were combined, added with silica gel, concentrated and evaporated to dryness. The crude product was purified by silica gel column chromatography (dichloromethane/methanol=100:0-95:5) to obtain compound 1l.

Step 12: Synthesis of Compound 1m 1l (250 mg, 456.58 μmol, 1 eq) was first evaporated to dryness in acetonitrile to remove water, then suspended in dichloromethane (4 mL), and triphenylphosphine (179.63 mg, 684.87 μmol, 1.5 eq) was added thereto at 20° C. The reaction mixture was stirred at this temperature for 15 minutes, and carbon tetrabromide (227.12 mg, 684.87 μmol, 1.5 eq) was added, then the reaction system became clear, and was stirred for 14 hours. The reaction mixture was quenched with methanol (2 mL), directly added with silica gel, concentrated and evaporated to dryness. The crude product was purified by silica gel column chromatography (dichloromethane/methanol=100:0-95:5) to obtain compound 1m.

Step 13: Synthesis of Compound 1n 1m (193 mg, 316.16 μmol, 1 eq) was dissolved in acetonitrile (1000 mL), then cesium carbonate (2.06 g, 6.32 mmol, 20 eq) was added, and the reaction mixture was stirred at 60° C. for 18 hours. The reaction mixture was cooled to 20° C., filtered, then the filter residue was washed with acetonitrile (4×10 mL), and the filtrate was concentrated and evaporated to dryness. The crude product was purified by preparative thin-layer chromatography (dichloromethane/methanol=20:1) to obtain compound 1n.

¹H NMR (400 MHz, CDCl₃) δ=7.54 (br d, J=6.8 Hz, 2H), 7.33-7.21 (m, 3H), 7.16-6.90 (m, 5H), 6.86 (dd, J=7.1, 10.3 Hz, 1H), 6.79-6.65 (m, 1H), 6.52 (d, J=7.8 Hz, 1H), 5.67 (d, J=7.8 Hz, 1H), 5.40-5.29 (m, 2H), 5.05 (dd, J=7.1, 11.4 Hz, 1H), 4.87 (s, 1H), 4.48-4.39 (m, 1H), 4.07 (td, J=2.8, 11.4 Hz, 1H), 2.94 (s, 3H), 2.09-1.98 (m, 1H), 1.88-1.81 (m, 1H);
¹⁹F NMR (377 MHz, CDCl₃) δ=−133.79 (br d, J=22.6 Hz, 1F), −139.65 (br d, J=22.6 Hz, 1F).

Step 14: Synthesis of Compound 1A 1n (20 mg, 37.77 μmol, 1 eq) was dissolved in dichloromethane (1 mL), then anhydrous magnesium chloride (71.92 mg, 755.38 μmol, 20 eq) was added, and the reaction mixture was stirred at 20° C. for 15 hours. The reaction mixture was diluted with methanol (2 mL), filtered, and the filter residue was rinsed with methanol (2 mL). The crude product solution was purified by preparative reversed-phase liquid chromatography (separation column: Phenomenex Gemini-NX C18 75*30 mm*3 um; mobile phase: [H₂O (0.225% FA)-ACN]; ACN %: 25%-55%, 7 min) to obtain compound 1A. MS (ESI, m/z): 440.0 [M+1];
¹H NMR (400 MHz, CD₃OD) δ=7.23 (br s, 4H), 7.16-7.07 (m, 2H), 7.02 (br d, J=7.4 Hz, 1H), 5.71 (br d, J=7.3 Hz, 1H), 5.56 (br t, J=8.9 Hz, 1H), 5.41 (s, 1H), 4.63 (br d, J=4.9 Hz, 1H), 4.25 (br d, J=11.1 Hz, 1H), 3.13 (s, 3H), 2.22 (br s, 2H);
¹⁹F NMR (377 MHz, CD₃OD) δ=−137.66 (br d, J=19.8 Hz, 1F), −143.64 (br d, J=22.6 Hz, 1F).
Embodiment 2
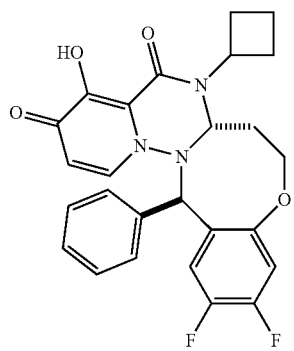
2A
Synthetic Route:
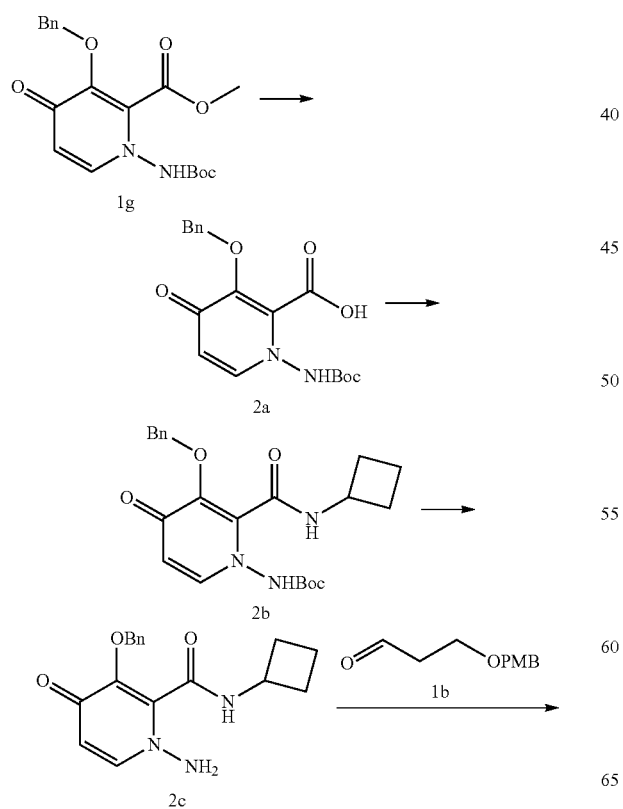
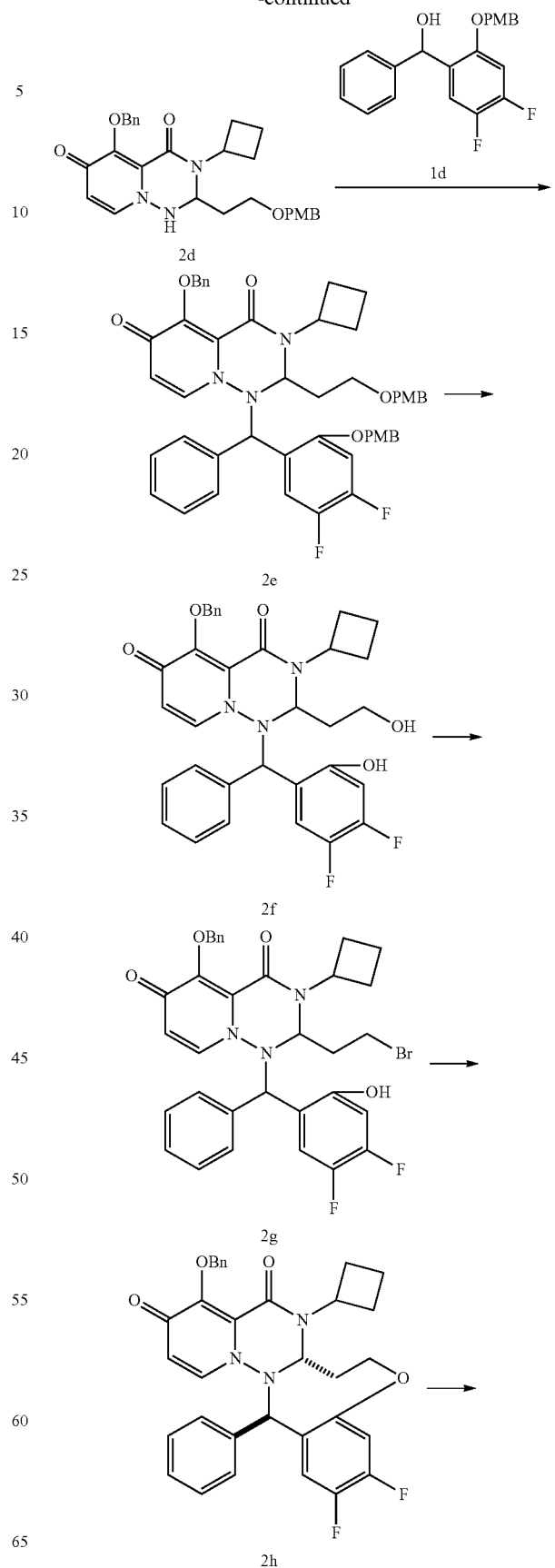

-continued

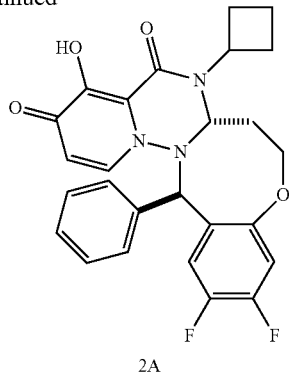

2A

Step 1: Synthesis of Compound 2a 1g (56 g, 149.58 mmol, 1 eq) was dissolved in ethanol (560 mL), and sodium hydroxide aqueous solution (2 M, 224.75 mL, 3.01 eq) was added, then the reaction mixture was stirred at 60° C. for 12 hours. After the reaction was completed, the reaction mixture was concentrated under reduced pressure to remove ethanol, added with water (500 mL), extracted three times with ethyl acetate (3×300 mL). The aqueous phase was added with 2 M hydrochloric acid under stirring to adjust the pH value to 4, at which point a solid was precipitated, and compound 2a was obtained by filtration.

$^1$H NMR (400 MHz, CD$_3$OD) δ=7.78 (d, J=7.8 Hz, 1H), 7.48 (br d, J=6.5 Hz, 2H), 7.39-7.30 (m, 3H), 6.57 (br d, J=7.5 Hz, 1H), 5.17 (s, 2H), 1.50 (br s, 9H).

Step 2: Synthesis of Compound 2b 2a (30 g, 83.25 mmol, 1 eq) was added to DMF (300 mL), then EDCI (23.94 g, 124.87 mmol, 1.5 eq), HOBt (11.25 g, 83.25 mmol, 1 eq) and cyclobutylamine (8.88 g, 124.87 mmol, 10.70 mL, 1.5 eq) were added successively. The reaction mixture was reacted at 60° C. for 12 hours. The reaction mixture was extracted five times with dichloromethane (5×150 mL), and the organic phases were combined and washed with saturated brine (300 mL). The organic phase was concentrated under reduced pressure, slurried with a mixture of ethyl acetate:petroleum ether at 20° C. Compound 2b was obtained.

$^1$H NMR (400 MHz, CD$_3$OD) δ=7.75-7.68 (m, 1H), 7.43 (br d, J=6.5 Hz, 2H), 7.38-7.30 (m, 3H), 6.55-6.46 (m, 1H), 5.16 (s, 2H), 4.37 (quin, J=8.3 Hz, 1H), 2.32-2.21 (m, 2H), 2.03-1.92 (m, 2H), 1.82-1.67 (m, 2H), 1.50 (s, 9H).

Step 3: Synthesis of the Hydrochloride of Compound 2c 2b (18 g, 43.53 mmol, 1 eq) was added to ethyl acetate (180 mL), then hydrochloric acid/ethyl acetate (4 M, 180 mL, 14.32 eq) was added successively. The reaction mixture was reacted at 25° C. for 12 hours. The reaction mixture was concentrated under reduced pressure, and the solvent was removed. The hydrochloride of compound 2c was obtained and used directly in the next step without purification.

$^1$H NMR (400 MHz, CD$_3$OD) δ=8.39 (d, J=7.3 Hz, 1H), 7.49-7.42 (m, 2H), 7.42-7.36 (m, 3H), 7.31 (d, J=7.1 Hz, 1H), 5.25 (s, 2H), 4.51-4.39 (m, 1H), 2.40-2.28 (m, 2H), 2.07-1.93 (m, 2H), 1.86-1.70 (m, 2H).

Step 4: Synthesis of Compound 2d

Acetonitrile (100 mL) was added to a round bottom flask at 25° C., then the hydrochloride of 2c (8.90 g, 25.44 mmol, 1 eq), potassium carbonate (14.07 g, 101.77 mmol, 4 eq) and 1b (5.44 g, 27.99 mmol, 1.1 eq) were slowly added, and the reaction mixture was stirred continuously at 25° C. for 2 hours under the protection of nitrogen. The reaction mixture was slowly poured into water (100 mL), extracted twice with ethyl acetate (100 mL×2), and the organic phases were combined and washed with water (100 mL) and saturated brine (100 mL) successively, and the obtained organic phase was concentrated under reduced pressure to obtain a crude product. The crude product was purified by silica gel column chromatography (dichloromethane/methanol=100:0-95:5) to obtain compound 2d.

$^1$H NMR (400 MHz, CDCl$_3$) δ=7.41 (dd, J=2.1, 7.1 Hz, 2H), 7.26-7.15 (m, 6H), 6.89 (d, J=8.6 Hz, 2H), 6.26 (d, J=7.6 Hz, 1H), 6.04 (br s, 1H), 5.46 (d, J=10.8 Hz, 1H), 5.15 (d, J=10.8 Hz, 1H), 4.80-4.65 (m, 1H), 4.49 (quin, J=8.9 Hz, 1H), 4.41 (s, 2H), 3.93-3.71 (m, 3H), 3.52-3.19 (m, 2H), 2.26-2.01 (m, 4H), 1.75-1.58 (m, 2H), 1.47 (dt, J=4.8, 9.8 Hz, 1H), 1.20 (tdd, J=3.9, 10.4, 14.6 Hz, 1H).

Step 5: Synthesis of Compound 2e 2d (3.00 g, 6.13 mmol, 1 eq) and 1d (2.18 g, 6.13 mmol, 1 eq) were dissolved in ethyl acetate (75 mL), then a solution of T$_3$P in ethyl acetate (7.80 g, 12.26 mmol, 7.29 mL, concentration: 50%, 2 eq) was added thereto, and the reaction system was stirred at 70° C. for 37 hours under the protection of nitrogen. 1d (3×1.46 g, 3×4.09 mmol, 3 eq) and a solution of T$_3$P in ethyl acetate (3×2.60 g, 3×4.09 mmol, 3×2.43 mL, concentration: 50%, 3 eq) were added three times. The reaction mixture was diluted with ethyl acetate (100 mL), and was washed with water (100 mL×2) and saturated brine (100 mL×3) successively. The organic phase was dried over anhydrous sodium sulfate and concentrated to obtain a crude product. The crude product was purified by silica gel column chromatography (dichloromethane/methanol=100:0-95:5) and preparative reversed-phase liquid chromatography (separation column: Phenomenex Gemini-NX C18 75*30 mm*3 μm; mobile phase: [H$_2$O (0.225% FA)-ACN]; ACN %: 54%-84%, 7 min) successively to obtain compound 2e.

Step 6: Synthesis of Compound 2f 2e (1.06 g, 1.28 mmol, 1 eq) was dissolved in methanol solution of hydrochloric acid (0.5 M, 10 mL, 3.91 eq) (4 mL of concentrated hydrochloric acid (37%) was measured and added to 92 mL of methanol, mixed well and 10 mL of the solution was used for the reaction), and the reaction mixture was stirred at 60° C. for 20 hours. Solid sodium bicarbonate was added to the reaction mixture until the pH of the solution to 8, and concentrated to obtain a crude product. The crude product was purified by silica gel column chromatography (dichloromethane/methanol=100: 0-95:5) to obtain compound 2f.

Step 7: Synthesis of Compound 2g 2f (410 mg, 697.74 μmol, 1 eq) was dissolved in dichloromethane (5 mL), then triphenylphosphine (274.52 mg, 1.05 mmol, 1.5 eq) was added thereto, and the reaction mixture was stirred at 25° C. for 15 minutes. Carbon tetrabromide (347.09 mg, 1.05 mmol, 1.5 eq) was added, and the reaction mixture was stirred at 25° C. for 30 minutes under the protection of nitrogen. Triphenylphosphine (91.51 mg, 348.87 μmol, 0.5 eq) was added, and the reaction mixture was stirred at 25° C. for 1 hour under the protection of nitrogen. The reaction mixture was quenched with methanol (2 mL) and concentrated directly to obtain a crude product. The crude product was purified by silica gel column chromatography (dichloromethane/methanol=100:0-95:5) to obtain compound 2g.

Step 8: Synthesis of Compound 2h 2g (50 mg, 76.86 μmol, 1 eq) was dissolved in acetonitrile (250 mL), then cesium carbonate (500.87 mg, 1.54 mmol, 20 eq) was added thereto, and the reaction mixture was stirred at 60° C. for 4 hours, then stirred at 70° C. for 2.5 hours. The reaction mixture was filtered, then the filter cake was washed with acetonitrile (50 mL×3), and the filtrate was combined and concentrated to obtain a crude product. The crude product was purified by preparative TLC (dichloromethane/methanol=20:1) to obtain compound 2h.

Step 9: Synthesis of Compound 2A 2h (16 mg, 28.09 μmol, 1 eq) was dissolved in dichloromethane (2 mL), then anhydrous magnesium chloride (53.49 mg, 561.80 μmol, 23.06 μL, 20 eq) was added thereto, and the reaction mixture was stirred at 25° C. for 3.5 hours. The reaction mixture was directly concentrated to obtain a crude product. The crude product was purified by preparative reversed-phase liquid chromatography (separation column: Phenomenex Gemini-NX C18 75 mm*30 mm*3 μm; mobile phase: [H$_2$O (0.225% FA)-ACN]; ACN %: 40%-60%, 7 min) to obtain compound 2A. The compound was observed by NMR to have two conformers with a ratio of about 1:1. MS (ESI, m/z): 480.3 [M+1];

$^1$H NMR (400 MHz, CD$_3$OD) δ=7.45-7.37 (m, 3H), 7.27-7.08 (m, 9H), 6.95 (dd, J=7.2, 10.2 Hz, 1H), 6.90-6.78 (m, 2H), 6.61 (d, J=7.5 Hz, 1H), 6.33 (br d, J=7.5 Hz, 1H), 5.76 (s, 1H), 5.66 (d, J=7.8 Hz, 1H), 5.38-5.31 (m, 1H), 5.06-5.01 (m, 1H), 5.00 (s, 1H), 4.59 (br t, J=10.9 Hz, 1H), 4.36 (br d, J=11.3 Hz, 1H), 4.22 (br d, J=11.0 Hz, 2H), 4.09 (br s, 1H), 3.92 (br t, J=8.9 Hz, 1H), 3.22 (quin, J=10.1 Hz, 1H), 3.16-3.04 (m, 1H), 2.07 (br d, J=7.8 Hz, 4H), 1.94 (br d, J=9.0 Hz, 3H), 1.68-1.49 (m, 7H).

Embodiment 3

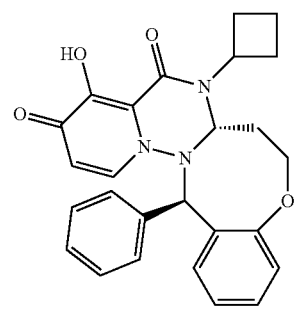

3A or 3B

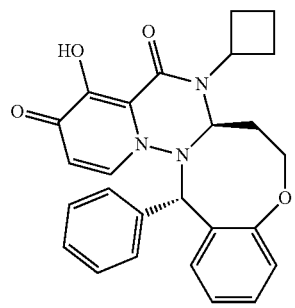

3B or 3A

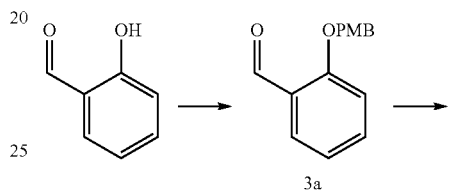

3a

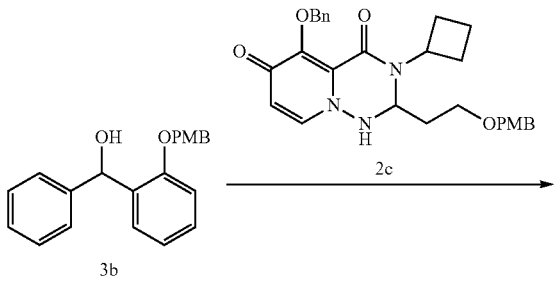

2c

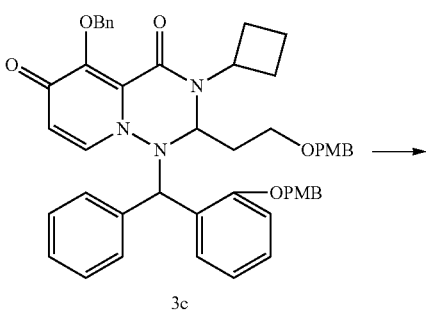

3c

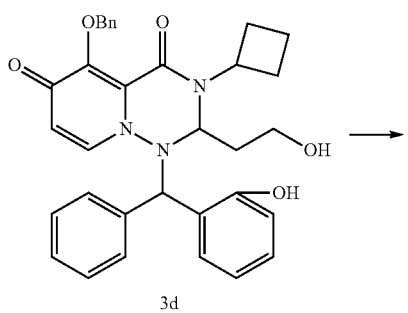

3d

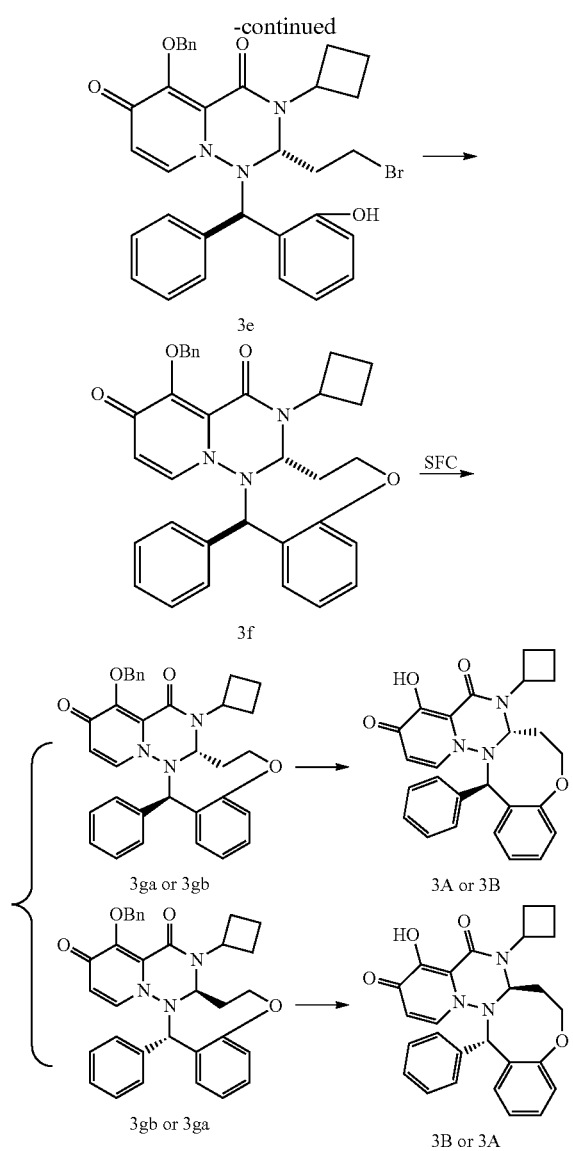

Step 1: Synthesis of Compound 3a

Salicylaldehyde (40 g, 327.54 mmol, 34.78 mL, 1 eq), p-methoxybenzyl chloride (56.43 g, 360.30 mmol, 49.07 mL, 1.1 eq) and potassium carbonate (67.90 g, 491.32 mmol, 1.5 eq) were added to a three-necked flask filled with acetonitrile (650 mL), and the reaction mixture was stirred at 60° C. for 3 hours. The reaction mixture was filtered to remove insolubles, and the filter cake was washed three times with dichloromethane (50 mL×3), then the filtrate was collected and concentrated under reduced pressure to obtain a crude product. The crude product was slurried with petroleum ether (100 mL) and ethyl acetate (15 mL) at 20° C. to obtain compound 3a.

$^1$H NMR (400 MHz, CDCl$_3$) δ 10.52 (s, 1H), 7.85 (dd, J=1.8, 7.8 Hz, 1H), 7.54 (ddd, J=1.9, 7.2, 8.5 Hz, 1H), 7.37 (d, J=8.8 Hz, 2H), 7.09-7.01 (m, 2H), 6.96-6.90 (m, 2H), 5.12 (s, 2H), 3.83 (s, 3H).

Step 2: Synthesis of Compound 3b

A diethyl ether solution of phenyl Grignard reagent (3.0 M, 43.34 mL, 1.05 eq) was added dropwise to a solution of 3a (30 g, 123.83 mmol, 1 eq) in tetrahydrofuran (80 mL) at 0° C., and the reaction mixture was stirred at 20° C. for 4 hours. Two parallel reactions were combined, and the reaction mixture was quenched with saturated ammonium chloride aqueous solution (100 mL), and then extracted with ethyl acetate (90 mL×3), and the organic phases were combined and concentrated under reduced pressure to obtain a crude product. The crude product was purified by silica gel column chromatography (petroleum ether/ethyl acetate=100:0-70:30) to obtain compound 3b.

$^1$H NMR (400 MHz, CDCl$_3$) δ=7.38-7.26 (m, 7H), 7.14 (d, J=8.5 Hz, 2H), 7.03-6.95 (m, 2H), 6.91-6.86 (m, 2H), 6.05 (d, J=6.0 Hz, 1H), 5.03-4.93 (m, 2H), 3.84 (s, 3H), 3.07 (d, J=6.0 Hz, 1H), 2.07 (s, 2H).

Step 3: Synthesis of Compound 3c

Ethyl acetate (40 mL) was added to a round bottom flask at 25° C., then 2c (4.02 g, 8.22 mmol, 1 eq), a solution of T$_3$P in ethyl acetate (20.90 g, 32.84 mmol, 19.54 mL, concentration: 50%, 4 eq) and 3b (5.26 g, 16.421 mmol, 2 eq) were slowly added, and the reaction mixture was stirred continuously at 60° C. for 14 hours under the protection of nitrogen. The reaction mixture was slowly poured into water (100 mL), extracted twice with ethyl acetate (100 mL×2), and the organic phases were combined and washed with water (100 mL) and saturated brine (100 mL) successively, and the obtained organic phase was concentrated under reduced pressure to obtain a crude product. The crude product was purified by silica gel column chromatography (dichloromethane/methanol=100:0-95:5) to obtain compound 3c.

$^1$H NMR (400 MHz, CDCl$_3$) δ=7.78 (dd, J=1.3, 7.5 Hz, 1H), 7.61-7.48 (m, 2H), 7.48-7.28 (m, 3H), 7.25-7.02 (m, 8H), 7.01-6.62 (m, 9H), 6.62-6.36 (m, 1H), 5.90-5.73 (m, 1H), 5.55-5.31 (m, 2H), 5.19-4.75 (m, 3H), 4.68-4.26 (m, 3H), 3.85-3.77 (m, 6H), 3.68-3.49 (m, 1H), 3.44-3.26 (m, 1H), 2.06-1.88 (m, 2H), 1.67-1.56 (m, 1H), 1.67-1.56 (m, 1H), 1.55-1.21 (m, 4H).

Step 4: Synthesis of Compound 3d 3c (3.3 g, 4.17 mmol, 1 eq) was dissolved in a premixed solution (about 0.5 M) of hydrochloric acid (12 M, 1.38 mL, 3.96 eq) in methanol (31.6 mL), and the reaction mixture was stirred at 60° C. for 18 hours. The reaction mixture was cooled to 20° C., and the pH was adjusted to >7 by adding solid sodium bicarbonate. The reaction mixture was filtered through cotton, added with silica gel, concentrated and evaporated to dryness. The crude product was purified by silica gel column chromatography (dichloromethane/methanol=100:0-95:5) to obtain compound 3d.

Step 5: Synthesis of Compound 3e 3d (930 mg, 1.69 mmol, 1 eq) was first evaporated to dryness in acetonitrile to remove water, then suspended in dichloromethane (16 mL), and triphenylphosphine (663.30 mg, 2.53 mmol, 1.5 eq) was added thereto at 20° C. The reaction mixture was stirred at this temperature for 15 min, then carbon tetrabromide (838.65 mg, 2.53 mmol, 1.5 eq) was added and the reaction system became clear. The reaction mixture was stirred for 14 hours. The reaction mixture was quenched with methanol (3 mL), directly added with silica gel, concentrated and evaporated to dryness. The crude product was purified by silica gel column chromatography (dichloromethane/methanol=100:0-95:5) to obtain compound 3e.

$^1$H NMR (400 MHz, CDCl$_3$) δ=7.95 (br s, 1H), 7.54 (d, J=7.3 Hz, 2H), 7.49-7.40 (m, 4H), 7.39-7.33 (m, 1H), 7.28 (br s, 2H), 7.26 (br s, 1H), 7.07 (br d, J=7.3 Hz, 1H), 7.02-6.95 (m, 1H), 6.84 (br s, 1H), 6.71 (t, J=7.5 Hz, 1H), 6.65-6.59 (m, 1H), 5.96 (br d, J=7.5 Hz, 1H), 5.84 (br d, J=7.8 Hz, 1H), 5.40 (d, J=11.0 Hz, 1H), 5.30-5.25 (m, 1H), 4.78 (dd, J=4.0, 9.8 Hz, 1H), 4.74-4.63 (m, 1H), 3.50 (br s, 1H), 3.40 (dt, J=4.0, 10.2 Hz, 1H), 3.35-3.26 (m, 1H), 2.19-2.01 (m, 2H), 2.00-1.80 (m, 2H), 1.70-1.50 (m, 4H).

Step 6: Synthesis of Compound 3f

Acetonitrile (500 mL) was added to a flask at 25° C., then 3e (100 mg, 162.73 μmol, 1 eq) and cesium carbonate (1.06 g, 3.25 mmol, 20 eq) were slowly added, and the reaction mixture was stirred continuously at 60° C. for 4 hours. The reaction mixture was slowly poured into water (100 mL), extracted twice with ethyl acetate (100 mL×2), and the organic phases were combined and washed with water (100 mL) and saturated brine (100 mL) successively, and the obtained organic phase was concentrated under reduced pressure to obtain a crude product. The crude product was purified by preparative thin-layer chromatography (dichloromethane/methanol=20:1) to obtain compound 3f.

Step 7: Synthesis of Compounds 3ga and 3gb

Compound 3f was purified by SFC (separation column: Chiralpak AD-3 50×4.6 mm I.D., 3 μm; mobile phase: A [CO$_2$]; B (0.05% DEA IPA) %: 5%-40%, 2 min) to obtain compound 3ga (retention time: 1.953 min) and 3gb (retention time: 2.300 min).

Step 8: Synthesis of Compound 3A

Dichloromethane (1 mL) was added to a round bottom flask at 25° C., then 3ga (10 mg, 18.74 μmol, 1 eq) and anhydrous magnesium chloride (35.68 mg, 374.80 μmol, 15.38 μL, 20 eq) were slowly added, and the reaction mixture was stirred continuously at 25° C. for 3 hours under the protection of nitrogen. The reaction mixture was concentrated under reduced pressure to obtain a crude product, and the crude product was purified by preparative reversed-phase liquid chromatography (separation column: Phenomenex Gemini-NX C18 75*30 mm*3 m; mobile phase: [H$_2$O (0.225% FA)-ACN]; ACN %: 25%-55%, 7 min) to obtain compound 3A. The compound was observed by NMR to have two conformers with a ratio of about 1:1. MS (ESI, m/z): 444.2 [M+1]; ee value: 100%.

$^1$H NMR (400 MHz, CD$_3$OD) δ=7.45-7.32 (m, 5H), 7.32-7.27 (m, 3H), 7.24-7.10 (m, 8H), 7.10-6.97 (m, 3H), 6.62 (d, J=7.5 Hz, 1H), 6.28 (d, J=7.5 Hz, 1H), 5.89 (s, 1H), 5.67 (d, J=7.5 Hz, 1H), 5.43-5.23 (m, 1H), 5.08-4.98 (m, 2H), 4.59 (br t, J=11.5 Hz, 1H), 4.33 (br s, 2H), 4.23 (br d, J=11.3 Hz, 1H), 4.11 (br s, 1H), 3.87 (br t, J=8.4 Hz, 1H), 3.28-3.15 (m, 1H), 3.07 (quin, J=10.0 Hz, 1H), 2.11-1.98 (m, 8H), 1.63-1.50 (m, 6H).

Step 9: Synthesis of Compound 3B

Dichloromethane (1 mL) was added to a round bottom flask at 25° C., then 3gb (10.00 mg, 18.74 μmol, 1 eq) and anhydrous magnesium chloride (35.68 mg, 374.80 μmol, 15.38 μL, 20 eq) were slowly added, and the reaction mixture was stirred continuously at 25° C. for 3 hours under the protection of nitrogen. The reaction mixture was concentrated under reduced pressure to obtain a crude product, and the crude product was purified by preparative reversed-phase liquid chromatography (separation column: Phenomenex Gemini-NX C18 75 mm*30 mm*3 μm; mobile phase: [H$_2$O (0.225% FA)-ACN]; ACN %: 25%-55%, 7 min) to obtain compound 3B. The compound was observed by NMR to have two conformers with a ratio of about 1:1. MS (ESI, m/z): 444.2 [M+1]; ee value: 98.15%.

$^1$H NMR (400 MHz, CD$_3$OD) δ=7.46-7.32 (m, 5H), 7.32-7.27 (m, 3H), 7.24-7.10 (m, 8H), 7.10-6.97 (m, 3H), 6.62 (d, J=7.5 Hz, 1H), 6.27 (d, J=7.8 Hz, 1H), 5.88 (s, 1H), 5.67 (d, J=7.5 Hz, 1H), 5.32 (dd, J=7.8, 11.0 Hz, 1H), 5.09-4.96 (m, 2H), 4.59 (br t, J=11.8 Hz, 1H), 4.39-4.19 (m, 3H), 4.10 (br s, 1H), 3.94-3.76 (m, 1H), 3.30-2.96 (m, 2H), 2.09-1.99 (m, 8H), 1.62-1.51 (m, 6H).

Embodiment 4

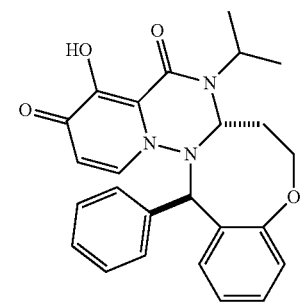

4A

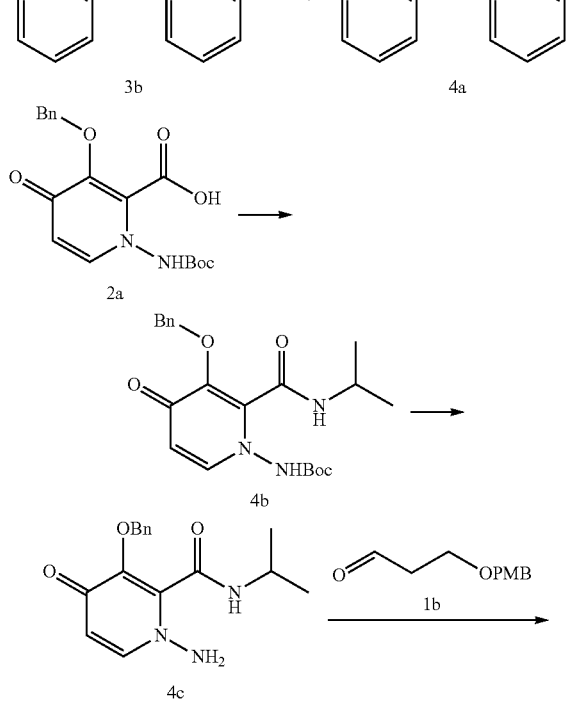

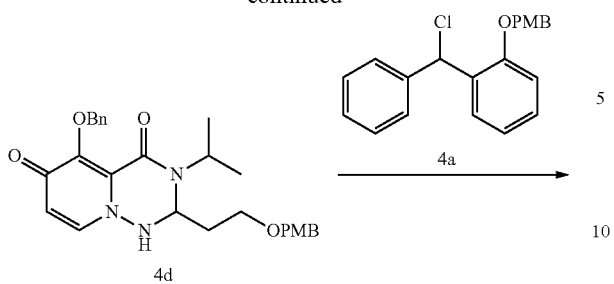
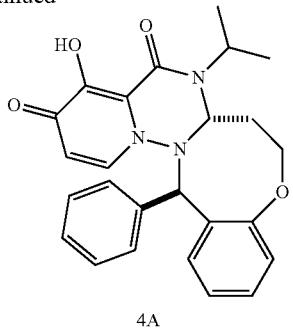

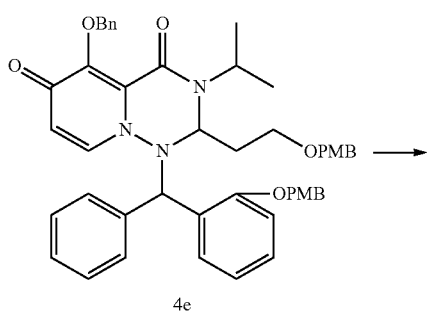

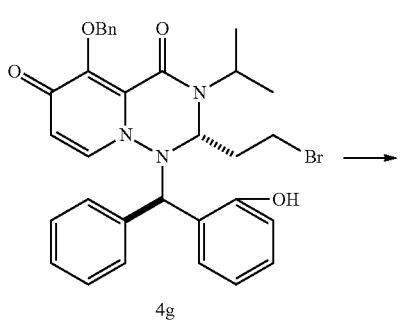

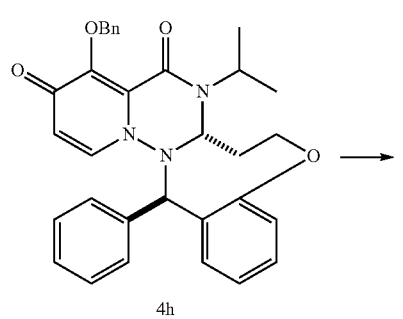

4A

Step 1: Synthesis of Compound 4a 3b (4.3 g, 13.42 mmol, 1 eq) and 2,6-di-tert-butyl-4-methylpyridine (13.78 g, 67.11 mmol, 5 eq) were dissolved in dichloromethane (140 mL), then thionyl chloride (4.79 g, 40.26 mmol, 2.92 mL, 3 eq) was added thereto under the protection of nitrogen, and the reaction mixture was stirred at 25° C. for 1 hour. The reaction mixture was directly concentrated to obtain compound 4a. The crude product was used directly in the next step.

$^1$H NMR (400 MHz, CDCl$_3$) δ=7.54 (dd, J=1.5, 7.8 Hz, 1H), 7.39-7.34 (m, 2H), 7.31-7.25 (m, 4H), 7.24 (s, 1H), 7.20 (d, J=8.5 Hz, 2H), 6.97 (t, J=7.5 Hz, 1H), 6.89-6.84 (m, 2H), 6.58 (s, 1H), 5.03-4.92 (m, 2H), 3.80 (s, 3H).

Step 2: Synthesis of Compound 4b 2a (10 g, 27.75 mmol, 1 eq) was added to DMF (100 mL), then EDCI (7.98 g, 41.62 mmol, 1.5 eq), HOBt (3.75 g, 27.75 mmol, 1 eq) and isopropylamine (2.46 g, 41.62 mmol, 3.58 mL, 1.5 eq) were added successively. The reaction mixture was reacted at 60° C. for 12 hours. The reaction mixture was extracted 5 times with dichloromethane (30 mL), and the organic phases were combined and washed with saturated brine (30 mL). The organic phase was concentrated under reduced pressure, slurried with a mixture of ethyl acetate:petroleum ether at 20° C. to obtain compound 4b.

$^1$H NMR (400 MHz, CD$_3$OD) δ=7.71 (d, J=7.8 Hz, 1H), 7.53-7.40 (m, 2H), 7.42-7.23 (m, 1H), 6.49 (d, J=7.8 Hz, 1H), 5.16 (s, 2H), 4.18-3.93 (m, 1H), 1.51 (s, 9H), 1.13 (d, J=6.6 Hz, 6H).

Step 3: Synthesis of the Hydrochloride of Compound 4c 4b (6.7 g, 16.69 mmol, 1 eq) was added to ethyl acetate (65 mL), then a solution of hydrochloric acid in ethyl acetate (4 M, 65 mL, 14.32 eq) was added, and the reaction mixture was reacted at 25° C. for 12 hours. The reaction mixture was concentrated under reduced pressure to remove the solvent to obtain the hydrochloride of compound 4c, which was used directly in the next step without purification.

$^1$H NMR (400 MHz, CD$_3$OD) δ=8.40 (dd, J=2.0, 7.3 Hz, 1H), 7.50-7.44 (m, 2H), 7.43-7.36 (m, 3H), 7.31 (dd, J=2.3, 7.1 Hz, 1H), 5.25 (s, 2H), 4.24-4.06 (m, 1H), 1.20 (d, J=6.6 Hz, 6H).

Step 4: Synthesis of Compound 4d

The hydrochloride of 4c (3.5 g, 10.36 mmol, 1 eq) was suspended in acetonitrile (50 mL), then potassium carbonate (5.73 g, 10.36 mmol, 4 eq) and 1b (2.41 g, 12.43 mmol, 1.2 eq) were added thereto, and the reaction mixture was stirred at 25° C. for 14 hours. The reaction mixture was slowly poured into water (100 mL), and then extracted with ethyl acetate (100 mL×2). The organic phases were combined, washed with water (100 mL) and saturated brine (100 mL) successively, dried over anhydrous sodium sulfate and concentrated to obtain a crude product. The crude product was purified by silica gel column chromatography (dichloromethane/methanol=100:0-95:5) to obtain compound 4d.

$^1$H NMR (400 MHz, CDCl$_3$) δ=7.46-7.40 (m, 2H), 7.28-7.21 (m, 6H), 6.90 (d, J=8.5 Hz, 2H), 6.27 (d, J=7.5 Hz, 1H), 5.92 (s, 1H), 5.48 (d, J=10.8 Hz, 1H), 5.16 (d, J=10.8 Hz, 1H), 4.65 (br d, J=10.3 Hz, 1H), 4.49 (td, J=6.8, 13.6 Hz, 1H), 4.41 (s, 2H), 3.82 (s, 3H), 3.44-3.36 (m, 1H), 3.35-3.27 (m, 1H), 1.60-1.48 (m, 1H), 1.26 (d, J=6.8 Hz, 3H), 1.19 (br d, J=7.0 Hz, 4H).

Step 5: Synthesis of Compound 4e 4d (3.20 g, 6.70 mmol, 1 eq) and 4a (19 g, 13.46 mmol, purity: 24%, 2.01 eq) were dissolved in acetonitrile (270 mL), then cesium carbonate (6.55 g, 20.10 mmol, 3 eq) was added thereto, and the reaction mixture was stirred at 40° C. for 12 hours under the protection of nitrogen. Cesium carbonate (2.18 g, 6.70 mmol, 1 eq) was added, and the reaction mixture was stirred at 40° C. for 10 hours under the protection of nitrogen. The reaction mixture was filtered, then the filter cake was washed with ethyl acetate (50 mL×2), and the filtrate was combined and concentrated. The concentrated filtrate was dissolved in ethyl acetate (200 mL), washed with saturated brine (150 mL×2), dried over anhydrous sodium sulfate and concentrated to obtain a crude product. The crude product was purified by silica gel column chromatography (dichloromethane/methanol=100:0-95:5) to obtain compound 4e.

Step 6: Synthesis of Compound 4f 4e (1.90 g, 2.44 mmol, 1 eq) was dissolved in methanol solution of hydrochloric acid (0.5 M, 19 mL, 3.90 eq) (4 mL of concentrated hydrochloric acid (37%) was measured and added to 92 mL of methanol, mixed well and 19 mL was used for the reaction), and the reaction mixture was stirred at 60° C. for 22 hours. Sodium bicarbonate was added to the reaction mixture until the pH of the solution to 8, and concentrated to obtain a crude product. The crude product was purified by silica gel column chromatography (dichloromethane/methanol=100:0-95:5) to obtain compound 4f.

Step 7: Synthesis of Compound 4g 4f (455 mg, 843.19 µmol, 1 eq) was dissolved in dichloromethane (5 mL), then triphenylphosphine (331.73 mg, 1.26 mmol, 1.5 eq) was added thereto, and the reaction mixture was stirred at 25° C. for 15 minutes. Carbon tetrabromide (419.43 mg, 1.26 mmol, 1.5 eq) was added, and the reaction mixture was stirred at 25° C. for 30 minutes under the protection of nitrogen, then triphenylphosphine (110.58 mg, 421.59 µmol, 0.5 eq) was added, and the reaction mixture was stirred at 25° C. for 1 hour under the protection of nitrogen. The reaction mixture was quenched with methanol (2 mL) and concentrated directly to obtain a crude product. The crude product was purified by silica gel column chromatography (dichloromethane/methanol=100: 0-95:5) to obtain compound 4g.

Step 8: Synthesis of Compound 4h 4g (60 mg, 99.58 µmol, 1 eq) was dissolved in acetonitrile (300 mL), then cesium carbonate (648.92 mg, 1.99 mmol, 20 eq) was added thereto, and the reaction mixture was stirred at 60° C. for 18 hours. The reaction mixture was filtered, then the filter cake was washed with acetonitrile (30 mL×3), and the filtrate was combined and concentrated to obtain a crude product. The crude product was purified by preparative thin-layer chromatography (dichloromethane/methanol=20:1) to obtain compound 4h.

Step 9: Synthesis of Compound 4A 4h (8 mg, 15.34 µmol, 1 eq) was dissolved in dichloromethane (2 mL), then magnesium chloride (29.21 mg, 306.75 µmol, 12.59 µL, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75*30 mm*3 µm; mobile phase: [H$_2$O (0.225% FA)-ACN]; ACN %: 30%-60%, 7 min) to obtain compound 4A. The compound was observed by NMR to have two conformers with a ratio of about 3:1. MS (ESI, m/z): 432.2 [M+1];

$^1$H NMR (400 MHz, CD$_3$OD) δ=7.83 (d, J=7.5 Hz, 1H (major conformation, minor conformation)), 7.52-7.11 (m, 8H (major conformation, minor conformation)), 7.11-7.06 (m, 1H (major conformation)), 6.97 (d, J=7.5 Hz, 1H (major conformation)), 6.96-6.92 (m, 1H (minor conformation)), 6.34 (s, 1H (minor conformation)), 6.30 (d, J=7.5 Hz, 1H (minor conformation)), 5.71 (d, J=7.5 Hz, 1H (major conformation)), 5.60 (dd, J=7.5, 11.0 Hz, 1H (major conformation)), 5.23 (s, 1H (major conformation)), 4.66-4.64 (m, 1H (minor conformation)), 4.62-4.59 (m, 2H (major conformation)), 4.43-4.35 (m, 1H (minor conformation)), 4.27-4.22 (m, 1H (major conformation)), 3.72 (br s, 2H (minor conformation)), 2.40-1.96 (m, 2H (major conformation, minor conformation)), 1.55-1.42 (m, 6H (major conformation)), 1.05 (d, J=6.8 Hz, 3H (minor conformation)), 0.86 (d, J=6.8 Hz, 3H (minor conformation)).

Embodiment 5

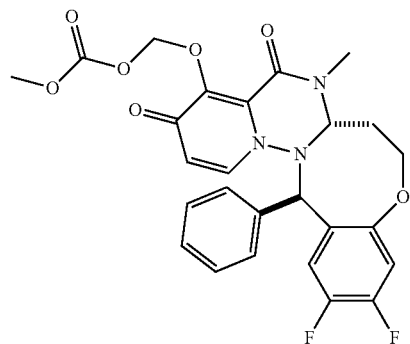

5A

Synthetic Route:

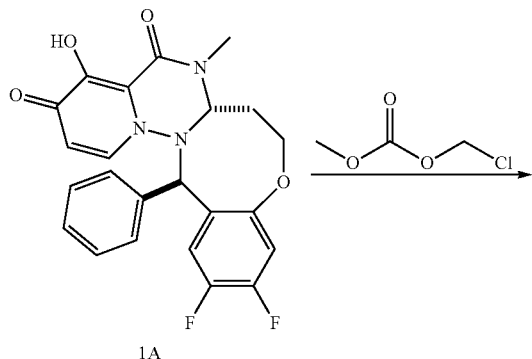

Step 1: Synthesis of Compound 5A 1A (12 mg, 27.31 μmol, 1 eq) was dissolved in DMA (0.5 mL), then potassium carbonate (7.55 mg, 54.62 μmol, 2 eq), potassium iodide (4.53 mg, 27.31 μmol, 1 eq) and chloromethyl methyl carbonate (9.81 mg, 78.80 μmol, 2 eq) were added thereto, and the reaction mixture was stirred at 70° C. for 3 hours. Chloromethyl methyl carbonate (34.01 mg, 273.10 μmol, 26.16 μL, 10 eq) was added, and the reaction mixture was stirred for 1.5 hours, then potassium carbonate (37.74 mg, 273.10 μmol, 10 eq) was added. The reaction mixture was stirred for 15 hours, then chloromethyl methyl carbonate (68.01 mg, 546.20 μmol, 52.32 μL, 20 eq) was added, and the reaction mixture was stirred for 1 hour to complete the reaction. The reaction mixture was cooled to room temperature, added with water (2 mL), and then extracted with ethyl acetate (4 mL×2). The organic phase was washed twice with saturated brine (2 mL×2), dried over anhydrous sodium sulfate and concentrated to obtain a crude product. The crude product was purified by silica gel column chromatography (dichloromethane/methanol=100:0-95:5) to obtain compound 5A. MS (ESI, m/z): 528.1 [M+1];

$^1$H NMR (400 MHz, CDCl$_3$) δ=7.25-7.09 (m, 5H), 6.96 (dd, J=7.2, 10.4 Hz, 1H), 6.86-6.78 (m, 1H), 6.69 (d, J=7.8 Hz, 1H), 6.00 (d, J=6.3 Hz, 1H), 5.79 (dd, J=4.1, 7.2 Hz, 2H), 5.34 (br dd, J=6.9, 11.2 Hz, 1H), 5.06 (s, 1H), 4.57 (br t, J=11.9 Hz, 1H), 4.20 (br d, J=11.5 Hz, 1H), 3.90 (s, 3H), 3.07 (s, 3H), 2.26-2.13 (m, 2H);

$^{19}$F NMR (376 MHz, CDCl$_3$) δ=−133.11−−134.54 (m, 1F), −138.71−−140.65 (m, 1F).

Embodiment 6

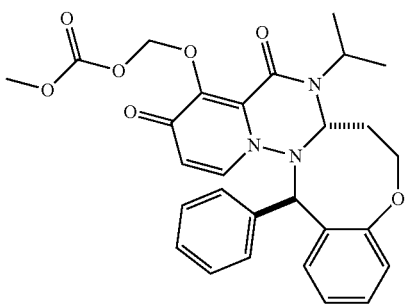

Synthetic Route:

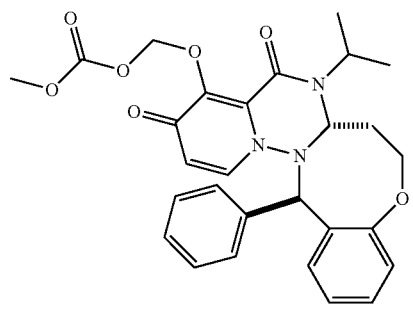

Step 1: Synthesis of Compound 6A 4A (17 mg, 39.40 μmol, 1 eq) was dissolved in DMA (1 mL), then chloromethyl methyl carbonate (9.81 mg, 78.80 μmol, 2 eq), potassium carbonate (10.89 mg, 78.80 μmol, 2 eq) and potassium iodide (6.54 mg, 39.40 μmol, 1 eq) were added thereto, and the reaction mixture was stirred at 70° C. for 3 hours. The reaction mixture was cooled to room temperature, added with water (10 mL), and then extracted with ethyl acetate (20 mL×2). The organic phase was washed with water (20 mL) and saturated brine (20 mL×3), dried over anhydrous sodium sulfate and concentrated to obtain a crude product. The crude product was purified by silica gel column chromatography (dichloromethane/methanol=100:0-95:5) to obtain compound 6A. The compound was observed by NMR to have two conformers with a ratio of about 3:2. MS (ESI, m/z): 520.3 [M+1];

$^1$H NMR (400 MHz, CDCl$_3$) δ=7.59-7.01 (m, 9H (major conformation, minor conformation)), 6.84 (br s, 1H (minor conformation)), 6.69 (d, J=7.8 Hz, 1H (major conformation)), 6.36 (d, J=7.9 Hz, 1H (minor conformation)), 6.04 (br s, 1H (minor conformation)), 6.02 (d, J=6.5 Hz, 1H (minor conformation)), 5.97 (d, J=6.5 Hz, 1H (major conformation)), 5.88 (d, J=6.4 Hz, 1H (minor conformation)), 5.80 (dd, J=5.8, 7.0 Hz, 2H (major conformation)), 5.35 (dd, J=7.3, 11.3 Hz, 1H (major conformation)), 5.14 (s, 1H (major conformation)), 4.70-4.30 (m, 2H (major conformation, minor conformation)), 4.27-4.20 (m, 1H (major conformation)), 4.15-4.00 (m, 1H (minor conformation)), 3.85 (s, 3H (major conformation, minor conformation)), 3.70-3.55 (m, 1H (minor conformation)), 2.54-1.92 (m, 2H (major conformation, minor conformation)), 1.45 (dd, J=6.8, 10.6 Hz, 6H (major conformation)), 0.91 (d, J=7.0 Hz, 3H (minor conformation)), 0.76 (br d, J=6.3 Hz, 3H (minor conformation)).

Embodiment 7

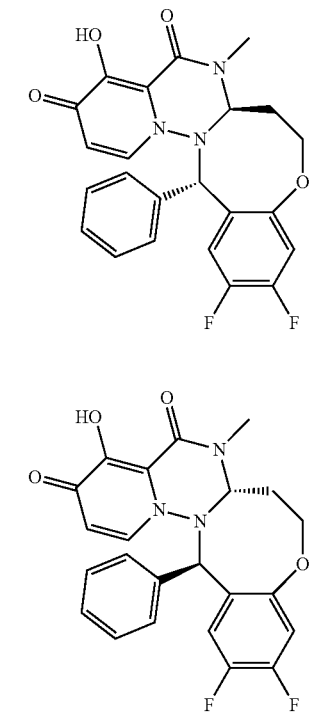

7A or 7B 7B or 7A

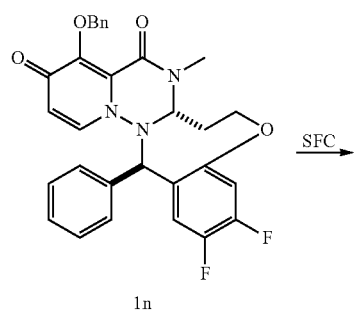

1n

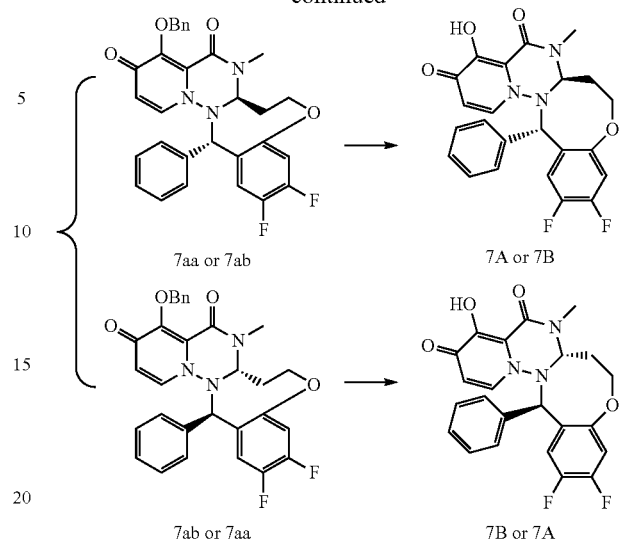

7aa or 7ab → 7A or 7B

7ab or 7aa → 7B or 7A

Step 1: Synthesis of Compounds 7aa and 7ab

Compound 1n was separated by SFC (separation column: DAICEL CHIRALPAK AS (250 mm*30 mm, 10 m); mobile phase: A [CO₂]; B (0.1% NH₃H₂O EtOH) %: 5%-40%) to obtain compound 7aa (retention time: 3.711 min) and 7ab (retention time: 4.859 min).

7aa: MS (ESI, m/z): 530.3 [M+1]; ee value: 100%
$^1$H NMR (400 MHz, CDCl$_3$) δ=7.68-7.60 (m, 2H), 7.41-7.28 (m, 3H), 7.23-6.86 (m, 6H), 6.78 (dd, J=8.7, 10.4 Hz, 1H), 6.59 (d, J=7.8 Hz, 1H), 5.70 (d, J=8.0 Hz, 1H), 5.45-5.33 (m, 2H), 5.16 (dd, J=7.0, 11.3 Hz, 1H), 4.92 (s, 1H), 4.50 (t, J=11.7 Hz, 1H), 4.10 (td, J=2.9, 11.4 Hz, 1H), 2.98 (s, 3H), 2.12-1.97 (m, 1H), 1.87-1.79 (m, 1H).

7ab: MS (ESI, m/z): 530.3 [M+1]; ee value: 100%
$^1$H NMR (400 MHz, CDCl$_3$) δ=7.64 (d, J=6.8 Hz, 2H), 7.41-7.28 (m, 3H), 7.24-6.87 (m, 6H), 6.77 (dd, J=8.7, 10.4 Hz, 1H), 6.60 (d, J=7.8 Hz, 1H), 5.71 (d, J=7.8 Hz, 1H), 5.43-5.31 (m, 2H), 5.16 (dd, J=7.0, 11.3 Hz, 1H), 4.92 (s, 1H), 4.50 (t, J=11.7 Hz, 1H), 4.09 (td, J=2.7, 11.4 Hz, 1H), 2.98 (s, 3H), 2.11-1.97 (m, 1H), 1.82 (br d, J=7.0 Hz, 1H).

Step 2: Synthesis of Compounds 7A and 7B

7aa (61 mg, 115.20 μmol, 1 eq) was dissolved in dichloromethane (5 mL), then anhydrous magnesium chloride (150 mg, 1.58 mmol, 13.68 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75 mm*30 mm*3 μm; mobile phase: [H₂O (0.225% FA)-ACN]; ACN %: 25%-55%, 7 min) to obtain compound 7A. MS (ESI, m/z): 440.2 [M+1]; ee value: 100%
$^1$H NMR (400 MHz, CD$_3$OD) δ=7.21 (br s, 5H), 7.13-7.06 (m, 2H), 6.99 (d, J=7.5 Hz, 1H), 5.68 (d, J=7.5 Hz, 1H), 5.54 (t, J=9.2 Hz, 1H), 5.39 (s, 1H), 4.61 (td, J=7.2, 11.5 Hz, 1H), 4.22 (td, J=2.8, 11.4 Hz, 1H), 3.11 (s, 3H), 2.24-2.15 (m, 2H).

7ab (58 mg, 109.53 μmol, 1 eq) was dissolved in dichloromethane (2 mL), then anhydrous magnesium chloride (208.57 mg, 2.19 mmol, 20 eq) was added thereto, and the reaction mixture was stirred at 25° C. for 3 hours. The reaction mixture was directly concentrated to obtain a crude product. The crude product was purified by preparative reversed-phase liquid chromatography (separation column: Phenomenex Gemini-NX C18 75 mm*30 mm*3 μm; mobile phase: [H₂O (0.225% FA)-ACN]; ACN %: 25%-55%, 7 min) to obtain compound 7B. MS (ESI, m/z): 440.2 [M+1]; ee value: 100%

$^1$H NMR (400 MHz, CD₃OD) δ=7.48-6.83 (m, 8H), 5.85-5.23 (m, 3H), 4.65 (br s, 1H), 4.27 (br d, J=10.0 Hz, 1H), 3.31-3.04 (m, 3H), 2.40-1.98 (m, 2H).

Embodiment 8

Synthetic Route:

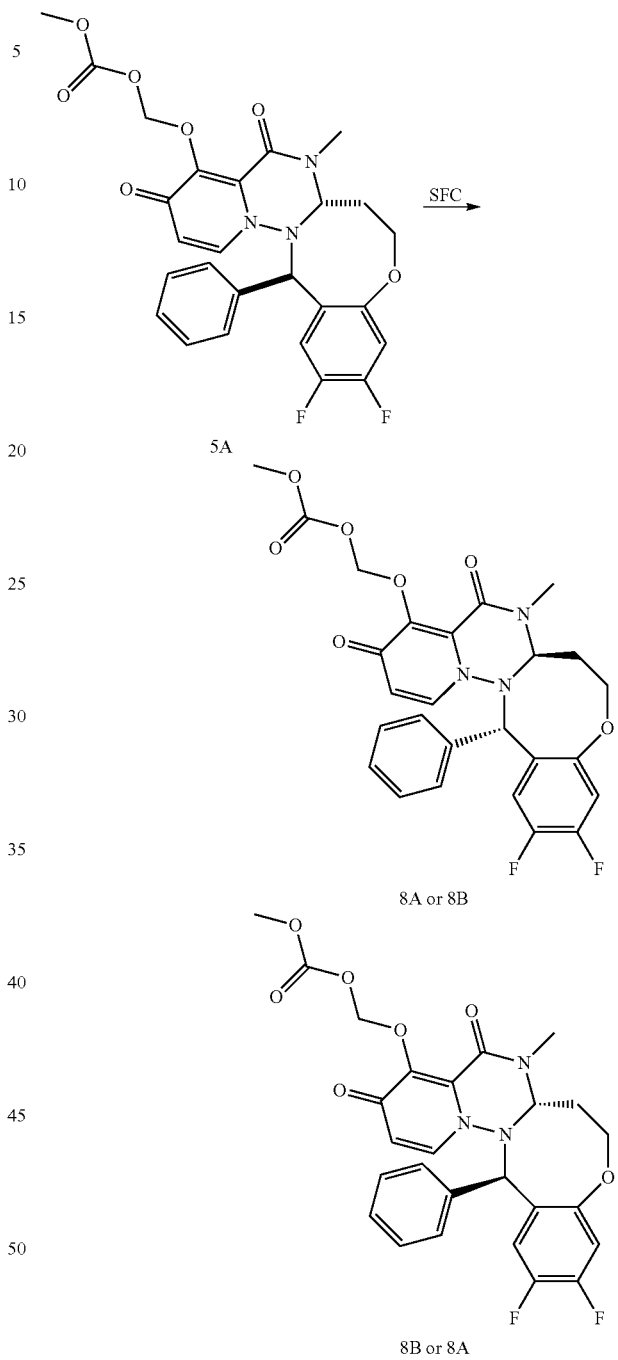

Step 1: Synthesis of Compounds 8A and 8B

Compound 5A was separated by SFC (separation column: DAICEL CHIRALCEL OJ-H (250 mm*30 mm, 5 m); mobile phase: A [CO₂]; B (Neu-EtOH) %: 15%-15%, min) to obtain compound 2A (retention time: 2.218 min) and 2B (retention time: 2.490 min).

8A: MS (ESI, m/z): 528.2 [M+1]; ee value: 99.44%.

$^1$H NMR (400 MHz, CDCl₃) δ=7.22 (br d, J=2.5 Hz, 3H), 7.15 (br s, 2H), 6.96 (dd, J=7.0, 10.3 Hz, 1H), 6.82 (dd, J=8.5, 10.5 Hz, 1H), 6.69 (d, J=7.8 Hz, 1H), 5.99 (d, J=6.5

Hz, 1H), 5.79 (d, J=3.0 Hz, 1H), 5.77 (d, J=1.8 Hz, 1H), 5.36 (dd, J=7.0, 11.3 Hz, 1H), 5.06 (s, 1H), 4.58 (t, J=11.4 Hz, 1H), 4.20 (td, J=2.9, 11.5 Hz, 1H), 3.89 (s, 3H), 3.07 (s, 3H), 2.25-2.12 (m, 1H), 2.09-2.00 (m, 1H).
8B: MS (ESI, m/z): 528.2 [M+1]; ee value: 97.90%.
$^1$H NMR (400 MHz, CDCl$_3$) δ=7.22 (br s, 3H), 7.15 (br s, 2H), 6.96 (dd, J=7.0, 10.3 Hz, 1H), 6.82 (dd, J=8.8, 10.3 Hz, 1H), 6.69 (d, J=7.8 Hz, 1H), 5.99 (d, J=6.3 Hz, 1H), 5.79 (dd, J=3.3, 7.0 Hz, 2H), 5.35 (dd, J=6.9, 11.4 Hz, 1H), 5.06 (s, 1H), 4.58 (t, J=11.4 Hz, 1H), 4.24-4.16 (m, 1H), 3.90 (s, 3H), 3.07 (s, 3H), 2.27-2.14 (m, 1H), 2.09-2.01 (m, 1H).
Embodiment 9
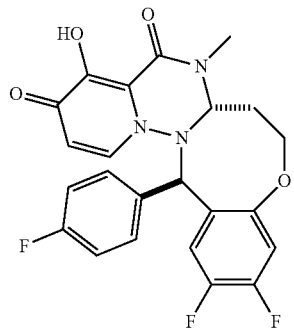
9A
Synthetic Route:
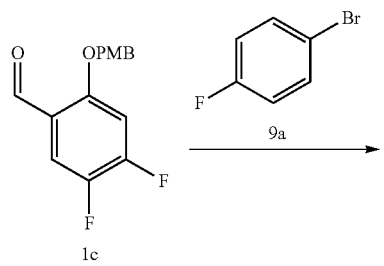
1c
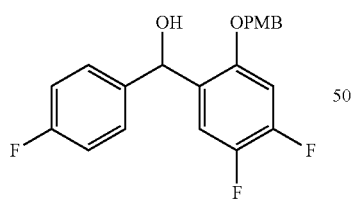
9b
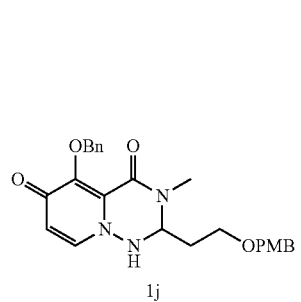
1j
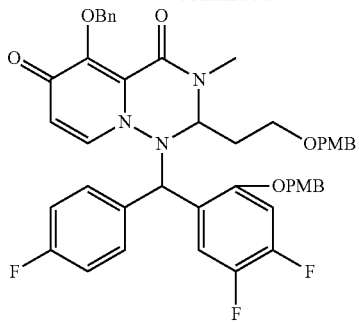
9c
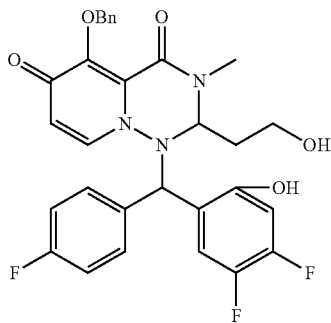
9d
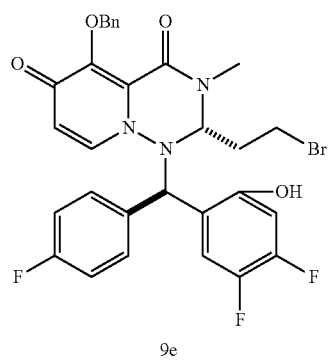
9e
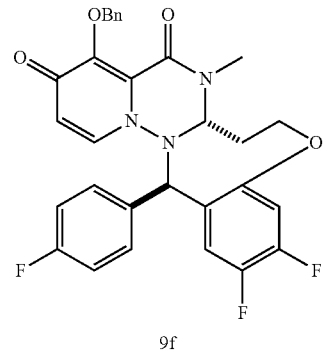
9f -continued

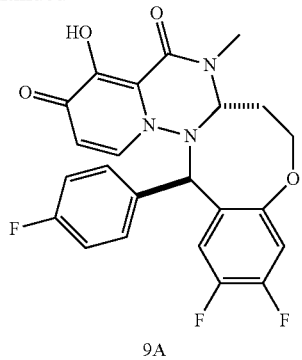

9A

Step 1: Synthesis of Compound 9b

Magnesium powder (3.89 g, 160.00 mmol, 1 eq) was added to a 250 mL three-necked flask, and the system was replaced with nitrogen three times, then iodine (406.10 mg, 1.60 mmol, 322.30 μL, 0.01 eq) was added under the protection of nitrogen, heated until the iodine was evenly covered with magnesium powder. The heating was stopped, then tetrahydrofuran (160 mL) and 9a (3 g, 17.14 mmol, 1.89 mL, 1 eq) were added, heated to 75° C. to initiate the reaction, and the reaction temperature was lowered to 70° C. 9a (25 g, 142.86 mmol, 15.72 mL, 1 eq) was slowly added dropwise thereto, and after the dropwise addition was completed, the reaction mixture was stirred at 70° C. for 2 hours, cooled to room temperature. The supernatant liquid (0.89 M, 120.13 mL, 2.97 eq) was taken from the above reaction mixture, and a solution of 1c (10.0 g, 35.94 mmol, 1 eq) dissolved in tetrahydrofuran (100 mL) was slowly added dropwise at 0° C. (for 1.5 hours). After the dropwise addition was completed, and the reaction mixture was stirred at 25° C. for 2 hours. The reaction mixture was quenched with saturated ammonium chloride aqueous solution (150 mL), then extracted with ethyl acetate (3×200 mL) to obtain the organic phase, and the organic phase was dried over anhydrous sodium sulfate and concentrated under reduced pressure to obtain a crude product. The crude product was purified by silica gel column chromatography (petroleum ether/ethyl acetate=1:0-6:1) to obtain compound 9b.

$^1$H NMR (400 MHz, CDCl$_3$) δ=7.37-7.28 (m, 3H), 7.20 (d, J=8.8 Hz, 2H), 7.11-7.02 (m, 2H), 6.99-6.92 (m, 2H), 6.83 (dd, J=6.5, 11.8 Hz, 1H), 6.03 (d, J=4.8 Hz, 1H), 4.96 (s, 2H), 3.90 (s, 3H), 2.67 (d, J=4.8 Hz, 1H).

Step 2: Synthesis of Compound 9c 1j (4.9 g, 10.90 mmol, 1 eq) and 9b (4.08 g, 10.90 mmol, 1 eq) were dissolved in ethyl acetate (120 mL), then a solution of T$_3$P in ethyl acetate (13.87 g, 21.80 mmol, 12.97 mL, concentration: 50%, 2 eq) was added, and the reaction mixture was stirred at 75° C. for 5 hours. 9b (4.08 g, 10.90 mmol, 1 eq) and a solution of T$_3$P in ethyl acetate (6.94 g, 10.90 mmol, 6.48 mL, concentration: 50%, 1 eq) were added, and the reaction mixture was stirred for 14 hours. 9b (4.08 g, 10.90 mmol, 1 eq) was added, and the reaction mixture was stirred for 6 hours. The reaction mixture was cooled to 20° C., diluted with ethyl acetate (200 mL), then washed with water (2×300 mL) and saturated brine (3×300 mL) successively, and the organic phase was dried over anhydrous sodium sulfate and concentrated to obtain a crude product. The crude product was purified by silica gel column chromatography (dichloromethane/methanol=1:0-10:1) to obtain compound 9c.

Step 3: Synthesis of Compound 9d 9c (9.3 g, 11.54 mmol, 1 eq) was dissolved in methanol solution of hydrochloric acid (1 M, 10 mL, 3.91 eq) (10 mL of concentrated hydrochloric acid (37%) was measured and added to 110 mL of methanol, mixed well and 93 mL was used for the reaction), and the reaction mixture was stirred at 70° C. for 6 hours. The reaction mixture was cooled to 20° C., then saturated sodium bicarbonate aqueous solution was added to adjust pH to 8, and the mixture was extracted with dichloromethane/methanol (10:1, 100 mL×4). The organic phases were combined, dried over anhydrous sodium sulfate and concentrated to obtain a crude product. The crude product was purified by silica gel column chromatography (dichloromethane/methanol=1:0-10:1) to obtain compound 9d.

$^1$H NMR (400 MHz, CD$_3$OD) δ=7.61 (dd, J=5.3, 8.6 Hz, 2H), 7.41-7.32 (m, 3H), 7.30-7.24 (m, 3H), 7.20 (t, J=8.7 Hz, 2H), 7.12 (dd, J=9.1, 11.4 Hz, 1H), 6.50 (dd, J=6.9, 11.8 Hz, 1H), 6.09 (d, J=7.6 Hz, 1H), 5.89 (s, 1H), 5.33 (d, J=10.8 Hz, 1H), 5.14 (d, J=10.8 Hz, 1H), 4.61-4.55 (m, 1H), 3.63-3.55 (m, 1H), 3.43 (td, J=5.5, 11.0 Hz, 1H), 2.95 (s, 3H), 1.41-1.31 (m, 1H), 1.29-1.18 (m, 1H).

Step 4: Synthesis of Compound 9e 9d (1.00 g, 1.77 mmol, 1 eq) was dissolved in dichloromethane (20 mL), then triphenylphosphine (695.68 mg, 2.65 mmol, 1.5 eq) was added thereto, and the reaction mixture was stirred at 25° C. for 15 minutes. Carbon tetrabromide (879.59 mg, 2.65 mmol, 1.5 eq) was added, and the reaction mixture was stirred at 25° C. for 12 hours under the protection of nitrogen. The reaction mixture was quenched with methanol (10 mL) and concentrated directly to obtain a crude product. The crude product was purified by silica gel column chromatography (dichloromethane/methanol=1:0-20:1) to obtain compound 9e.

$^1$H NMR (400 MHz, CDCl$_3$) δ=9.49 (br s, 1H), 7.50 (dd, J=5.2, 8.4 Hz, 2H), 7.36-7.31 (m, 2H), 7.25-7.20 (m, 3H), 7.16 (t, J=8.5 Hz, 2H), 6.97-6.77 (m, 3H), 6.08 (d, J=7.6 Hz, 1H), 5.82 (br s, 1H), 5.35 (d, J=11.1 Hz, 1H), 5.10 (d, J=11.1 Hz, 1H), 4.53 (dd, J=5.6, 8.0 Hz, 1H), 3.35-3.17 (m, 2H), 2.99 (s, 3H), 1.64-1.52 (m, 2H).

Step 5: Synthesis of Compound 9f

Cesium carbonate (554.75 mg, 1.70 mmol, 2.14 eq) was dissolved in acetonitrile (50 mL), and the system was heated to 80° C., then ⅕ of a solution of 9e (500 mg, 795.63 μmol, 1 eq) dissolved in acetonitrile (50 mL) was added every 5 minutes (for 2 hours). The addition was completed, and the reaction mixture was stirred at 80° C. for 1.5 hours. The reaction mixture was cooled to room temperature, added with water (50 mL), and then extracted with dichloromethane (3×100 mL). The organic phases were combined, dried over anhydrous sodium sulfate and concentrated to obtain a crude product. The crude product was purified by silica gel column chromatography (dichloromethane/methanol=1:0-20:1) to obtain compound 9f.

$^1$H NMR (400 MHz, CDCl$_3$) δ=7.67-7.58 (m, 2H), 7.42-7.28 (m, 3H), 7.16-6.74 (m, 6H), 6.58 (d, J=7.8 Hz, 1H), 5.79 (d, J=7.8 Hz, 1H), 5.52-5.38 (m, 2H), 5.13 (dd, J=7.3, 11.3 Hz, 1H), 4.91 (s, 1H), 4.51 (t, J=11.5 Hz, 1H), 4.19-4.11 (m, 1H), 3.01 (s, 3H), 2.14-2.01 (m, 1H), 1.97-1.87 (m, 1H).

Step 6: Synthesis of Compound 9A 9f (15 mg, 27.40 μmol, 1 eq) was dissolved in dichloromethane (1 mL), then anhydrous magnesium chloride (52.17 mg, 547.92 μmol, 22.49 μL, 20 eq) was added thereto, and the reaction mixture was stirred at 25° C. for 4 hours. The reaction mixture was directly concentrated to obtain a crude product. The crude product was purified by preparative reversed-phase liquid chromatography (separation column: Phenomenex Gemini-NX C18 75 mm*30 mm*3 μm; mobile phase: [H₂O (0.225% FA)-ACN]; ACN %: 30%-60%, 7 min) to obtain compound 9A. MS (ESI, m/z): 458.1 [M+1];

¹H NMR (400 MHz, DMSO-d6) δ=7.45 (dd, J=9.2, 11.4 Hz, 1H), 7.30 (br dd, J=7.5, 11.3 Hz, 3H), 7.05 (br t, J=8.5 Hz, 2H), 6.81 (d, J=7.8 Hz, 1H), 5.56-5.47 (m, 2H), 5.45 (s, 1H), 4.54 (br t, J=11.8 Hz, 1H), 4.15 (br d, J=11.0 Hz, 1H), 2.96 (s, 3H), 2.16 (br dd, J=7.0, 16.3 Hz, 1H), 2.00-1.86 (m, 1H);

¹⁹F NMR (377 MHz, DMSO-d6) δ=-113.45 (s, 1F), -136.18 (br d, J=20.8 Hz, 1F), -142.04--142.15 (m, 1F).

Embodiment 10

10A or 10B

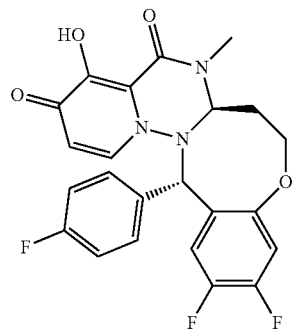

10B or 10A

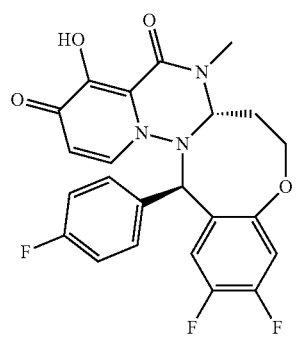

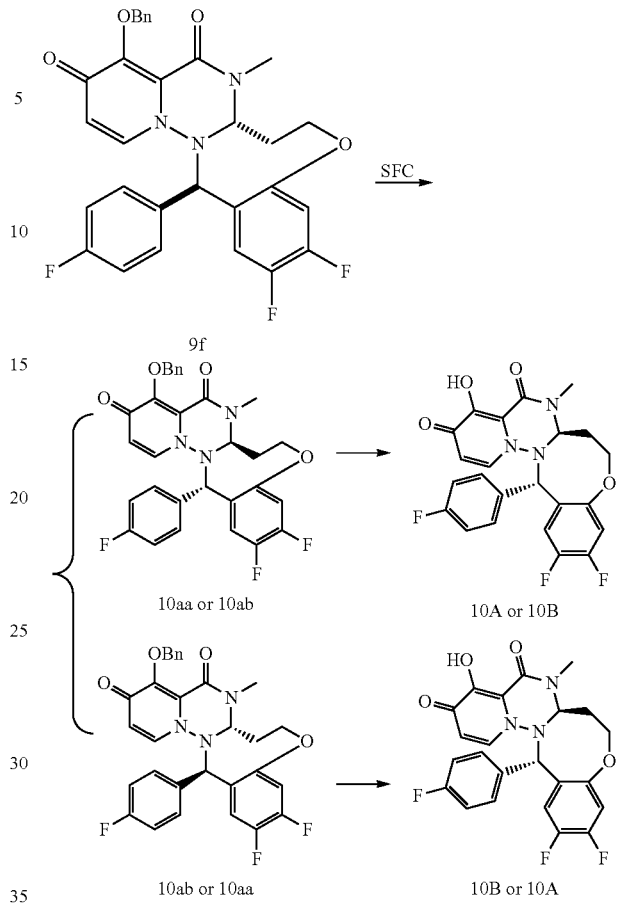

Step 1: Synthesis of Compounds 10aa and 10ab

Compound 9f was separated by SFC (separation column: DAICEL CHIRALPAK AS (250 mm*30 mm, 10 m); mobile phase: A [CO₂]; B (0.1% NH₃H₂O EtOH) %: 50%-50%) to obtain compound 10aa (retention time: 3.409 min) and 10ab (retention time: 4.496 min).

10aa: MS (ESI, m/z): 548.1 [M+1]; ee value: 100%

¹H NMR (400 MHz, CDCl₃) δ=7.68-7.56 (m, 2H1), 7.40-7.27 (m, 3H1), 7.23-6.62 (m, 5H1), 7.23-6.62 (m, 1H1), 6.57 (d, J=7.8 Hz, 1H1), 5.78 (d, J=7.8 Hz, 1H1), 5.55-5.33 (m, 2H1), 5.12 (dd, J=7.3, 11.3 Hz, 1H1), 4.90 (s, 1H1), 4.51 (t, J=11.4 Hz, 1H1), 4.14 (td, J=2.8, 11.5 Hz, 1H1), 2.99 (s, 3H1), 2.14-1.82 (m, 2H1)

10ab: MS (ESI, m/z): 548.1 [M+1]; ee value: 100%

¹H NMR (400 MHz, CDCl₃) δ=7.63 (d, J=6.8 Hz, 2H1), 7.41-7.30 (m, 3H1), 7.22-6.70 (m, 6H1), 6.58 (d, J=7.8 Hz, 1H1), 5.79 (d, J=7.8 Hz, 1H1), 5.55-5.40 (m, 2H1), 5.13 (dd, J=7.2, 11.4 Hz, 1H1), 4.92 (s, 1H1), 4.53 (t, J=11.7 Hz, 1H1), 4.19-4.12 (m, 1H1), 3.01 (s, 3H1), 2.15-2.02 (m, 1H), 1.92 (br dd, J=7.2, 15.4 Hz, 1H).

Step 2: Synthesis of Compounds 10A and 10B

10aa (150 mg, 273.96 μmol, 1 eq) was dissolved in dichloromethane (2 mL), then anhydrous magnesium chloride (521.68 mg, 5.48 mmol, 20 eq) was added thereto, and the reaction mixture was stirred at 25° C. for 3 hours. The reaction mixture was directly concentrated to obtain a crude product. The crude product was purified by preparative reversed-phase liquid chromatography (separation column: Phenomenex Gemini-NX C18 75 mm*30 mm*3 µm; mobile phase: [H₂O (0.225% FA)-ACN]; ACN %: 30%-60%, 7 min) to obtain compound 10A. MS (ESI, m/z): 458.1 [M+1]; ee value: 100%

¹H NMR (400 MHz, CD₃OD) δ=7.25 (br s, 2H1), 7.16-7.07 (m, 2H1), 7.03 (d, J=7.5 Hz, 1H), 6.94 (br t, J=8.2 Hz, 2H), 5.77 (d, J=7.5 Hz, 1H), 5.54 (t, J=9.3 Hz, 1H), 5.41 (s, 1H), 4.67-4.53 (m, 1H), 4.22 (td, J=2.9, 11.5 Hz, 1H), 3.10 (s, 3H), 2.32-2.05 (m, 2H);

¹⁹F NMR (377 MHz, CD₃OD) δ=−114.42 (s, 1F), −135.98--138.84 (m, 1F), −142.46--145.14 (m, 1F).

10ab (166 mg, 303.18 µmol, 1 eq) was dissolved in dichloromethane (10 mL), then anhydrous magnesium chloride (577.32 mg, 6.06 mmol, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75 mm*30 mm*3 µm; mobile phase: [H₂O (0.225% FA)-ACN]; ACN %: 30%-60%, 7 min) to obtain compound 10B. MS (ESI, m/z): 458.1 [M+1]; ee value: 100%.

¹H NMR (400 MHz, CD₃OD) δ=7.39-7.08 (m, 4H), 7.03 (d, J=7.5 Hz, 1H), 6.95 (br t, J=8.2 Hz, 2H), 5.77 (d, J=7.5 Hz, 1H), 5.54 (t, J=9.3 Hz, 1H), 5.42 (s, 1H), 4.66-4.56 (m, 1H), 4.22 (td, J=2.9, 11.4 Hz, 1H), 3.10 (s, 3H), 2.22-2.13 (m, 2H);

¹⁹F NMR (377 MHz, CD₃OD) δ=−114.44 (s, 1F), −137.37--137.45 (m, 1F), −143.41--143.52 (m, 1F).

Embodiment 11

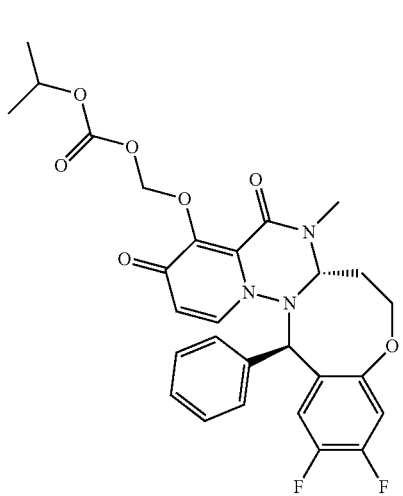

11A or 11B

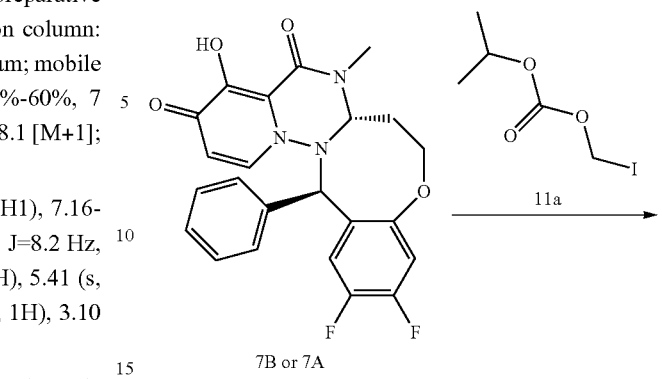

7B or 7A 11A or 11B

Step 1: Synthesis of Compound 11A

Compound 7B (7.5 mg, 17.07 µmol, 1 eq) was dissolved in acetone (0.5 mL), then cesium carbonate (27.81 mg, 85.34 µmol, 5 eq) and 11a (8.33 mg, 34.14 µmol, 2 eq) were added thereto, and the reaction mixture was stirred at 25° C. for 4 hours. The reaction mixture was filtered, and the filtrate was purified by a preparative silica gel plate (dichloromethane/methanol=15:1) to obtain compound 11A.

MS (ESI, m/z): 556.2 [M+1];

¹H NMR (400 MHz, CD₃OD) δ=7.39-7.17 (m, 5H), 7.13 (dd, J=7.3, 11.0 Hz, 1H), 7.08-7.01 (m, 2H), 5.85 (d, J=7.5 Hz, 1H), 5.78 (d, J=6.8 Hz, 1H), 5.67 (d, J=6.8 Hz, 1H), 5.52 (t, J=9.2 Hz, 1H), 5.21 (s, 1H), 4.95-4.91 (m, 1H), 4.60-4.56 (m, 1H), 4.28-4.19 (m, 1H), 3.07 (s, 3H), 2.21-2.17 (m, 2H), 1.35-1.33 (m, 6H).

Embodiment 12

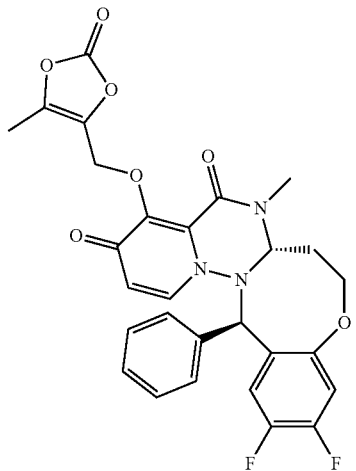

12A or 12B

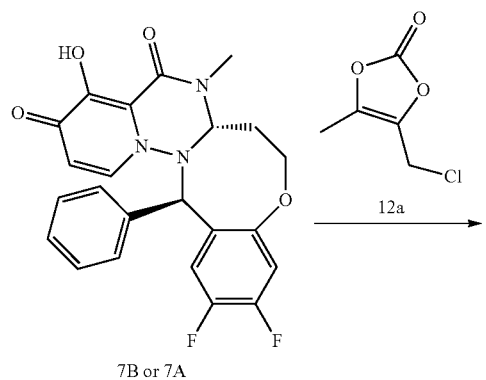

7B or 7A → 12a →

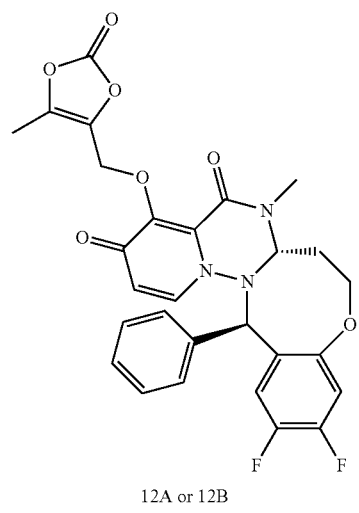

12A or 12B

Step 1: Synthesis of Compound 12A

Compound 7B (25 mg, 56.89 μmol, 1 eq) was dissolved in N,N-dimethylacetamide (1 mL), then potassium carbonate (15.73 mg, 113.79 μmol, 2 eq), potassium iodide (9.44 mg, 56.89 μmol, 1 eq) and 12a (16.90 mg, 113.79 μmol, 2 eq) were added thereto, and the reaction mixture was stirred at 70° C. for 3 hours. 12a (16.90 mg, 113.79 μmol, 2 eq) was added, and the reaction mixture was stirred at 70° C. for 2 hours. The reaction mixture was cooled to room temperature, added with water (30 mL), and then extracted with ethyl acetate (30 mL×2). The organic phase was washed with water (50 mL) and saturated brine (50 mL×3), dried over anhydrous sodium sulfate and concentrated to obtain a crude product. The crude product was purified by silica gel column chromatography (dichloromethane/methanol=1:0-20:1) to obtain compound 12A.

MS (ESI, m/z): 552.3 [M+1];

$^1$H NMR (400 MHz, CDCl$_3$) δ=7.27-7.02 (m, 5H), 6.95 (dd, J=7.0, 10.4 Hz, 1H), 6.85 (dd, J=8.6, 10.4 Hz, 1H), 6.71 (d, J=7.9 Hz, 1H), 5.80 (d, J=7.8 Hz, 1H), 5.29 (br dd, J=7.0, 11.3 Hz, 1H), 5.25-5.12 (m, 2H), 5.02 (s, 1H), 4.58 (br t, J=11.9 Hz, 1H), 4.20 (br d, J=11.4 Hz, 1H), 3.08 (s, 3H), 2.27-2.12 (m, 4H), 2.04 (br dd, J=6.6, 15.3 Hz, 1H).

Embodiment 13

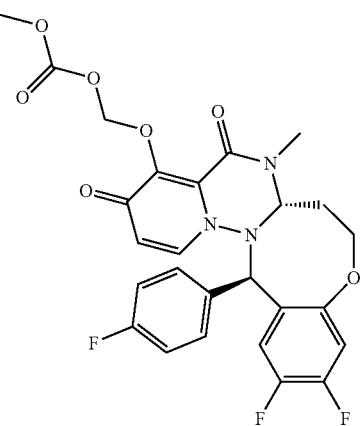

13A or 13B

Synthetic Route:

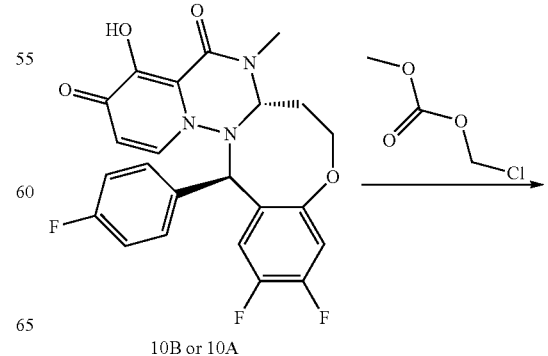

10B or 10A

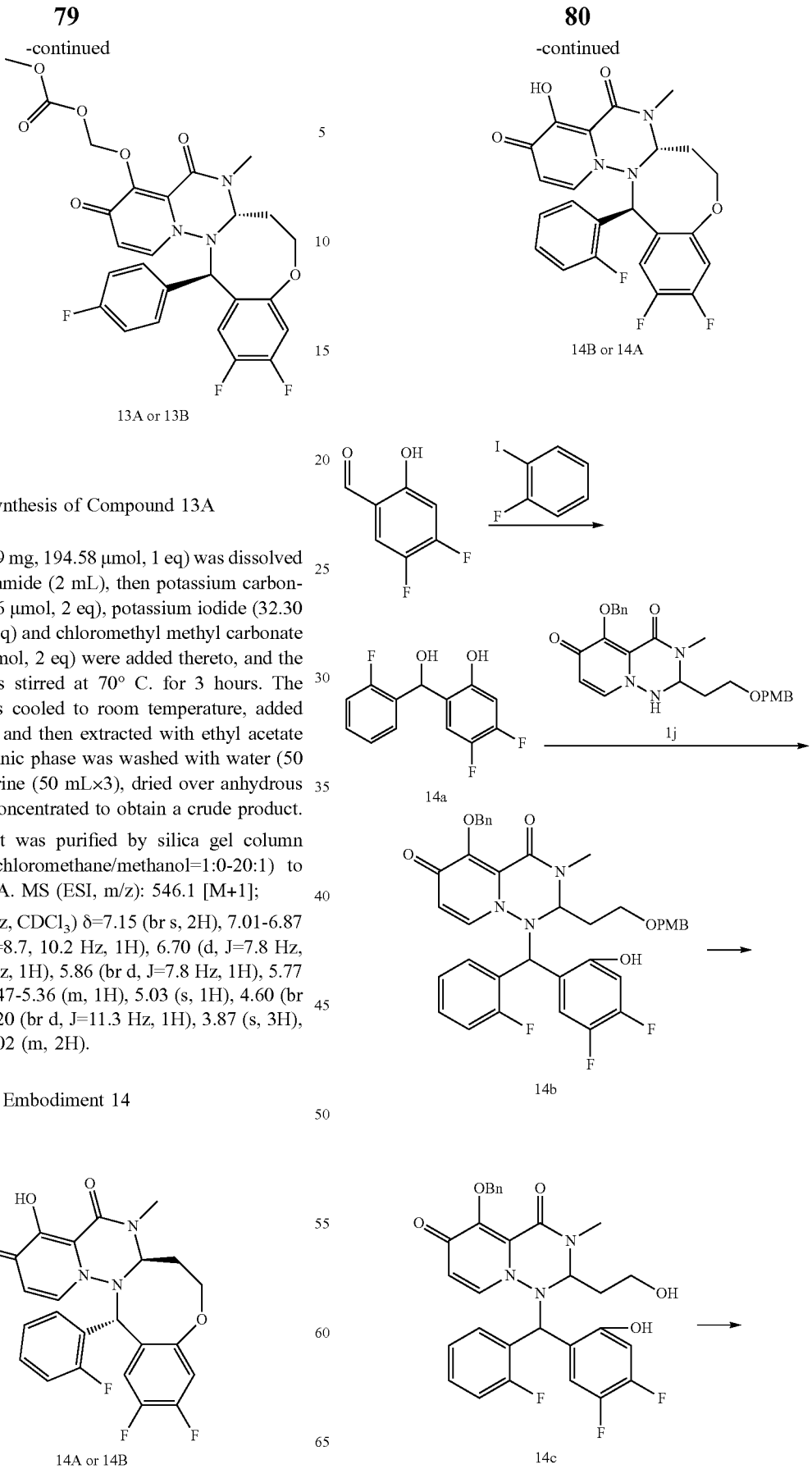

Step 1: Synthesis of Compound 13A

Compound 10B (89 mg, 194.58 μmol, 1 eq) was dissolved in N,N-dimethylacetamide (2 mL), then potassium carbonate (53.79 mg, 389.16 μmol, 2 eq), potassium iodide (32.30 mg, 194.58 μmol, 1 eq) and chloromethyl methyl carbonate (48.46 mg, 389.16 μmol, 2 eq) were added thereto, and the reaction mixture was stirred at 70° C. for 3 hours. The reaction mixture was cooled to room temperature, added with water (30 mL), and then extracted with ethyl acetate (30 mL×2). The organic phase was washed with water (50 mL) and saturated brine (50 mL×3), dried over anhydrous sodium sulfate and concentrated to obtain a crude product.

The crude product was purified by silica gel column chromatography (dichloromethane/methanol=1:0-20:1) to obtain compound 13A. MS (ESI, m/z): 546.1 [M+1];

$^1$H NMR (400 MHz, CDCl$_3$) δ=7.15 (br s, 2H), 7.01-6.87 (m, 3H), 6.81 (dd, J=8.7, 10.2 Hz, 1H), 6.70 (d, J=7.8 Hz, 1H), 5.95 (d, J=6.5 Hz, 1H), 5.86 (br d, J=7.8 Hz, 1H), 5.77 (d, J=6.5 Hz, 1H), 5.47-5.36 (m, 1H), 5.03 (s, 1H), 4.60 (br t, J=11.4 Hz, 1H), 4.20 (br d, J=11.3 Hz, 1H), 3.87 (s, 3H), 3.05 (s, 3H), 2.22-2.02 (m, 2H).

Embodiment 14

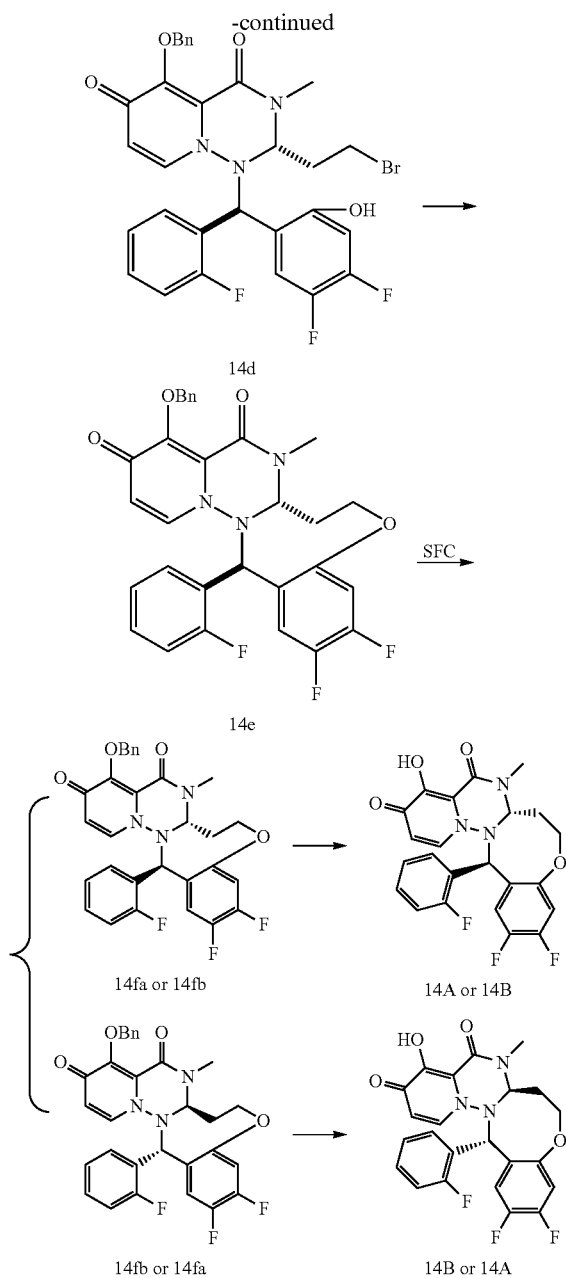

reduced pressure to obtain a crude product. The crude product was purified by silica gel column chromatography (petroleum ether/ethyl acetate=1:0-5:1) to obtain compound 14a.

$^1$H NMR (400 MHz, CDCl$_3$) δ=8.08 (br s, 1H), 7.44-7.29 (m, 2H), 7.23-7.05 (m, 2H), 6.81-6.57 (m, 2H), 6.27 (s, 1H), 3.22 (br s, 1H).

Step 2: Synthesis of Compound 14b 1j (5 g, 11.12 mmol, 1 eq), 14a (7.54 g, 22.25 mmol, purity: 75%, 2 eq), (S)-(+)-1,1'-binaphthyl-2,2'-diyl hydrogenphosphate (3.87 g, 11.12 mmol, 1 eq) and (R)-(−)-1,1'-binaphthyl-2,2'-diyl hydrogenphosphate (3.87 g, 11.12 mmol, 1 eq) were dissolved in 1,2-dichloroethane (50 mL), and the reaction mixture was stirred at 60° C. for 14 hours. The reaction mixture was diluted with dichloromethane (300 mL), washed with saturated sodium carbonate solution (250 mL), then a solid was generated, and filtered. The filtrate was washed with saturated brine (250 mL), dried over anhydrous sodium sulfate and concentrated. The crude product was purified by silica gel column chromatography (dichloromethane/methanol=1:0-20:1) to obtain compound 14b. MS (ESI, m/z): 686.2 [M+1].

Step 3: Synthesis of Compound 14c 14b (3.5 g, 5.10 mmol, 1 eq) was dissolved in methanol solution of hydrochloric acid (1 M, 35.00 mL, 6.86 eq) and 1,2-dichloroethane (35 mL), and the reaction mixture was stirred at 70° C. for 3.5 hours. The reaction mixture was cooled to 20° C., then saturated sodium bicarbonate aqueous solution was added to adjust the pH to 8, and the mixture was extracted with dichloromethane/methanol (10:1, 200 mL×4). The organic phases were combined, dried over anhydrous sodium sulfate and concentrated to obtain a crude product. The crude product was purified by silica gel column chromatography (dichloromethane/methanol=1:0-10:1) to obtain compound 14c.

$^1$H NMR (400 MHz, CD$_3$OD) δ=7.97 (dt, J=1.8, 7.4 Hz, 1H), 7.47-7.35 (m, 4H), 7.35-7.32 (m, 1H), 7.31-7.22 (m, 3H), 7.21-7.04 (m, 2H), 6.50 (dd, J=6.8, 11.8 Hz, 1H), 6.26 (s, 1H), 6.08 (d, J=7.8 Hz, 1H), 5.33 (d, J=10.8 Hz, 1H), 5.15 (d, J=10.8 Hz, 1H), 4.59 (dd, J=6.1, 7.7 Hz, 1H), 3.59 (ddd, J=4.8, 6.8, 11.2 Hz, 1H), 3.42 (ddd, J=4.8, 6.5, 11.1 Hz, 1H), 2.97 (s, 3H), 1.41-1.22 (m, 2H).

Step 4: Synthesis of Compound 14d 14c (1.29 g, 2.28 mmol, 1 eq) was dissolved in dichloromethane (25 mL), then triphenylphosphine (897.43 mg, 3.42 mmol, 1.5 eq) was added thereto, and the reaction mixture was stirred at 25° C. for 15 minutes. Carbon tetrabromide (897.43 mg, 3.42 mmol, 1.5 eq) was added, and the reaction mixture was stirred at 25° C. for 2 hours under the protection of nitrogen. The reaction mixture was quenched with methanol (5 mL) and concentrated directly to obtain a crude product. The crude product was purified by silica gel column chromatography (dichloromethane/methanol=1:0-20:1) to obtain compound 14d.

$^1$H NMR (400 MHz, CDCl$_3$) δ=9.66 (br s, 1H), 7.77 (br s, 1H), 7.47-7.36 (m, 3H), 7.32 (br t, J=7.3 Hz, 3H), 7.26-7.05 (m, 3H), 7.02-6.91 (m, 1H), 6.75-6.64 (m, 1H), 6.22-6.08 (m, 2H), 5.37 (d, J=11.0 Hz, 1H), 5.22 (br d, J=11.0 Hz, 1H), 4.54-4.46 (m, 1H), 3.36-3.28 (m, 1H), 3.27-3.20 (m, 1H), 3.03 (s, 3H), 1.70-1.59 (m, 2H).

Step 1: Synthesis of Compound 14a

Tetrahydrofuran (60 mL) was added to a round bottom flask at −15° C., then 2-fluoro-1-iodobenzene (8.5 g, 38.29 mmol, 4.47 mL, 1 eq) and isopropylmagnesium chloride lithium chloride (1.3 M, 29.45 mL, 1.0 eq) were slowly added, and the reaction mixture was stirred continuously at −15° C. for half an hour under the protection of nitrogen. A solution of 4,5-difluorosalicylaldehyde (1.82 g, 11.49 mmol, 0.3 eq) in tetrahydrofuran (30 mL) was then added, and the reaction mixture was stirred at −15° C. for half an hour. The reaction mixture was slowly poured into saturated ammonium chloride (100 mL), extracted with ethyl acetate (100 mL×2), and the organic phases were combined and washed with water (100 mL) and saturated brine (100 mL) successively, and the organic phase was concentrated under

Step 5: Synthesis of Compound 14e

Cesium carbonate (758.54 mg, 2.33 mmol, 2.14 eq) was dissolved in acetonitrile (68.5 mL), then the system was heated to 80° C., and ¹/₂₅ of a solution of 14d (685 mg, 1.09 mmol, 1 eq) dissolved in acetonitrile (68.5 mL) was added every 5 minutes (for 2 hours). The addition was completed, and the reaction mixture was stirred at 80° C. for 80 minutes. The reaction mixture was cooled to room temperature, added with water (200 mL), and then extracted with dichloromethane (3×250 mL). The organic phases were combined, dried over anhydrous sodium sulfate and concentrated to obtain a crude product. The crude product was purified by silica gel column chromatography (dichloromethane/methanol=1:0-20:1) to obtain compound 14e.

$^1$H NMR (400 MHz, CDCl$_3$) δ=7.65 (br d, J=7.0 Hz, 2H), 7.55-7.42 (m, 1H), 7.40-7.28 (m, 3H), 7.25-7.17 (m, 1H), 7.07 (br s, 1H), 6.98-6.79 (m, 3H), 6.69 (br s, 1H), 5.87 (d, J=7.5 Hz, 1H), 5.65 (br s, 1H), 5.39 (d, J=10.0 Hz, 1H), 5.27 (br d, J=10.0 Hz, 1H), 5.18 (br dd, J=7.0, 11.0 Hz, 1H), 4.52 (t, J=11.9 Hz, 1H), 4.14 (br d, J=11.8 Hz, 1H), 3.03 (s, 3H), 2.12 (br d, J=12.8 Hz, 1H), 1.92 (br dd, J=6.8, 15.1 Hz, 1H).

Step 6: Synthesis of Compounds 14fa and 14fb

Compound 14e was separated by SFC (separation column: DAICEL CHIRALPAK AS (250 mm*30 mm, 10 m); mobile phase: A [CO$_2$]; B (0.1% NH$_3$H$_2$O EtOH) %: 50%-50%) to obtain compound 14fa (retention time: 3.646 min) and 14fb (retention time: 4.929 min).

14fa: MS (ESI, m/z): 548.1 [M+1]; ee value: 100%

$^1$H NMR (400 MHz, CDCl$_3$) δ=7.66 (br d, J=7.3 Hz, 2H), 7.47 (br s, 1H), 7.40-7.28 (m, 3H), 7.24-7.15 (m, 1H), 7.07 (br s, 1H), 6.98-6.78 (m, 3H), 6.67 (br s, 1H), 5.80 (d, J=7.8 Hz, 1H), 5.63 (br s, 1H), 5.36 (d, J=10.0 Hz, 1H), 5.28-5.14 (m, 2H), 4.48 (t, J=11.7 Hz, 1H), 4.14-4.03 (m, 1H), 3.00 (s, 3H), 2.05 (br d, J=12.3 Hz, 1H), 1.86-1.74 (m, 1H).

14fb: MS (ESI, m/z): 548.2 [M+1]; ee value: 99.68%

$^1$H NMR (400 MHz, CDCl$_3$) δ=7.65 (br d, J=7.3 Hz, 2H), 7.48 (br s, 1H), 7.39-7.28 (m, 3H), 7.25-7.17 (m, 1H), 7.08 (br s, 1H), 6.99-6.79 (m, 3H), 6.67 (br s, 1H), 5.82 (d, J=7.8 Hz, 1H), 5.66 (br s, 1H), 5.40 (d, J=10.0 Hz, 1H), 5.27 (br d, J=9.0 Hz, 1H), 5.18 (br dd, J=7.2, 11.2 Hz, 1H), 4.52 (t, J=11.8 Hz, 1H), 4.14 (br d, J=11.3 Hz, 1H), 3.03 (s, 3H), 2.11 (br d, J=13.3 Hz, 1H), 1.89 (br dd, J=6.4, 14.9 Hz, 1H).

Step 7: Synthesis of Compound 14A

14fa (162 mg, 295.88 μmol, 1 eq) was dissolved in dichloromethane (10 mL), then anhydrous magnesium chloride (563.41 mg, 5.92 mmol, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75*30 mm*3 μm; mobile phase: [H$_2$O (0.225% FA)-ACN]; ACN %: 25%-55%, 7 min) to obtain compound 14A. MS (ESI, m/z): 458.2 [M+1]; ee value: 100%.

$^1$H NMR (400 MHz, CD$_3$OD) δ=7.51 (br s, 1H), 7.26 (br d, J=6.5 Hz, 1H), 7.18-6.97 (m, 4H), 6.92 (br t, J=9.3 Hz, 1H), 5.90 (br s, 1H), 5.77 (br d, J=7.5 Hz, 1H), 5.58 (br t, J=8.8 Hz, 1H), 4.60 (br s, 1H), 4.22 (br d, J=10.5 Hz, 1H), 3.13 (s, 3H), 2.23 (br s, 2H);

$^{19}$F NMR (377 MHz, CD$_3$OD) δ=−121.39 (br s, 1F), −136.96 (br s, 1F), −143.18 (br s, 1F).

Step 8: Synthesis of Compound 14B

14fb (164 mg, 299.53 μmol, 1 eq) was dissolved in dichloromethane (10 mL), then anhydrous magnesium chloride (570.37 mg, 5.99 mmol, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75*30 mm*3 μm; mobile phase: [H$_2$O (0.225% FA)-ACN]; ACN %: 25%-55%, 7 min) to obtain compound 14B. MS (ESI, m/z): 458.1 [M+1]; ee value: 100%

$^1$H NMR (400 MHz, CD$_3$OD) δ=7.64-7.42 (m, 1H), 7.30-7.22 (m, 1H), 7.18-6.97 (m, 4H), 6.92 (br t, J=9.3 Hz, 1H), 5.90 (br s, 1H), 5.77 (d, J=7.5 Hz, 1H), 5.57 (br t, J=9.0 Hz, 1H), 4.66-4.53 (m, 1H), 4.22 (br d, J=11.5 Hz, 1H), 3.13 (s, 3H), 2.23 (br s, 2H);

$^{19}$F NMR (377 MHz, CD$_3$OD) δ=−121.39 (br s, 1F), −136.95 (br s, 1F), −143.18 (br s, 1F).

Embodiment 15

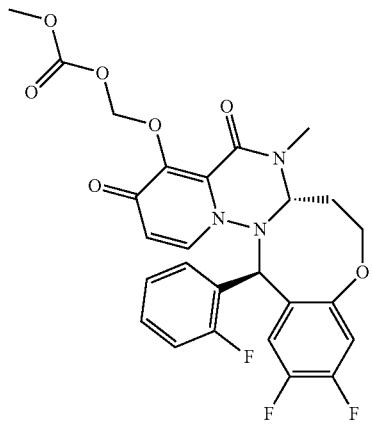

15A or 15B

Synthetic Route:

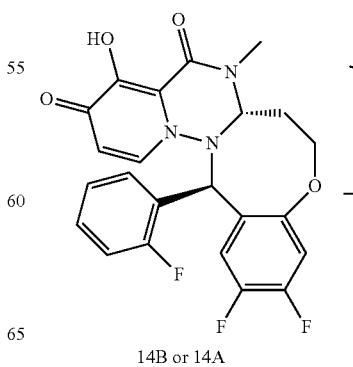

14B or 14A

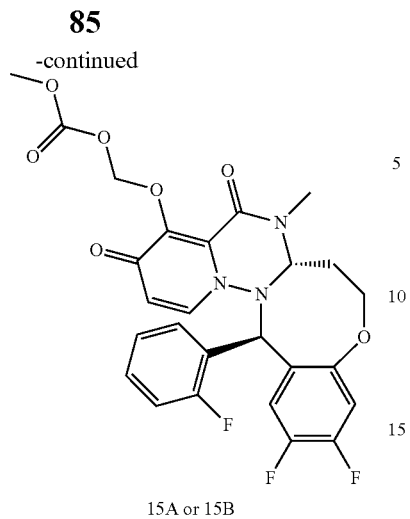

15A or 15B

Step 1: Synthesis of Compound 15A

Compound 14B (84 mg, 183.65 μmol, 1 eq) was dissolved in N,N-dimethylacetamide (2 mL), then potassium carbonate (50.76 mg, 367.29 μmol, 2 eq), potassium iodide (30.49 mg, 183.65 μmol, 1 eq) and chloromethyl methyl carbonate (45.74 mg, 367.29 μmol, 2 eq) were added thereto, and the reaction mixture was stirred at 70° C. for 3 hours. The reaction mixture was cooled to room temperature, added with water (30 mL), and then extracted with ethyl acetate (30 mL×2). The organic phase was washed with water (50 mL) and saturated brine (50 mL×3), dried over anhydrous sodium sulfate and concentrated to dryness to obtain a crude product. The crude product was purified by silica gel column chromatography (dichloromethane/methanol=1:0-20:1) to obtain compound 15A. MS (ESI, m/z): 546.1 [M+1];

$^1$H NMR (400 MHz, CDCl$_3$) δ=7.44 (br s, 1H), 7.25-7.16 (m, 1H), 7.13-7.03 (m, 1H), 7.00-6.68 (m, 4H), 5.95 (br d, J=6.3 Hz, 1H), 5.85 (br d, J=7.5 Hz, 1H), 5.78-5.58 (m, 2H), 5.46 (br t, J=8.5 Hz, 1H), 4.61 (br t, J=11.0 Hz, 1H), 4.19 (br d, J=11.0 Hz, 1H), 3.87 (s, 3H), 3.09 (s, 3H), 2.13 (br s, 2H).

Embodiment 16

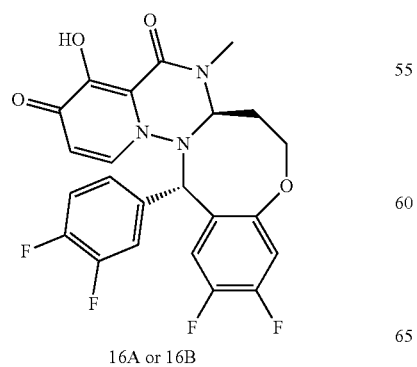

16A or 16B

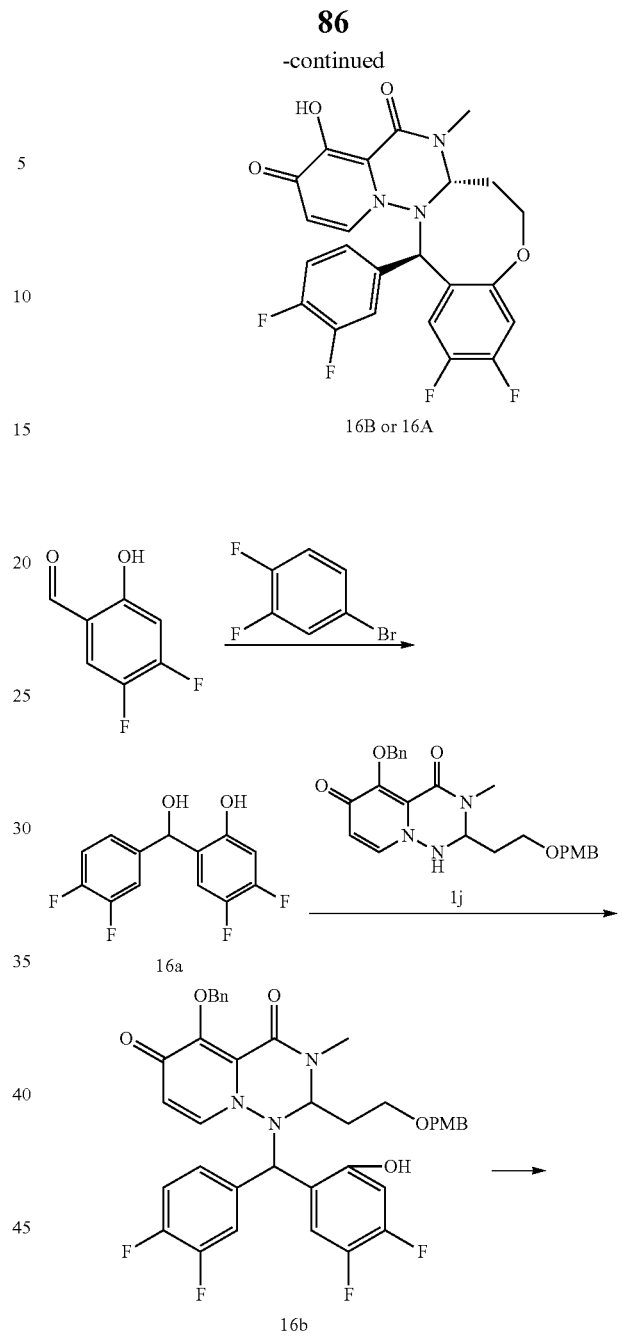

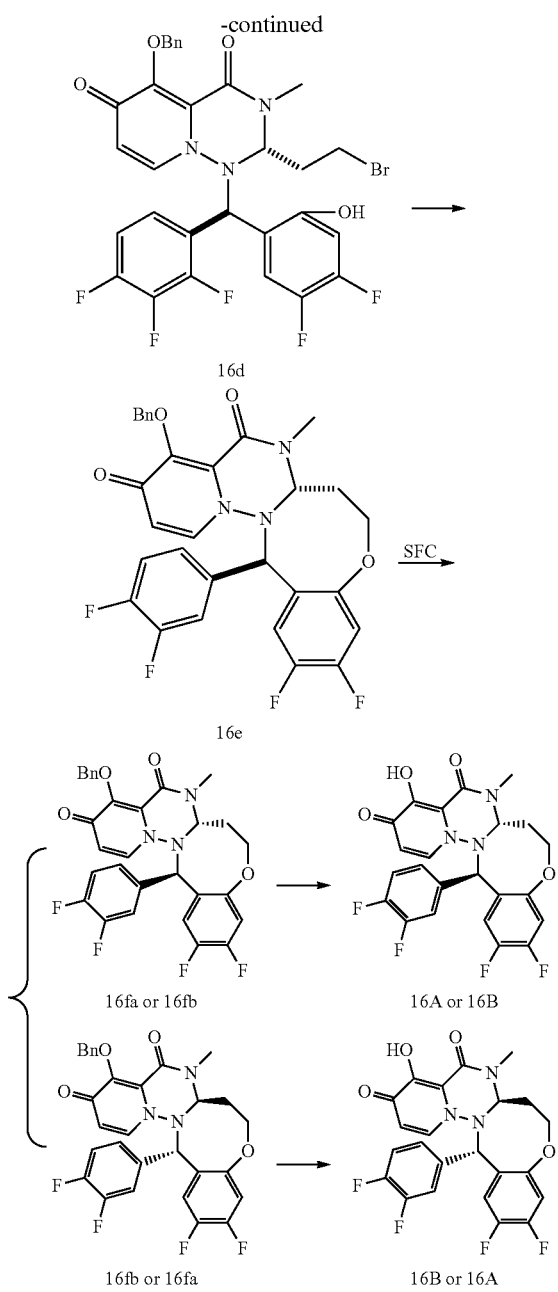

2.97 eq) was taken from the above reaction mixture, then a solution of 4,5-difluorosalicylaldehyde (9 g, 56.93 mmol, 1 eq) dissolved in tetrahydrofuran (150 mL) was slowly added dropwise at 0° C. (for 2 hours), and after the dropwise addition was completed, the reaction mixture was stirred at 25° C. for 2 hours. The reaction mixture was quenched with saturated ammonium chloride aqueous solution (500 mL), then extracted with ethyl acetate (3×500 mL) to obtain an organic phase, and the organic phase was dried over anhydrous sodium sulfate and concentrated under reduced pressure to obtain a crude product. The crude product was purified by silica gel column chromatography (petroleum ether/ethyl acetate=1:0-5:1) to obtain compound 16a.

$^1$H NMR (400 MHz, CDCl$_3$) δ=7.64 (s, 1H), 7.26-7.13 (m, 2H), 7.09 (ddd, J=2.1, 4.1, 6.3 Hz, 1H), 6.76-6.65 (m, 2H), 5.91 (d, J=1.8 Hz, 1H), 3.09 (d, J=3.3 Hz, 1H).

Step 2: Synthesis of Compound 1e 16b (3.01 g, 6.70 mmol, 1 eq), 16a (3.65 g, 13.39 mmol, 2 eq), (S)-(+)-1,1'-Binaphthyl-2,2'-diyl hydrogenphosphate (583.07 mg, 1.67 mmol, 0.25 eq) and (R)-(−)-1,1'-binaphthyl-2,2'-diyl hydrogenphosphate (583.07 mg, 1.67 mmol, 0.25 eq) were dissolved in 1,2-dichloroethane (30 mL), and the reaction mixture was stirred at 90° C. for 40 hours. The reaction mixture was directly concentrated. The crude product was purified by silica gel column chromatography (dichloromethane/methanol=1:0-20:1) to obtain compound 16b.

MS (ESI, m/z): 704.3 [M+1].

Step 3: Synthesis of Compound 16c 16b (4.33 g, 6.15 mmol, 1 eq) was dissolved in methanol solution of hydrochloric acid (1 M, 43.30 mL, 7.04 eq) and 1,2-dichloroethane (43.3 mL), and the reaction mixture was stirred at 70° C. for 3.5 hours. The reaction mixture was cooled to 20° C., then saturated sodium bicarbonate aqueous solution was added to adjust the pH to 8, and the mixture was extracted with dichloromethane/methanol (10:1, 100 mL×4). The organic phases were combined, dried over anhydrous sodium sulfate and concentrated to obtain a crude product. The crude product was purified by silica gel column chromatography (dichloromethane/methanol=1:0-10:1) to obtain compound 16c.

$^1$H NMR (400 MHz, CD$_3$OD) δ=7.68-7.59 (m, 1H), 7.42-7.33 (m, 5H), 7.32-7.24 (m, 3H), 7.10 (dd, J=9.2, 11.2 Hz, 1H), 6.51 (dd, J=6.9, 11.8 Hz, 1H), 6.08 (d, J=7.6 Hz, 1H), 5.89 (s, 1H), 5.32 (d, J=10.8 Hz, 1H), 5.14 (d, J=10.8 Hz, 1H), 4.57 (dd, J=6.2, 7.8 Hz, 1H), 3.66-3.53 (m, 1H), 3.44 (td, J=5.4, 11.0 Hz, 1H), 2.99 (s, 3H), 1.37 (dt, J=5.7, 13.4 Hz, 1H), 1.31-1.18 (m, 1H).

Step 4: Synthesis of Compound 16d 16c (974 mg, 1.67 mmol, 1 eq) was dissolved in dichloromethane (18 mL), then triphenylphosphine (656.70 mg, 2.50 mmol, 1.5 eq) was added thereto, and the reaction mixture was stirred at 25° C. for 15 minutes. Carbon tetrabromide (830.31 mg, 2.50 mmol, 1.5 eq) was added, and the reaction mixture was stirred at 25° C. for 1 hour under the protection of nitrogen. The reaction mixture was quenched with methanol (3 mL) and concentrated directly to obtain a crude product. The crude product was purified by silica gel column chromatography (dichloromethane/methanol=1:0-20:1) to obtain compound 16d.

Step 1: Synthesis of Compound 16a

Magnesium powder (5.54 g, 227.73 mmol, 1 eq) was added to a 500 mL three-necked flask, and the system was replaced with nitrogen three times, then iodine (578.01 mg, 2.28 mmol, 0.01 eq) was added under the protection of nitrogen, heated until the iodine was evenly covered with magnesium powder. The heating was stopped, then tetrahydrofuran (231 mL) and 3,4-difluoro-1-bromobenzene (5.49 g, 28.47 mmol, 0.125 eq) were added, heated to 75° C. to initiate the reaction. The reaction temperature was lowered to 70° C., then 3,4-difluoro-1-bromobenzene (38.46 g, 199.26 mmol, 0.875 eq) was slowly added dropwise thereto, and after the dropwise addition was completed, the reaction mixture was stirred at 70° C. for 2 hours, and cooled to room temperature. The supernatant liquid (0.89 M, 189.96 mL, $^1$H NMR (400 MHz, CDCl$_3$) δ=9.81 (br s, 1H), 7.41 (br t, J=8.3 Hz, 1H), 7.36-7.30 (m, 2H), 7.24 (br d, J=2.0 Hz, 5H), 7.01 (br d, J=7.0 Hz, 1H), 6.91-6.77 (m, 2H), 6.16 (br d, J=7.0 Hz, 1H), 5.79 (br s, 1H), 5.29 (s, 1H), 5.08 (d, J=11.0 Hz, 1H), 4.53 (dd, J=5.4, 8.2 Hz, 1H), 3.37-3.19 (m, 2H), 3.02 (s, 3H), 1.72-1.49 (m, 2H).

Step 5: Synthesis of Compound 16e

Cesium carbonate (484.45 mg, 1.49 mmol, 2.14 eq) was dissolved in acetonitrile (45 mL), then the system was heated to 80° C., and ⅕₅ of a solution of 16d (450 mg, 696.14 μmol, 1 eq) dissolved in acetonitrile (45 mL) was added every 5 minutes (for 2 hours). The addition was completed, and the reaction mixture was stirred at 80° C. for 80 minutes. The reaction mixture was cooled to room temperature, added with water (50 mL), and then extracted with dichloromethane (3×100 mL). The organic phases were combined, dried over anhydrous sodium sulfate and concentrated to obtain a crude product. The crude product was purified by silica gel column chromatography (dichloromethane/methanol=1:0-20:1) to obtain compound 16e.

$^1$H NMR (400 MHz, CDCl$_3$) δ=7.61 (d, J=6.8 Hz, 2H), 7.43-7.31 (m, 3H), 7.11 (br s, 1H), 7.00-6.85 (m, 2H), 6.79 (dd, J=8.5, 10.0 Hz, 1H), 6.72 (d, J=7.8 Hz, 2H), 6.06 (br s, 1H), 5.51-5.37 (m, 2H), 5.28-5.18 (m, 1H), 4.85 (s, 1H), 4.61-4.52 (m, 1H), 4.17 (br d, J=11.3 Hz, 1H), 2.99 (s, 3H), 2.04-1.89 (m, 2H).

Step 6: Synthesis of Compounds 16fa and 16fb

Compound 16e was separated by SFC (separation column: DAICEL CHIRALPAK AS (250 mm*30 mm, 10 m); mobile phase: A [CO$_2$]; B (0.1% NH$_3$H$_2$O EtOH) %: 40%-40%, min) to obtain compound 16fa (retention time: 3.464 min) and 16fb (retention time: 4.041 min).

16fa: MS (ESI, m/z): 566.2 [M+1]; ee value: 100%.

$^1$H NMR (400 MHz, CDCl$_3$) δ=7.61 (d, J=6.8 Hz, 2H), 7.40-7.29 (m, 3H), 7.24-6.85 (m, 3H), 6.79 (dd, J=8.5, 10.0 Hz, 1H), 6.71 (br d, J=7.5 Hz, 1H), 6.59 (br s, 1H), 5.99 (br s, 1H), 5.51-5.38 (m, 2H), 5.21 (br s, 1H), 4.85 (s, 1H), 4.62-4.52 (m, 1H), 4.19-4.14 (m, 1H), 2.97 (s, 3H), 2.03-1.87 (m, 2H).

16fb: MS (ESI, m/z): 566.2 [M+1]; ee value: 100%.

$^1$H NMR (400 MHz, CDCl$_3$) δ=7.62 (d, J=6.8 Hz, 2H), 7.45-7.29 (m, 3H), 7.12 (br s, 1H), 6.99-6.85 (m, 2H), 6.79 (dd, J=8.5, 10.3 Hz, 1H), 6.70 (br d, J=6.8 Hz, 1H), 6.59 (br s, 1H), 5.93 (br s, 1H), 5.49-5.33 (m, 2H), 5.21 (br s, 1H), 4.84 (s, 1H), 4.55 (br t, J=11.7 Hz, 1H), 4.17-4.11 (m, 1H), 2.94 (s, 3H), 2.03-1.80 (m, 2H).

Step 7: Synthesis of Compound 16A

16fa (100 mg, 176.83 μmol, 1 eq) was dissolved in dichloromethane (5 mL), then anhydrous magnesium chloride (336.72 mg, 3.54 mmol, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75*30 mm*3 μm; mobile phase: [H$_2$O (0.225% FA)-ACN]; ACN %: 30%-60%, 7 min) to obtain compound 16A. MS (ESI, m/z): 476.2 [M+1]; ee value: 100%.

$^1$H NMR (400 MHz, CD$_3$OD) δ=7.43-6.89 (m, 6H), 5.84 (d, J=7.5 Hz, 1H), 5.54 (dd, J=7.5, 11.0 Hz, 1H), 5.40 (s, 1H), 4.64 (br t, J=10.9 Hz, 1H), 4.24 (br d, J=11.3 Hz, 1H), 3.08 (s, 3H), 2.25-2.06 (m, 2H);

$^{19}$F NMR (377 MHz, CD$_3$OD) δ=−136.77 (br d, J=20.8 Hz, 1F), −139.45 (br s, 1F), −143.10 (br d, J=20.8 Hz, 1F).

Step 8: Synthesis of Compound 16B

16fb (100 mg, 176.83 μmol, 1 eq) was dissolved in dichloromethane (5 mL), then anhydrous magnesium chloride (336.72 mg, 3.54 mmol, 20 eq) was added thereto, and the reaction mixture was stirred at 25° C. for 14 hours. The reaction mixture was directly concentrated to obtain a crude product. The crude product was purified by preparative reversed-phase liquid chromatography (separation column: Phenomenex Gemini-NX C18 75*30 mm*3 μm; mobile phase: [H$_2$O (0.225% FA)-ACN]; ACN %: 30%-60%, 7 min) to obtain compound 16B. MS (ESI, m/z): 476.1 [M+1]; ee value: 100%

$^1$H NMR (400 MHz, CD$_3$OD) δ=7.43-6.91 (m, 6H), 5.84 (d, J=7.5 Hz, 1H), 5.54 (dd, J=7.7, 10.9 Hz, 1H), 5.40 (s, 1H), 4.68-4.59 (m, 1H), 4.24 (br d, J=11.5 Hz, 1H), 3.08 (s, 3H), 2.25-2.06 (m, 2H);

$^{19}$F NMR (377 MHz, MeOD-d$_4$) δ=−136.77 (br d, J=20.8 Hz, 1F), −139.45 (br s, 1F), −143.11 (br d, J=20.8 Hz, 1F).

Embodiment 17

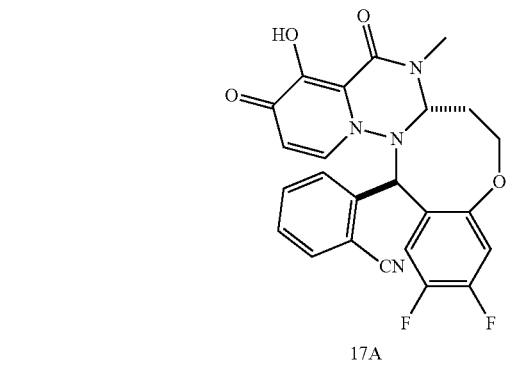 [SMILES: CN1C(=O)c2c(O)c(=O)ccn2N2[C@H](c3ccccc3C#N)c3cc(F)c(F)cc3OCC[C@@H]12]

17A

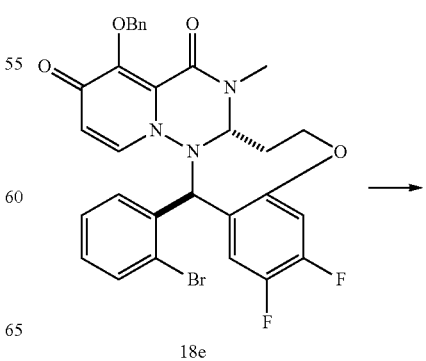

18e

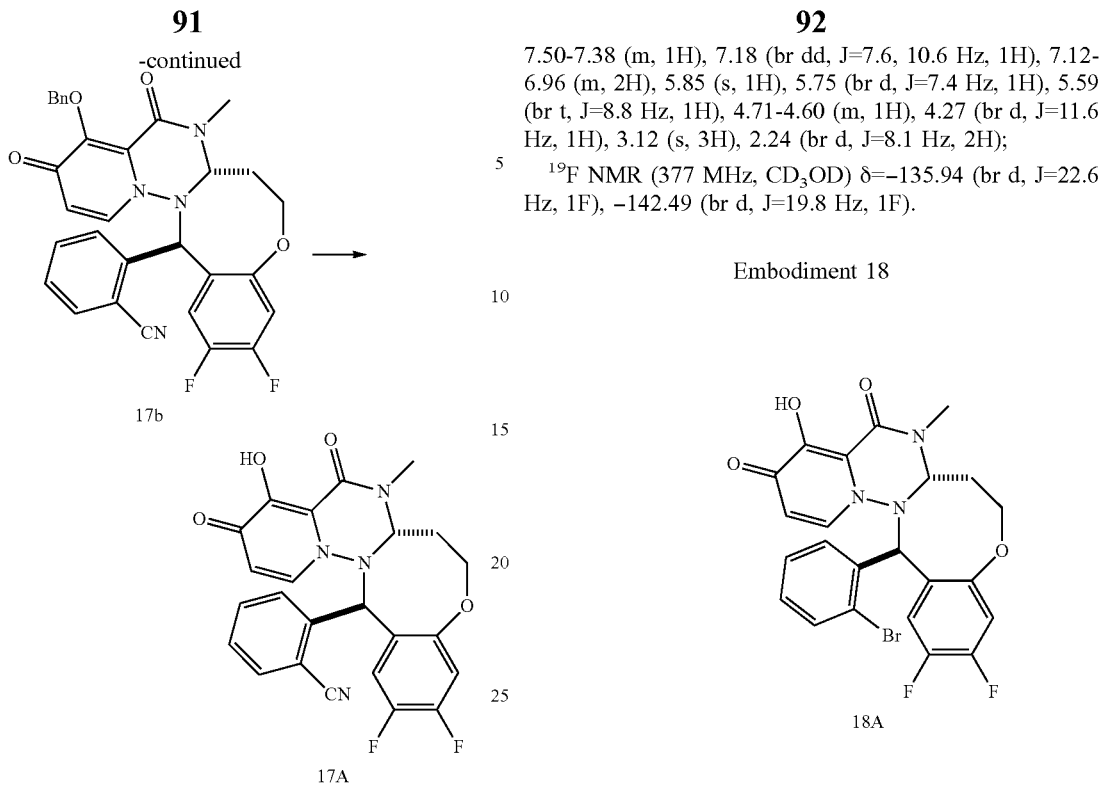

7.50-7.38 (m, 1H), 7.18 (br dd, J=7.6, 10.6 Hz, 1H), 7.12-6.96 (m, 2H), 5.85 (s, 1H), 5.75 (br d, J=7.4 Hz, 1H), 5.59 (br t, J=8.8 Hz, 1H), 4.71-4.60 (m, 1H), 4.27 (br d, J=11.6 Hz, 1H), 3.12 (s, 3H), 2.24 (br d, J=8.1 Hz, 2H);

$^{19}$F NMR (377 MHz, CD$_3$OD) δ=−135.94 (br d, J=22.6 Hz, 1F), −142.49 (br d, J=19.8 Hz, 1F).

Embodiment 18

Synthetic Route:

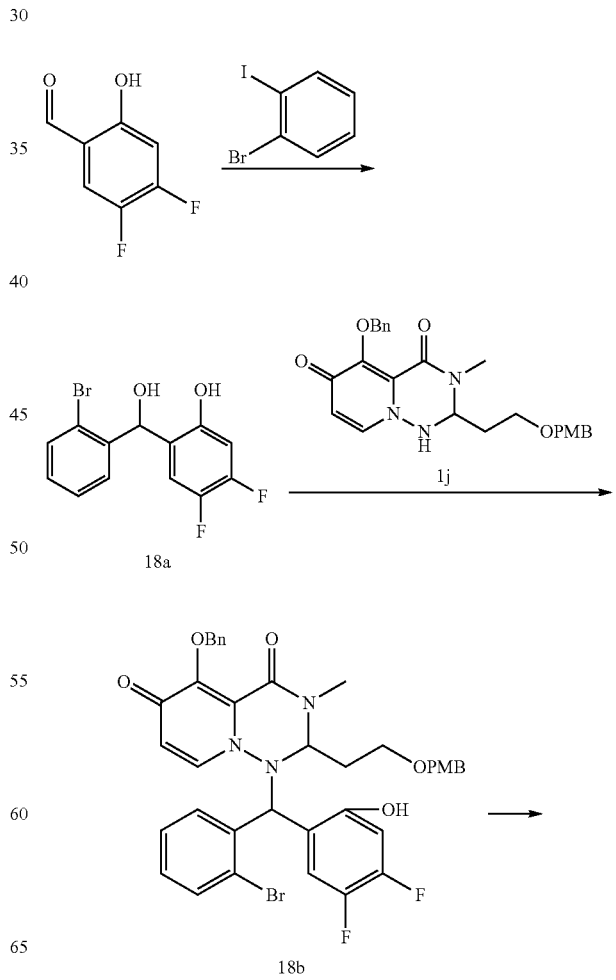

Step 1: Synthesis of Compound 17b

N,N-Dimethylacetamide (5 mL) was added to a round bottom flask at 25° C., then 18e (30 mg, 49.31 μmol, 1 eq), zinc cyanide (20 mg, 170.31 μmol, 10.81 μL, 3.45 eq) and tetrakis(triphenylphosphine)palladium (11.40 mg, 9.86 μmol, 0.2 eq) were slowly added, and the reaction mixture was stirred continuously at 115° C. for 12 hours under the protection of nitrogen. The reaction mixture was slowly poured into water (10 mL), extracted twice with ethyl acetate (50 mL×2), and the organic phases were combined and washed with water (10 mL) and saturated brine (100 mL) successively, and the obtained organic phase was concentrated under reduced pressure to obtain a crude product. The crude product was separated by silica gel column chromatography (dichloromethane/methanol=100:1-100:10). The crude product was obtained and then separated by preparative thin-layer chromatography (dichloromethane/methanol=10:1) to obtain compound 17b.

Step 2: Synthesis of Compound 17A

Dichloromethane (2 mL) was added to around bottom flask at 25° C., then 17b (15 mg, 27.05 μmol, 1 eq) and anhydrous magnesium chloride (25.75 mg, 270.49 μmol, 10 eq) were slowly added, and the reaction mixture was stirred continuously at 25° C. for 1 hour under the protection of nitrogen. The reaction mixture was concentrated under reduced pressure to obtain a crude product. The crude product was purified by preparative reversed-phase liquid chromatography (separation column: Phenomenex Gemini-NX C18 75*30 mm*3 μm; mobile phase: [H$_2$O (0.225% FA)-ACN]; ACN %: 20%-50%, 7 min) to obtain 17A. MS (ESI, m/z): 465.1 [M+1];

$^1$H NMR (400 MHz, CD$_3$OD) δ=7.94 (br d, J=8.3 Hz, 1H), 7.66 (br t, J=7.9 Hz, 1H), 7.55 (br d, J=7.9 Hz, 1H),

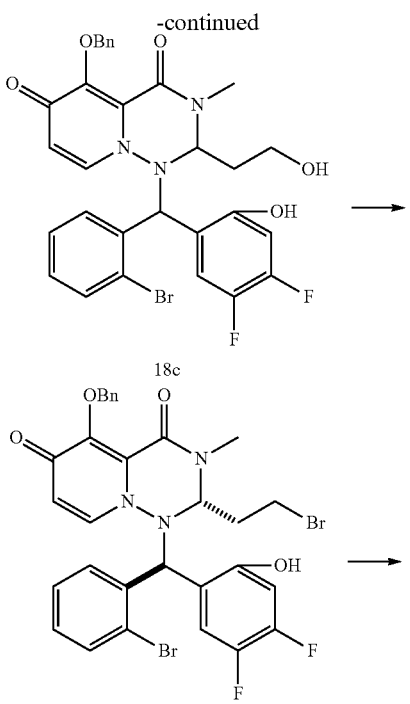

18c

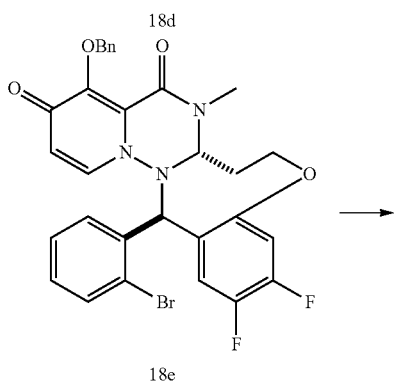

18d

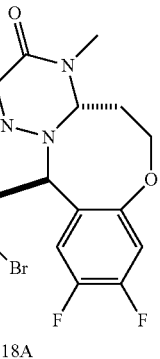

18A

Step 1: Synthesis of Compound 18a

Tetrahydrofuran (60 mL) was added to a round bottom flask at 0° C., then 1-bromo-2-iodobenzene (9.0 g, 31.81 mmol, 4.09 mL, 1 eq) and isopropylmagnesium chloride lithium chloride (1.3 M, 26.92 mL, 1.1 eq) were slowly added, and the reaction mixture was stirred continuously at 0° C. for half an hour under the protection of nitrogen. A solution of 4,5-difluorosalicylaldehyde (1.26 g, 7.95 mmol, 0.25 eq) in tetrahydrofuran (10 mL) was then added, and the reaction mixture was stirred continuously at 0° C. for half an hour. The reaction mixture was slowly poured into water (100 mL), extracted with ethyl acetate (100 mL×2), then the organic phases were combined and washed with water (100 mL) and saturated brine (100 mL) successively, and the organic phase was concentrated under reduced pressure to obtain a crude product. The crude product was purified by silica gel column chromatography (petroleum ether/ethyl acetate=100:1-5:1) to obtain compound 18a.

Step 2: Synthesis of Compound 18b 1j (1.0 g, 2.22 mmol, 1 eq), 18a (701.03 mg, 2.22 mmol, 1 eq), (S)-(+)-1,1'-binaphthyl-2,2'-diyl hydrogenphosphate (77.50 mg, 0.22 mmol, 0.1 eq) and (R)-(−)-1,1'-binaphthyl-2,2'-diyl hydrogenphosphate (77.50 mg, 0.22 mmol, 0.1 eq) were dissolved in 1,2-dichloroethane (50 mL), and the reaction mixture was stirred at 75° C. for 12 hours under the protection of nitrogen. The reaction mixture was poured into saturated sodium bicarbonate solution (100 mL), and extracted with ethyl acetate (100 mL×2). The organic phases were combined, washed with water (30 mL×2) and saturated brine (250 mL×2), and concentrated to obtain a crude product. The crude product was purified by silica gel column chromatography (dichloromethane/methanol=100:1-10:1) to obtain compound 18b. MS (ESI, m/z): 746.3 [M+1].

Step 3: Synthesis of Compound 18c 18b (900 mg, 1.21 mmol, 1 eq) was dissolved in methanol solution of hydrochloric acid (1 M, 11 mL), and the reaction mixture was stirred at 70° C. for 2 hours. The reaction mixture was cooled to 20° C., poured into saturated sodium bicarbonate aqueous solution (50 mL), and the mixture was extracted with dichloromethane (50 mL×2). The organic phases were combined, washed once with water (50 mL) and once with saturated brine (50 mL), and concentrated to obtain a crude product. The crude product was purified by silica gel column chromatography (dichloromethane/methanol=100:0-94:6) to obtain compound 18c. MS (ESI, m/z): 626.1 [M+1].

Step 4: Synthesis of Compound 18d 18c (300 mg, 0.48 mmol, 1 eq) was suspended in dichloromethane (3 mL), then triphenylphosphine (188 mg, 0.72 mmol, 1.5 eq) was added thereto, and the reaction mixture was stirred at 25° C. for 15 minutes. Carbon tetrabromide (238 mg, 0.72 mmol, 1.5 eq) was added, and the reaction mixture was stirred continuously for 13 hours. Triphenylphosphine (100 mg, 0.38 mmol, 0.8 eq) and carbon tetrabromide (127 mg, 0.38 mmol, 0.8 eq) were added, and the reaction mixture was stirred for 2 hours. The reaction mixture was quenched with methanol (1 mL) and concentrated directly to obtain a crude product. The crude product was purified by silica gel column chromatography (dichloromethane/methanol=99:1-98:2) to obtain compound 18d.
$^1$H NMR (400 MHz, CDCl$_3$) δ=9.55 (br s, 1H), 7.95 (br s, 1H), 7.63 (br d, J=7.8 Hz, 1H), 7.55 (br t, J=7.5 Hz, 1H), 7.38 (br s, 2H), 7.28 (br s, 4H), 7.26-7.07 (m, 1H), 6.95-6.76 (m, 2H), 6.34 (br s, 2H), 5.35 (br d, J=10.8 Hz, 1H), 5.15 (br d, J=11.3 Hz, 1H), 4.47 (br t, J=6.0 Hz, 1H), 3.33 (br s, 1H), 3.24 (br s, 1H), 3.06 (s, 3H), 1.63 (br s, 2H).

Step 5: Synthesis of Compound 18e 18d (180 mg, 0.26 mmol, 1 eq) and cesium carbonate (1.70 g, 5.22 mmol, 20 eq) were added to acetonitrile (900 mL) at 25° C., then the system was heated to 80° C., and the reaction mixture was stirred for 2 hours. The reaction mixture was cooled to room temperature and filtered, and the filtrate was concentrated to obtain a crude product. The crude product was purified by silica gel column chromatography (dichloromethane/methanol=99:1-97:3) to obtain compound 18e. MS (ESI, m/z): 608.1 [M+1].

Step 6: Synthesis of Compound 18A 18e (15 mg, 25 µmol, 1 eq) was dissolved in dichloromethane (2 mL), then anhydrous magnesium chloride (47 mg, 0.49 mmol, 20 eq) was added thereto, and the reaction mixture was stirred at 25° C. for 3 hours. The reaction mixture was directly concentrated to obtain a crude product. The crude product was purified by preparative reversed-phase liquid chromatography (separation column: Phenomenex Gemini-NX C18 75*30 mm*3 µm; mobile phase: [H$_2$O (0.225% FA)-ACN]; ACN %: 25%-55%, 7 min) to obtain compound 18A. MS (ESI, m/z): 517.8 [M+1];

$^1$H NMR (400 MHz, CD$_3$OD) δ=7.80 (dd, J=1.5, 8.0 Hz, 1H), 7.38 (dd, J=1.0, 8.0 Hz, 1H), 7.31 (t, J=7.7 Hz, 1H), 7.15-7.05 (m, 2H), 7.04-6.94 (m, 2H), 6.11 (s, 1H), 5.76 (d, J=7.8 Hz, 1H), 5.54 (t, J=9.2 Hz, 1H), 4.68-4.53 (m, 1H), 4.23 (br d, J=11.3 Hz, 1H), 3.12 (s, 3H), 2.28-2.12 (m, 2H);

$^{19}$F NMR (377 MHz, CD$_3$OD) δ=−135.56 (br d, J=24.3 Hz, 1F), −141.81 (br d, J=20.8 Hz, 1F).

Embodiment 19

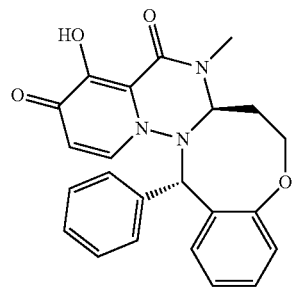

19A or 19B

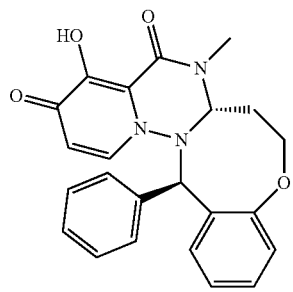

19B or 19A

Synthetic Route:

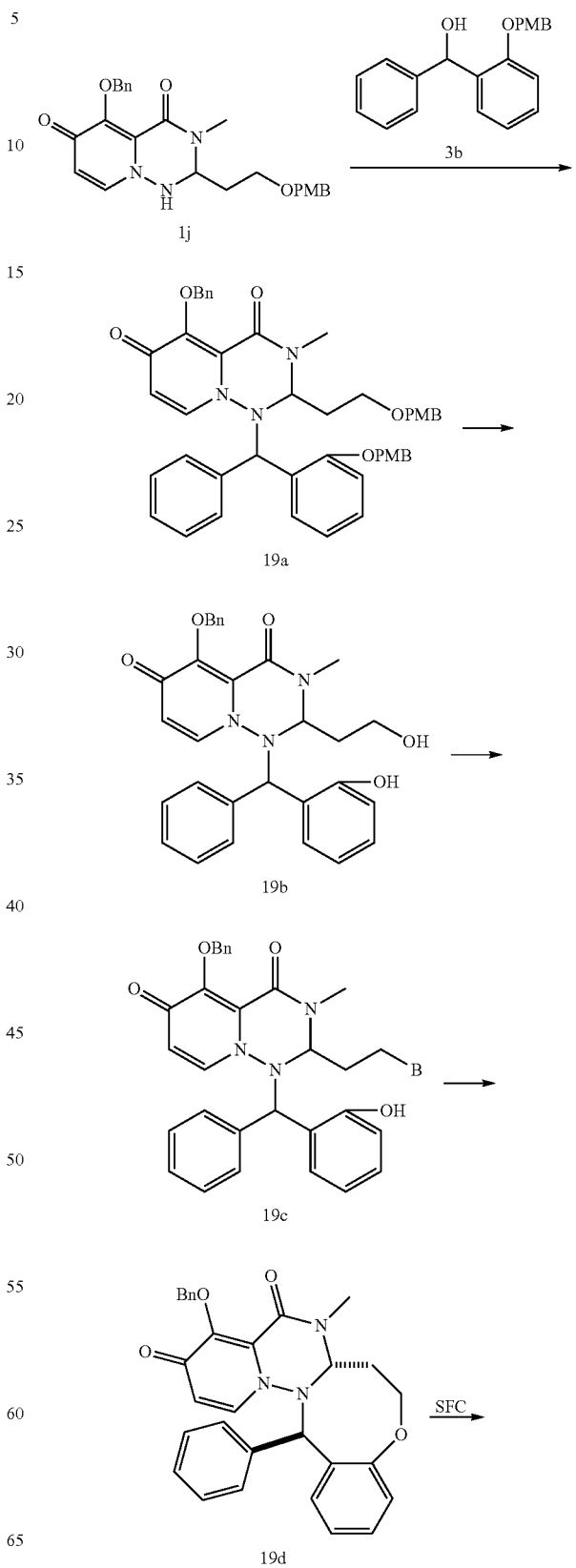

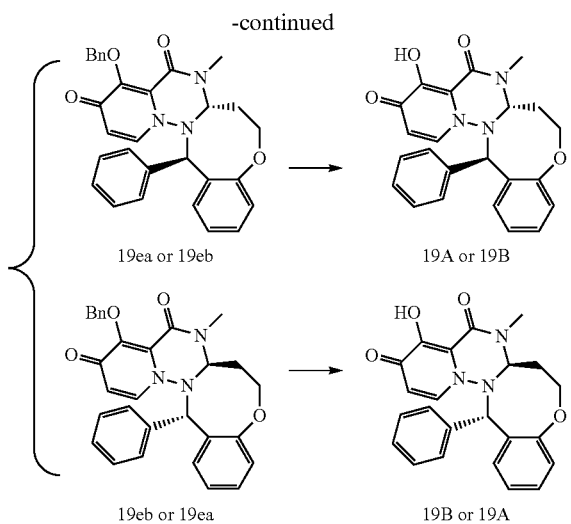

Step 1: Synthesis of Compound 19a

Ethyl acetate (25 mL) was added to a three-necked flask at 25° C., then 1j (2.5 g, 5.56 mmol, 1 eq), a solution of $T_3P$ in ethyl acetate (14.16 g, 22.24 mmol, 13.23 mL, concentration: 50%, 4 eq) and 3b (3.56 g, 11.12 mmol, 2 eq) were slowly added, and the reaction mixture was stirred continuously at 75° C. for 12 hours under the protection of nitrogen. The reaction mixture was slowly poured into water (50 mL), extracted twice with ethyl acetate (50 mL×2), and the organic phases were combined and washed with water (50 mL) and saturated brine (50 mL) successively, and the obtained organic phase was concentrated under reduced pressure to obtain a crude product. The crude product was separated by silica gel column chromatography (dichloromethane/methanol=100:0-95:5) to obtain compound 19a.

$^1$H NMR (400 MHz, $CDCl_3$) δ=7.75 (br d, J=7.5 Hz, 1H), 7.59-7.52 (m, 2H), 7.23-6.92 (m, 10H), 6.91-6.81 (m, 5H), 6.74 (br d, J=8.0 Hz, 1H), 5.52-5.35 (m, 1H), 5.31 (s, 1H), 5.15 (d, J=10.4 Hz, 1H), 4.99-4.93 (m, 1H), 4.89-4.80 (m, 1H), 4.71-4.59 (m, 1H), 4.52-4.29 (m, 2H), 3.84-3.82 (m, 3H), 3.80 (d, J=5.3 Hz, 3H), 3.47 (dt, J=3.3, 7.0 Hz, 1H), 3.40-3.20 (m, 2H), 2.84 (s, 3H), 1.61-1.44 (m, 2H).

Step 2: Synthesis of Compound 19b 19a (3 g, 3.99 mmol, 1 eq) was dissolved in a premixed solution (about 0.5 M) of hydrochloric acid (12 M, 1.30 mL, 3.92 eq) in methanol (30.0 mL), and the reaction mixture was stirred at 60° C. for 18 hours. The reaction mixture was cooled to 20° C., and the pH was adjusted to >7 by adding solid sodium bicarbonate. The reaction mixture was filtered through cotton, added with silica gel, concentrated and evaporated to dryness. The crude product was purified by silica gel column chromatography (dichloromethane/methanol=100:0-95:5) to obtain compound 19b.

$^1$H NMR (400 MHz, $CDCl_3$) δ=7.60-7.50 (m, 2H), 6.93 (br t, J=7.2 Hz, 1H), 6.83-6.69 (m, 2H), 6.10-5.99 (m, 1H), 5.96-5.85 (m, 1H), 5.49 (br d, J=10.8 Hz, 1H), 5.38-5.35 (m, 1H), 4.70-4.62 (m, 1H), 4.61-4.54 (m, 1H), 3.79-3.52 (m, 2H), 2.98-2.92 (m, 3H), 1.51-1.29 (m, 2H).

Step 3: Synthesis of Compound 19c 19b (171 mg, 334.27 μmol, 1 eq) and dichloromethane (2 mL) were added to a dry three-necked flask at 20° C., and the stirring was started, then triphenylphosphine (131.51 mg, 501.40 μmol, 1.5 eq) was added. The reaction mixture was stirred at this temperature for 15 minutes, and carbon tetrabromide (166.28 mg, 501.40 μmol, 1.5 eq) was added, then the reaction system became clear. The reaction mixture was stirred continuously at 20° C. for 2 hours. The reaction mixture was quenched with water (10 mL), and the aqueous phase was extracted with dichloromethane (10 mL×3). The organic phases were combined, washed with saturated brine (10 mL×2), and dried over anhydrous sodium sulfate, filtered and concentrated under reduced pressure. The crude product was purified by silica gel column chromatography (dichloromethane/methanol=100:0-95:5) to obtain compound 19c.

$^1$H NMR (400 MHz, DMSO-$d_6$) δ=7.66-7.61 (m, 1H), 7.59-7.48 (m, 2H), 7.47-7.34 (m, 3H), 7.22-7.16 (m, 2H), 7.12-6.96 (m, 2H), 6.84-6.73 (m, 1H), 6.18 (br d, J=2.4 Hz, 1H), 6.00-5.88 (m, 1H), 5.53-5.22 (m, 2H), 4.74-4.55 (m, 1H), 3.46-3.20 (m, 2H), 3.02-2.86 (m, 3H), 1.88-1.51 (m, 2H).

Step 4: Synthesis of Compound 19d 19c (215 mg, 374.26 μmol, 1 eq) and acetonitrile (1045 mL) were added to a dry three-necked flask at 20° C., and the stirring was started, then cesium carbonate (2.44 g, 7.49 mmol, 20 eq) was added. The system was replaced with nitrogen three times, and the reaction mixture was stirred at 80° C. for 3.3 hours. The reaction mixture was filtered through filter paper, and the filter cake was washed with acetonitrile (50 mL), and the filtrate was concentrated under reduced pressure. The crude product was purified by silica gel column chromatography (dichloromethane/methanol=100:0-95:5) to obtain compound 19d.

$^1$H NMR (400 MHz, DMSO-$d_6$) δ=7.54 (d, J=6.9 Hz, 2H), 7.41-7.27 (m, 5H), 7.25-7.16 (m, 5H), 7.14-7.04 (m, 2H), 6.83 (d, J=7.8 Hz, 1H), 5.63 (d, J=7.8 Hz, 1H), 5.44-5.34 (m, 1H), 5.20-5.09 (m, 3H), 4.61-4.50 (m, 1H), 4.17-4.13 (m, 1H), 2.88 (s, 3H), 2.16-2.04 (m, 1H), 1.91-1.75 (m, 1H).

Step 5: Synthesis of Compounds 19ea and 19eb

Compound 19d was separated by SFC (separation column: DAICEL CHIRALPAK AS (250 mm*30 mm, 10 m); mobile phase: [Neu-methanol] methanol %: 50%-50%, 20 min) to obtain compound 19ea (retention time: 1.192 min) and 19eb (retention time: 1.411 min).

Step 6: Synthesis of Compounds 19A and 19B

Dichloromethane (1 mL) was added to a round bottom flask at 20° C., then 19ea (40 mg, 81.05 μmol, 1 eq) and anhydrous magnesium chloride (154.33 mg, 1.62 mmol, 20 eq) were slowly added, and the reaction mixture was stirred continuously at 20° C. for 18 hours under the protection of nitrogen. The reaction mixture was concentrated under reduced pressure to obtain a crude product, and the crude product was purified by preparative reversed-phase liquid chromatography (separation column: Welch Xtimate C18 100*25 mm*3 μm; mobile phase: [$H_2O$ (0.05% HCl)-ACN]; ACN %: 15%-45%, 8 min) to obtain compound 19A. MS (ESI, m/z): 404.1 [M+1]; ee value: 100%.

$^1$H NMR (400 MHz, $CDCl_3$) δ=7.35-7.29 (m, 2H), 7.23-6.97 (m, 7H), 6.84-6.73 (m, 1H), 6.34-6.02 (m, 1H), 5.70-5.56 (m, 1H), 4.81-4.59 (m, 1H), 4.34-4.20 (m, 1H), 3.10 (s, 3H), 2.29-1.93 (m, 3H).

Dichloromethane (1 mL) was added to a round bottom flask at 20° C., then 19eb (20 mg, 40.52 μmol, 1 eq) and anhydrous magnesium chloride (77.16 mg, 810.45 mmol, 20 eq) were slowly added, and the reaction mixture was stirred continuously at 20° C. for 18 hours under the protection of nitrogen. The reaction mixture was concentrated under reduced pressure to obtain a crude product, and the crude product was purified by preparative reversed-phase liquid chromatography (separation column: Welch Xtimate C18 100*25 mm*3 m; mobile phase: [H$_2$O (0.05% HCl)-ACN]; ACN %: 15%-45%, 8 min) to obtain compound 19B. MS (ESI, m/z): 404.1 [M+1]; ee value: 100%.

$^1$H NMR (400 MHz, CDCl$_3$) δ=7.36-7.29 (m, 2H), 7.24-6.93 (m, 9H), 6.74-6.65 (m, 1H), 6.15-5.88 (m, 1H), 5.16-5.05 (m, 1H), 4.89-4.73 (m, 1H), 4.29-4.17 (m, 1H), 3.11 (s, 3H), 2.27-2.04 (m, 2H).

Embodiment 20

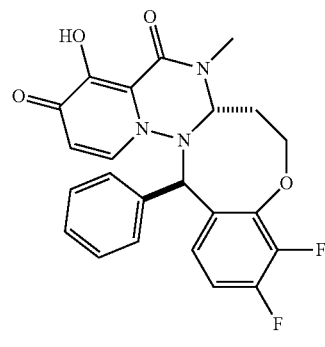

20A

Synthetic Route:

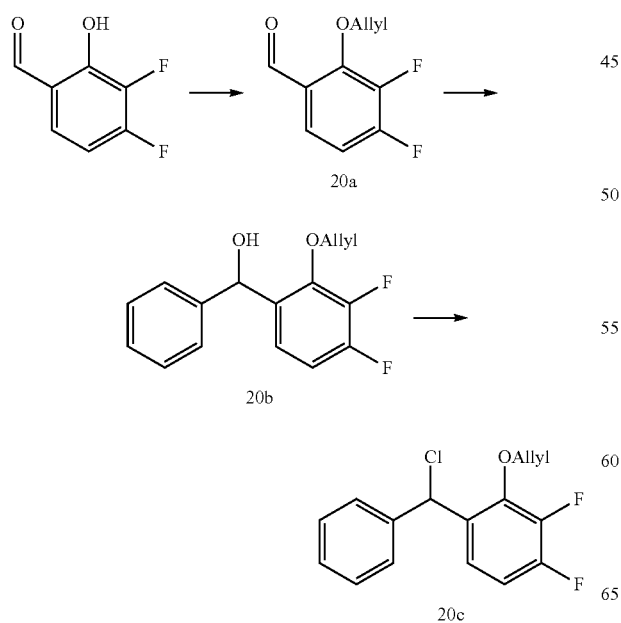

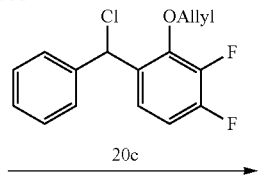

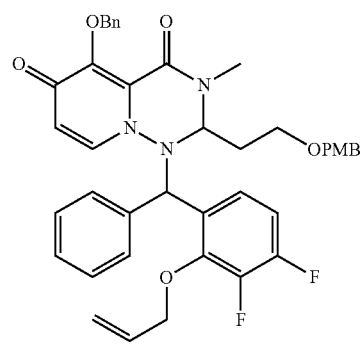

20d

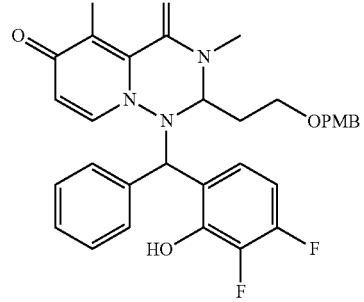

20e

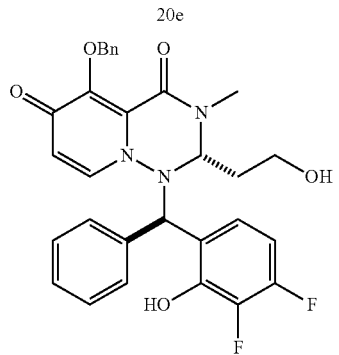

20f

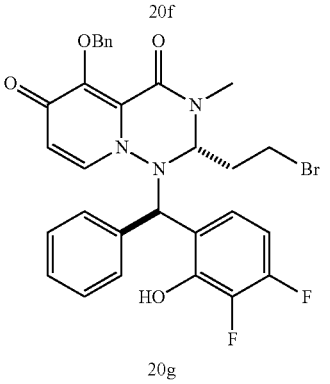

20g

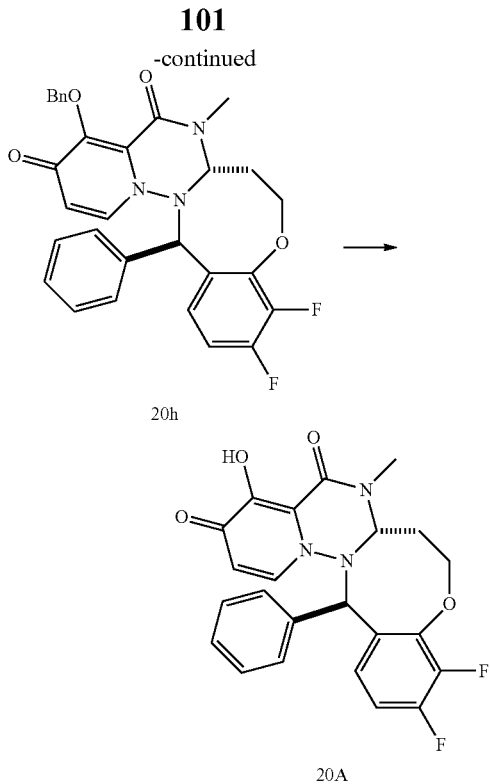

20h

20A

Step 1: Synthesis of Compound 20a 3,4-Difluorosalicylaldehyde (8 g, 50.60 mmol, 1 eq) and acetonitrile (80 mL) were added to a dry three-necked flask, and potassium carbonate (13.99 g, 101.20 mmol, 2 eq) was added, then allyl bromide (9.18 g, 75.90 mmol, 29.97 mL, 1.5 eq) was added. The system was replaced with nitrogen three times, and the reaction mixture was stirred at 50° C. for 16 hours. The reaction mixture was slowly poured into water (100 mL), extracted with ethyl acetate (100 mL×3), and the organic phases were combined, washed with saturated brine (100 mL), dried over anhydrous sodium sulfate, filtered and concentrated under reduced pressure to obtain compound 20a.

$^1$H NMR (400 MHz, CDCl$_3$) δ=10.24 (d, J=0.8 Hz, 1H), 7.54 (ddd, J=2.1, 6.1, 8.7 Hz, 1H), 6.93-6.84 (m, 1H), 6.05-5.86 (m, 1H), 5.42-5.23 (m, 3H), 4.74 (dd, J=0.9, 6.0 Hz, 2H).

Step 2: Synthesis of Compound 20b

Raw material 20a (8.74 g, 44.10 mmol, 1 eq) was added to a pre-dried three-necked flask, then solvent tetrahydrofuran (100 mL) was added, and the system was replaced with nitrogen three times. The system temperature (inner) was controlled at 0-5° C., then phenyl Grignard reagent (3 M, 22.05 mL, 1.5 eq) was slowly added dropwise, and after the addition was completed, the mixture was stirred continuously at 20° C. for 1 hour. The reaction mixture was slowly poured into saturated ammonium chloride (100 mL) at 0-5° C., extracted twice with ethyl acetate (100 mL×2), then the organic phases were combined, washed with saturated brine (200 mL) successively, dried over anhydrous sodium sulfate, and concentrated under reduced pressure. The crude product was purified by silica gel column chromatography (ethyl acetate/petroleum ether=100:0-75:15) to obtain 20b.

$^1$H NMR (400 MHz, CDCl$_3$) δ=7.29-7.23 (m, 5H), 7.04 (ddd, J=2.2, 6.1, 8.6 Hz, 1H), 6.88-6.71 (m, 1H), 5.94 (d, J=5.1 Hz, 1H), 5.84-5.65 (m, 1H), 5.27-5.09 (m, 2H), 4.39 (dd, J=0.9, 6.0 Hz, 2H), 2.51 (d, J=5.3 Hz, 1H).

Step 3: Synthesis of Compound 20c 20b (760 mg, 2.75 mmol, 1 eq) was added to a pre-dried three-necked flask, then solvent dichloromethane (8 mL) was added, and the system was replaced with nitrogen three times. The reactor was placed in an ice bath, and the system temperature (inner) was controlled at 0-5° C., then thionyl chloride (981.81 mg, 8.25 mmol, 598.66 μL, 3 eq) was slowly added dropwise. After the addition was completed, the reaction mixture was stirred at 0° C. for 45 minutes, then the temperature was slowly raised to 20° C., and the reaction mixture was stirred continuously for 2 hours. 20c was obtained by concentration under reduced pressure, which was used directly in the next step.

$^1$H NMR (400 MHz, CDCl$_3$) δ=7.43-7.27 (m, 6H), 6.93-6.84 (m, 1H), 6.48 (s, 1H), 6.02-5.85 (m, 1H), 5.42-5.19 (m, 2H), 4.70-4.46 (m, 2H).

Step 4: Synthesis of Compound 20d 1j (1.02 g, 2.26 mmol, 1 eq) and solvent N,N-dimethylformamide (5 mL) were added to a pre-dried three-necked flask, and the system was replaced with nitrogen three times. The system temperature (inner) was controlled at 0-5° C., then sodium hydride (135.72 mg, 3.39 mmol, content: 60%, 1.5 eq) was slowly added, and the reaction mixture was stirred at 0° C. for 30 minutes. The system temperature (inner) was controlled at 0-5° C., then a mixture of 20c (1 g, 3.39 mmol, 1.5 eq) and N,N-dimethylformamide (5 mL) was slowly added dropwise to the system. The addition was completed, and the mixture was stirred at 20° C. for 2 hours. The reaction mixture was slowly added to ice water (50 mL) to quench the reaction, and the aqueous phase was extracted with dichloromethane (100 mL×3), then the organic phases were combined, washed with saturated brine (100 mL×4), dried over anhydrous sodium sulfate, filtered and concentrated under reduced pressure. The crude product was purified by silica gel column chromatography (dichloromethane/methanol=100:0-95:5) to obtain compound 20d.

Step 5: Synthesis of Compound 20e 20d (814 mg, 1.15 mmol, 1 eq) and methanol (27 mL) were added to a dry three-necked flask at 20° C., and the stirring was started, then tetrakis(triphenylphosphine)palladium (132.90 mg, 115.01 μmol, 0.1 eq) was added, and the system was replaced with nitrogen three times. The reaction mixture was stirred at this temperature for 10 minutes, then potassium carbonate (476.86 mg, 3.45 mmol, 3 eq) was added, and the reaction mixture was stirred continuously at 20° C. for 2 hours. The reaction mixture was filtered through diatomite, and the filter cake was washed with dichloromethane (25 mL×2), then the organic phases were washed with water (50 mL) and saturated brine (50 mL) successively. The phases were separated, and the organic phase was dried over anhydrous sodium sulfate and concentrated under reduced pressure. The crude product was purified by silica gel column chromatography (dichloromethane/methanol=100:0-97:3) to obtain 20e.

$^1$H NMR (400 MHz, CDCl$_3$) δ=7.59-7.34 (m, 5H), 7.23-7.03 (m, 7H), 6.98-6.84 (m, 3H), 6.76-6.64 (m, 1H), 5.81-5.74 (m, 1H), 5.53-5.25 (m, 3H), 4.69-4.55 (m, 1H), 4.52-

4.30 (m, 2H), 3.88-3.78 (m, 3H), 3.53-3.41 (m, 1H), 3.40-3.28 (m, 1H), 2.95-2.84 (m, 3H), 1.66-1.48 (m, 1H), 1.46-1.35 (m, 1H).

Step 6: Synthesis of Compound 20f 20e (345 mg, 516.70 µmol, 1 eq) was dissolved in a premixed solution (about 0.5 M) of hydrochloric acid (12 M, 168.86 µL, 3.92 eq) in methanol (3.45 mL), and the reaction mixture was stirred at 60° C. for 18 hours. The reaction mixture was cooled to 20° C., and the pH was adjusted to >7 by adding solid sodium bicarbonate. The reaction mixture was filtered through cotton, added with silica gel, concentrated and evaporated to dryness. The crude product was purified by silica gel column chromatography (dichloromethane/methanol=100:0-95:5) to obtain compound 20f.

$^1$H NMR (400 MHz, CDCl$_3$) δ=7.62-7.37 (m, 11H), 7.06-6.96 (m, 2H), 6.70-6.57 (m, 1H), 5.86-5.80 (m, 1H), 5.48-5.26 (m, 3H), 4.75-4.68 (m, 1H), 3.73-3.61 (m, 1H), 3.59-3.47 (m, 1H), 3.00-2.97 (m, 3H), 1.57-1.53 (m, 2H).

Step 7: Synthesis of Compound 20g 20f (107.00 mg, 195.42 µmol, 1 eq) and dichloromethane (2 mL) were added to a dry three-necked flask at 20° C., then the stirring was started, and triphenylphosphine (76.88 mg, 293.12 µmol, 1.5 eq) was added. The reaction mixture was stirred at this temperature for 15 minutes, then carbon tetrabromide (97.21 mg, 293.12 µmol, 1.5 eq) was added, and the reaction system became clear. The reaction mixture was stirred continuously at 20° C. for 2 hours. The reaction mixture was quenched with water (10 mL), and the aqueous phase was extracted with dichloromethane (10 mL×3). The organic phases were combined, washed with saturated brine (10 mL×2), and dried over anhydrous sodium sulfate, filtered and concentrated under reduced pressure. The crude product was purified by silica gel column chromatography (dichloromethane/methanol=100:0-95:5) to obtain 20g.

$^1$H NMR (400 MHz, CDCl$_3$) δ=7.52 (br d, J=7.9 Hz, 4H), 7.47-7.36 (m, 3H), 7.34-7.29 (m, 3H), 7.00 (br d, J=8.6 Hz, 1H), 6.92-6.79 (m, 1H), 6.66-6.57 (m, 1H), 5.77 (s, 1H), 5.45-5.37 (m, 2H), 4.59 (dd, J=5.8, 7.8 Hz, 1H), 3.43-3.33 (m, 1H), 3.31-3.23 (m, 1H), 2.94 (s, 3H), 1.81-1.66 (m, 2H).

Step 8: Synthesis of Compound 20h 20g (50 mg, 81.91 µmol, 1 eq) and acetonitrile (250 mL) were added to a dry three-necked flask at 20° C., and the stirring was started, then cesium carbonate (533.74 mg, 1.64 mmol, 20 eq) was added. The system was replaced with nitrogen three times, and the reaction mixture was stirred at 80° C. for 12 hours. The reaction mixture was filtered through filter paper, then the filter cake was washed with acetonitrile (50 mL), and the filtrate was concentrated under reduced pressure. The crude product was purified by silica gel column chromatography (dichloromethane/methanol=100:0-95:5) to obtain compound 20h.

$^1$H NMR (400 MHz, CDCl$_3$) δ=7.62 (d, J=6.6 Hz, 2H), 7.40-7.29 (m, 4H), 7.21-7.11 (m, 3H), 6.95-6.79 (m, 2H), 6.74-6.66 (m, 1H), 6.60 (d, J=7.7 Hz, 1H), 5.76 (d, J=7.7 Hz, 1H), 5.41 (d, J=2.2 Hz, 2H), 5.00 (s, 1H), 4.55 (br t, J=11.6 Hz, 1H), 4.40-4.25 (m, 1H), 2.98 (s, 3H), 2.16-1.97 (m, 2H).

Step 9: Synthesis of Compound 20A

Dichloromethane (1 mL) was added to a round bottom flask at 25° C., then 20h (17.00 mg, 28.89 µmol, purity: 90%, 1 eq) and anhydrous magnesium chloride (55.02 mg, 577.87 mol, 20 eq) were slowly added, and the reaction mixture was stirred continuously at 25° C. for 18 hours under the protection of nitrogen. The reaction mixture was concentrated under reduced pressure, dissolved in methanol and filtered through an organic phase syringe filter to obtain a crude product. The crude product was purified by preparative reversed-phase liquid chromatography (separation conditions: column type: Phenomenex Luna C18 100*30 mm*5 m; mobile phase: [H$_2$O (0.04% HCl)-ACN]; ACN %: 30%-60%, 10 min) to obtain compound 20A. MS (ESI, m/z): 444.1 [M+1];

$^1$H NMR (400 MHz, DMSO-d$_6$) δ=7.67-6.98 (m, 8H), 6.86 (d, J=7.6 Hz, 1H), 5.55-5.48 (m, 2H), 4.63 (br t, J=11.6 Hz, 1H), 4.33-4.20 (m, 1H), 2.97 (s, 3H), 2.25 (br dd, J=6.9, 16.1 Hz, 1H), 2.11-1.94 (m, 1H).

Bioassay

Experimental Embodiment 1: Influenza Virus Cytopathic Effect (CPE) Assay

The antiviral activity of the compounds against influenza virus (IFV) was evaluated by measuring the median effective concentration (EC$_{50}$) values of the compounds. CPE assays are widely used to determine the protective effect of the compounds on virus-infected cells to reflect the antiviral activity of the compounds. Influenza virus CPE assay:

MDCK cells were seeded at a density of 2,000 cells per well into a black 384-well cell culture plate, and cultured overnight at 37° C. with 5% of CO$_2$ in an incubator. The compounds were diluted by the Echo555 non-contact nanoscale acoustic wave pipetting system and added to the cell wells (4-fold dilution, 8 experimental points of concentration). The corresponding influenza virus strains were then added to the cell culture wells at 1-2 90% tissue culture infectious dose (TCID90) per well, with 0.5% final concentration of DMSO in the medium. Virus control wells (with DMSO and virus, without compound), cell control wells (with DMSO, without compound and virus) and medium control wells (only medium, no cells) were set up. The cytotoxicity assay and antiviral activity assay of the compounds were performed in parallel, except that no virus was added, the experimental conditions of the cytotoxicity assay were the same as those of the antiviral activity assay. The cell plates were cultured at 37° C. with 5% of CO$_2$ in an incubator for 5 days. Cell viability was measured after 5 days of culture using the cell viability assay kit CCK8. Raw data were used for antiviral activity and cytotoxicity calculations of the compounds.

The antiviral activity and cytotoxicity of the compounds were expressed by the inhibitory rate (%) of the cellular viral effects induced by the virus, respectively, of the compounds. The calculation formula is as follows:

$$\text{Inhibitory rate (\%)} = \left( \frac{\text{sample value} - \text{average value of virus control group}}{\text{average value of cell control group} - \text{average value of virus control group}} \right) \times 100$$

The EC$_{50}$ values of the compounds were obtained by non-linear fitting analysis of the inhibitory rate and cytotoxicity of the compounds using GraphPad Prism software. The inhibitory activities of the compounds of the present disclosure against influenza viruses are shown in Tables 1, 2 and 3.

TABLE 1

Inhibitory activity of the compounds of the present disclosure against influenza A virus A/PR/8/34 (H1N1)

| Compound No. | $EC_{50}$ (nM) |
|---|---|
| 1A | 22 |
| 2A | 13 |
| 3A | 37 |
| 4A | 74 |
| 7B | 6 |
| 9A | 34 |
| 10B | 14 |
| 14B | 11 |
| 16B | 25 |
| 18A | 11 |
| 19B | 11 |
| 20A | 50 |

TABLE 2

Inhibitory activity of the compounds of the present disclosure against other influenza viruses

| Compound No. | $EC_{50}$ (nM) | | | | | |
|---|---|---|---|---|---|---|
| | A/WSN/ 33 (H1N1) | A/California/ 07/2009 (H1N1) | A/Hongkong/ 8/68 (H3N2) | A/California/ 2/2014 (H3N2) | B/Lee/40 | B/Florida/ 78/2015 |
| 7B | 8.3 | 2.6 | 5.8 | 1.2 | 8.5 | 0.87 |
| 10B | N.D. | 4.7 | N.D. | 3.5 | N.D. | 1.4 |
| 14B | 10 | 2.9 | 8.9 | N.D. | 9.4 | N.D. |
| 19B | N.D. | 5.3 | N.D. | 3.2 | N.D. | 9.0 |

N.D.: Not determined

TABLE 3

Inhibitory activity of the compounds of the present disclosure against resistant strains of influenza virus I38T

| Compound No. | $EC_{50}$ (nM) | |
|---|---|---|
| | A/PR/8/34 I38T Mutation (H1N1) | A/WSN/33 I38T Mutation (H1N1) |
| 7B | 66 | 66 |
| 10B | 73 | 84 |
| 14B | 202 | 183 |
| 16B | 175 | 246 |
| 18A | 117 | 214 |
| 19B | 229 | 199 |

Conclusion: The compounds of the present disclosure exhibit positive effects in influenza virus replication inhibition assays at the cellular level.

Experimental Embodiment 2: Pharmacokinetic (PK) Assay

Experimental objectives: To evaluate the druggability of the compounds by measuring pharmacokinetic properties in different animal species.

Experimental materials: Sprague-Dawley strain rats, Beagle dogs, cynomolgus monkeys.

Experiment Procedure:

The animal pharmacokinetic properties of the compound after intravenous injection and oral administration were tested by standard protocols, in which the candidate compound was prepared as a clear solution (intravenous injection) or as a homogeneous suspension (oral administration), and administered as a single dose to the animals. The vehicles for intravenous injection and oral administration are dimethyl sulfoxide and polyethylene glycol (15)-hydroxystearate aqueous solution in certain proportions. Whole blood samples were collected within 24 hours, centrifuged at 3200 g for 10 minutes, and the supernatant was separated to obtain plasma samples. Quantitative analysis of plasma concentrations was performed by LC-MS/MS analysis method, and pharmacokinetic parameters such as peak concentration, peak time, clearance rate, half-life, and area under the drug-time curve were calculated.

TABLE 4

Pharmacokinetic parameters of the compounds of the disclosure measured in vivo in various animal species

| | Compound No. 7B | | | | Compound No. 8B* | | |
|---|---|---|---|---|---|---|---|
| | Route of administration IV | | | | Route of administration PO | | |
| Species | Mouse | Dog | Monkey | Species | Mouse | Dog | Monkey |
| Dose (mpk) | 2 | 0.33 | 0.25 | Dose (mpk) | 10 | 1 | 1 |
| CL (mL/Kg/min) | 57.4 | 20.8 | 20.8 | Cmax (nM) | 309 | 171 | 163 |
| Vd (L/Kg) | 4.41 | 3.74 | 3.68 | Tmax (nM) | 1.2 | 0.75 | 3 |
| AUC (nM · h) | 1320 | 576 | 458 | AUC (nM · h) | 930 | 724 | 785 |
| $T_{1/2}$ (h) | 1.2 | 2.6 | 2.2 | $T_{1/2}$ (h) | 1.3 | 4.4 | 3.6 |

*The concentration of 7B was detected in the oral administration experiment

Conclusion: The pharmacokinetic properties of the compounds of the present disclosure are consistent with the requirements of pharmaceutical preparations.

Experimental Embodiment 3: Drug Efficacy Assay in Mice

Experimental objectives: To evaluate the in vivo antiviral activity of the compounds against influenza virus (IFV) by observing the percentage change in body weight and survival rate of the test animals in a mouse treatment model of influenza A. The mouse treatment model has been widely used to determine the protective effect of the compounds on virus-infected animals to reflect the antiviral activity of the compounds.

Experiment Procedure:

The mice (BALB/c) were inoculated with virus (influenza A virus strain A/PR8/34) by nasal drip on day 0 at a dose of 1000 p.f.u./mouse. Twice a day with a total of 14 times, vehicle (5% DMSO+10% polyethylene glycol-15 hydroxystearate+85% water) or 30 mpk of 8B was intragastrically administered for 7 consecutive days from day 2 to day 8, with the first dose administered 48 hours after virus inoculation. Animals were continuously observed from day 0 to day 14 to record body weight, health and survival status.

The experimental results are shown in Table 5:

TABLE 5

Protective effect of the compounds of the present disclosure on mice in a treatment model of influenza A (body weight)

| | Test compounds | | | |
|---|---|---|---|---|
| | Solvent | | 8B | |
| | Dose (mpk BID) | | | |
| | N/A | | 30 | |
| | Change in body weight (Percentage of starting body weight) | Survival rate | Change in body weight (Percentage of starting body weight) | Survival rate |
| Day 3 | −10.7 ± 0.8 | 100% | −6.6 ± 1.1 | 100% |
| Day 4 | −17.7 ± 1.9 | 100% | −9.3 ± 0.8 | 100% |
| Day 5 | −21.9 ± 0.9 | 100% | −8.9 ± 2.2 | 100% |
| Day 6 | −26.0 ± 0.9 | 100% | −9.4 ± 1.9 | 100% |
| Day 7 | −30.0 ± 1.0 | 100% | −7.7 ± 1.4 | 100% |
| Day 8 | −33.9 ± 1.8 | 80% | −0.9 ± 0.8 | 100% |
| Day 9 | N/A | 0% | −0.5 ± 1.1 | 100% |
| Day 10 | N/A | 0% | 0.5 ± 0.6 | 100% |
| Day 11 | N/A | 0% | 2.5 ± 0.6 | 100% |
| Day 12 | N/A | 0% | 2.9 ± 1.0 | 100% |
| Day 13 | N/A | 0% | 2.4 ± 1.3 | 100% |
| Day 14 | N/A | 0% | 2.7 ± 1.4 | 100% |

N/A: Not applicable

Conclusion: The compounds of the present disclosure exhibit protective effects in animal treatment model drug efficacy assays.

What is claimed is:

1. A compound represented by formula (I) or a pharmaceutically acceptable salt thereof, selected from:

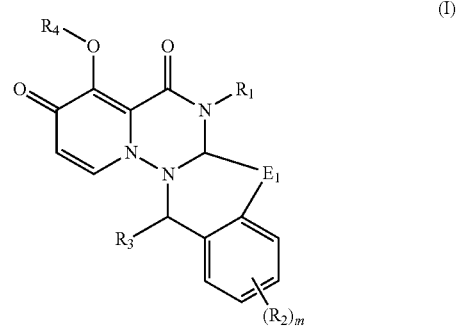

(I)

wherein, $R_1$ is selected from H, $C_{1-3}$ alkyl, $C_{3-4}$ cycloalkyl and oxetanyl;

$R_2$ is each independently selected from halogen, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;
m is selected from 0, 1 and 2;
$R_3$ is selected from

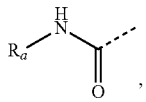

phenyl, 5- to 6-membered heteroaryl, $C_{1-3}$ alkyl and $C_{3-6}$ cycloalkyl, and the phenyl, 5- to 6-membered heteroaryl, $C_{1-3}$ alkyl and $C_{3-6}$ cycloalkyl are optionally substituted by 1, 2 or 3 $R_b$;

$R_a$ is selected from phenyl and benzyl;

$R_b$ is each independently selected from H, halogen, hydroxyl, cyano, $C_{1-3}$ alkyl and $C_{1-3}$ alkoxy, and the $C_{1-3}$ alkyl and $C_{1-3}$ alkoxy are optionally substituted by 1, 2 or 3 halogens;

$R_4$ is selected from H,

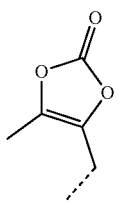

and —C($R_c$)$_2$—O—C(=O)—O—$R_d$;

$R_c$ is each independently selected from hydrogen and $C_{1-3}$ alkyl;

$R_d$ is selected from hydrogen and $C_{1-3}$ alkyl, and the $C_{1-3}$ alkyl is optionally substituted by 1, 2 or 3 R;

R is each independently selected from halogen, $C_{1-3}$ alkylamino, hydroxyl and $C_{1-3}$ alkoxy;

$E_1$ is selected from —(CH$_2$)$_n$—, —(CH$_2$)$_n$O— and —CH—CH—CH$_2$O—;

each n is selected from 1, 2 and 3;

the 5- to 6-membered heteroaryl contains 1, 2 or 3 heteroatoms or heteroatom groups independently selected from O, S, N and NH.

2. The compound as claimed in claim 1 or the pharmaceutically acceptable salt thereof, wherein, $R_1$ is selected from H, methyl, isopropyl, cyclopropyl, cyclobutyl and

3. The compound as claimed in claim 1 or the pharmaceutically acceptable salt thereof, wherein, $R_2$ is selected from F, Cl, Br, methyl and methoxy, and the methyl and methoxy are optionally substituted by 1, 2 or 3 halogens.

4. The compound as claimed in claim 3 or the pharmaceutically acceptable salt thereof, wherein, $R_2$ is selected from F, Cl and methyl.

5. The compound as claimed in claim 1 or the pharmaceutically acceptable salt thereof, wherein, $R_3$ is selected from phenyl, and the phenyl is optionally substituted by 1, 2 or 3 $R_b$.

6. The compound as claimed in claim 5 or the pharmaceutically acceptable salt thereof, wherein, $R_3$ is selected from

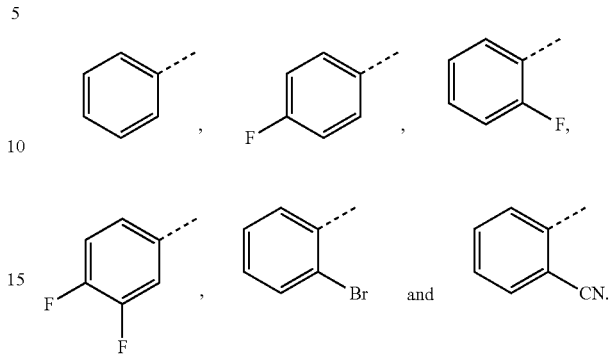

7. The compound as claimed in claim 1 or the pharmaceutically acceptable salt thereof, wherein, $R_c$ is selected from H.

8. The compound as claimed in claim 1 or the pharmaceutically acceptable salt thereof, wherein, $R_d$ is selected from H, methyl, ethyl and isopropyl.

9. The compound as claimed in claim 1 or the pharmaceutically acceptable salt thereof, wherein, $R_4$ is selected from H,

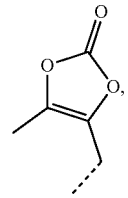

—CH$_2$—O—C(=O)—OH, —CH$_2$—O—C(=O)—OCH$_3$, —CH$_2$—O—C(=O)—OCH$_2$CH$_3$ and —CH$_2$—O—C(=O)—OCH(CH$_3$)$_2$.

10. The compound as claimed in claim 1 or the pharmaceutically acceptable salt thereof, wherein, $E_1$ is selected from —CH$_2$—, —(CH$_2$)$_3$—, —CH$_2$O—, —(CH$_2$)$_2$O—, —(CH$_2$)$_3$O— and —CH—CH—CH$_2$O—.

11. The compound as claimed in claim 1 or the pharmaceutically acceptable salt thereof, wherein, the compound is selected from formulas (V-1), (V-2), (V-3) and (VI-1),

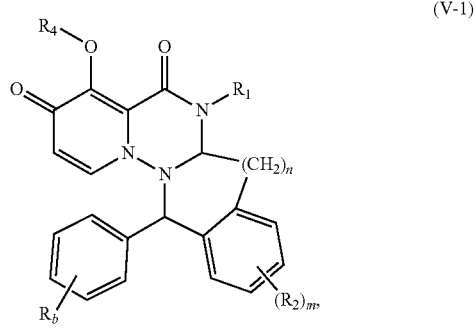

(V-1)

(V-2)
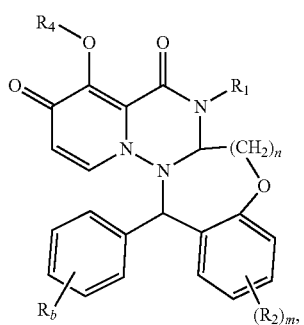
(V-3)
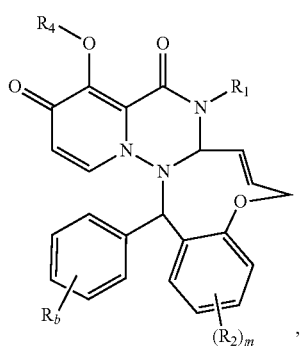
(VI-1)
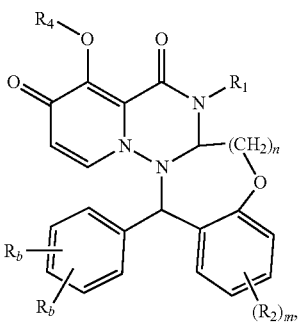
wherein, $R_1$, $R_2$, $R_4$, $R_b$, m and n are as defined in claim 1.
12. A compound represented by the following formula or a pharmaceutically acceptable salt thereof, selected from:
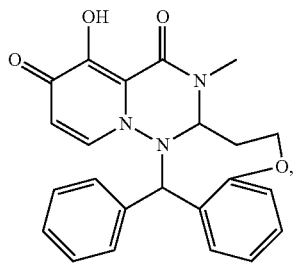
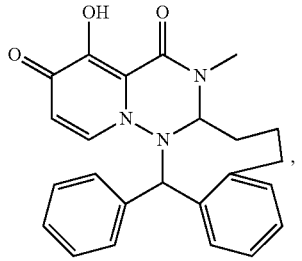
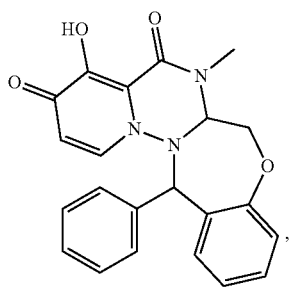
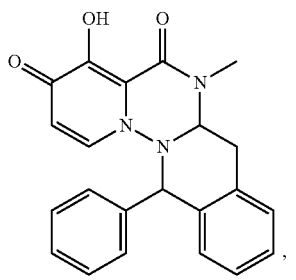
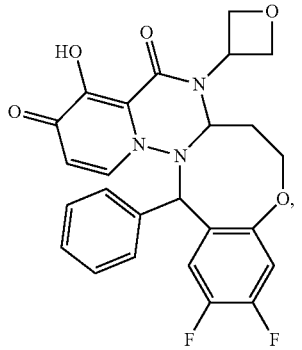
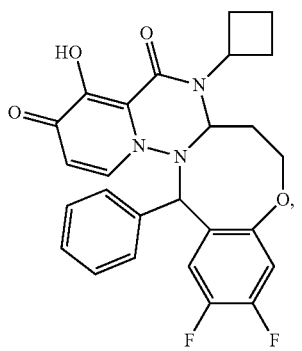

113
-continued
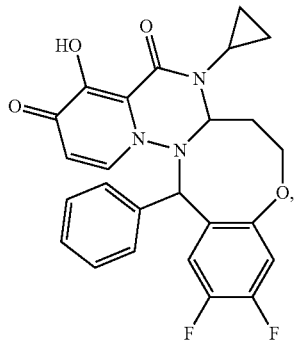
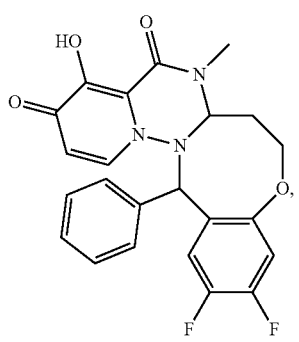
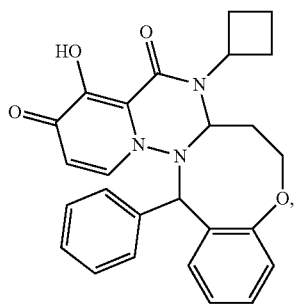
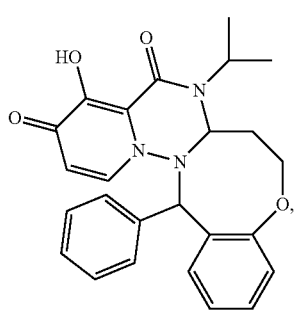
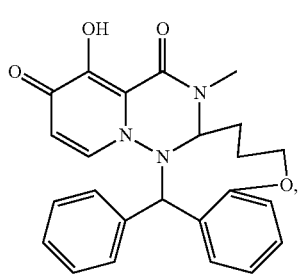
114
-continued
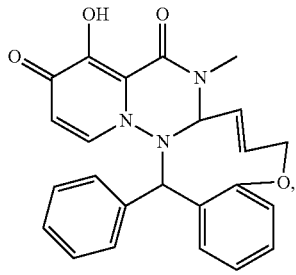
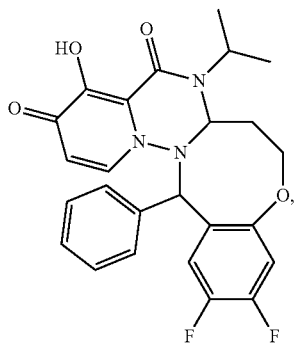
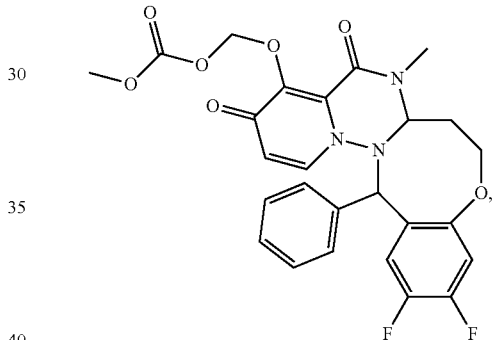
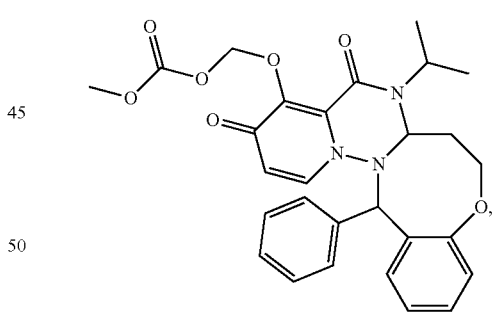
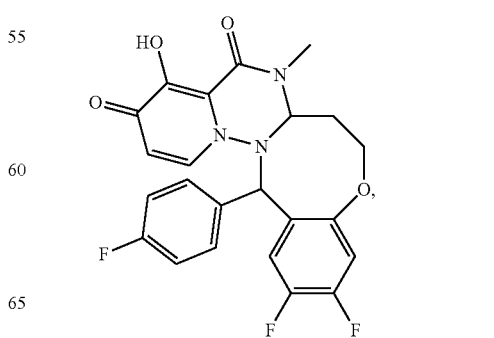

115
-continued
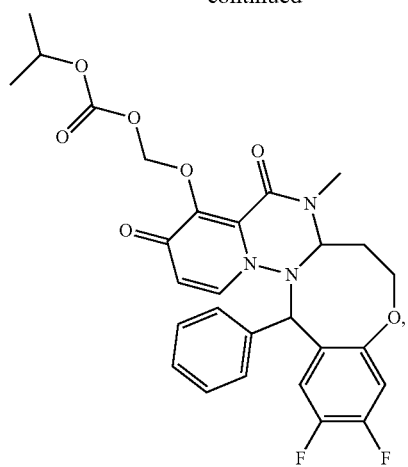
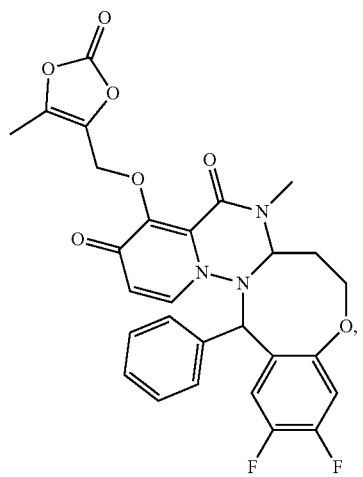
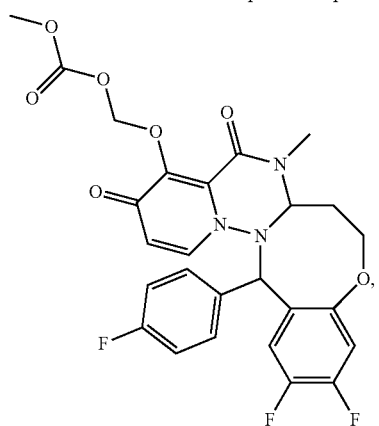
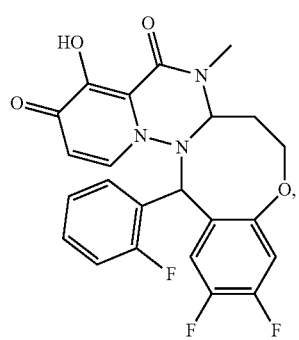
116
-continued
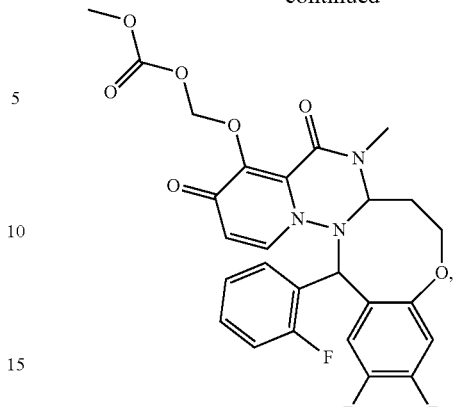
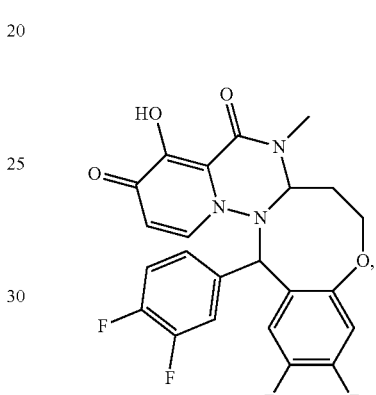
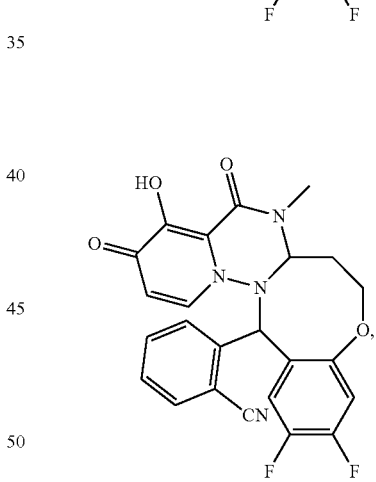
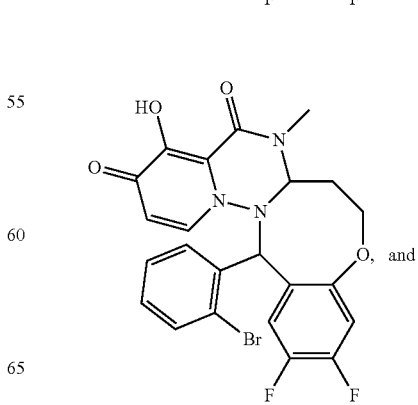
and

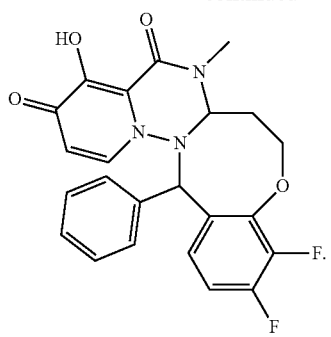
13. The compound as claimed in claim 12 or the pharmaceutically acceptable salt thereof, wherein the compound is selected from:
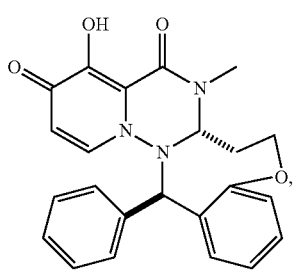
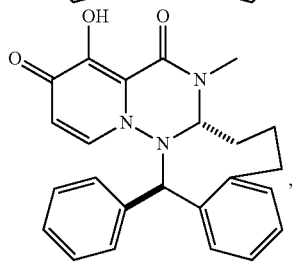
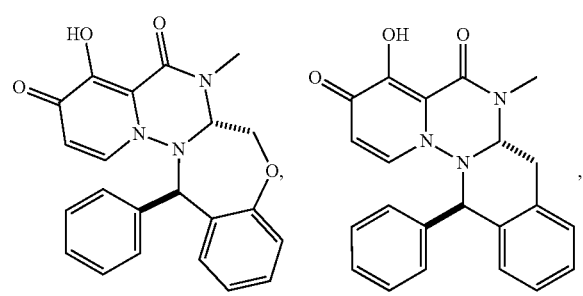
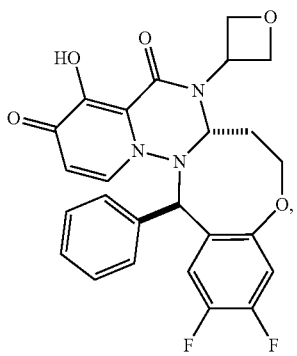
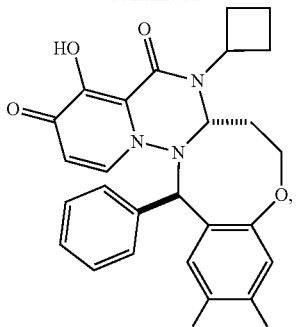
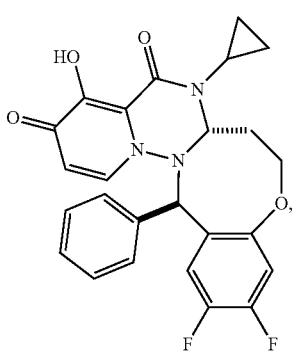
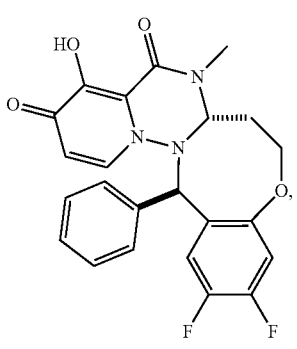
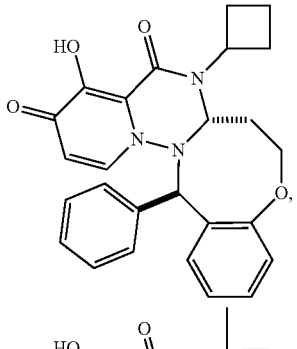
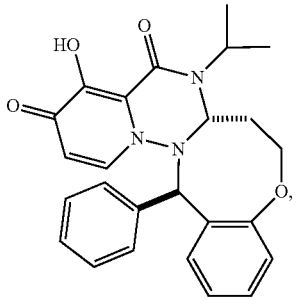

119
-continued
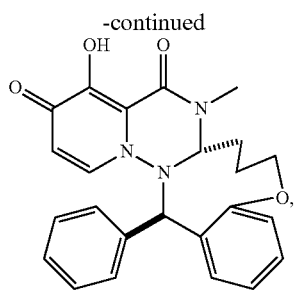
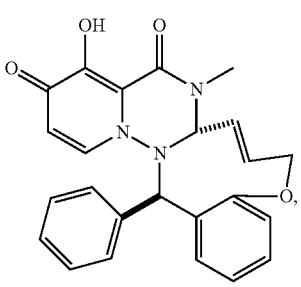
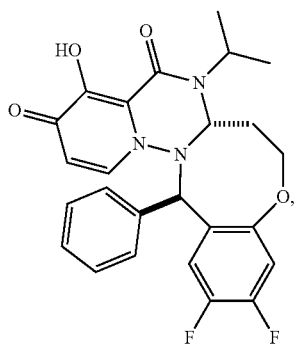
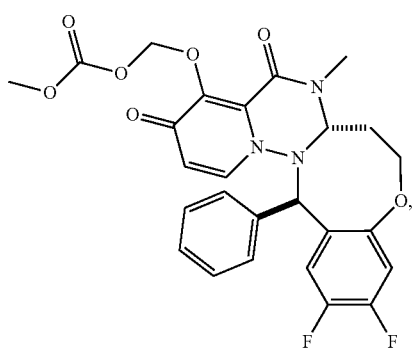
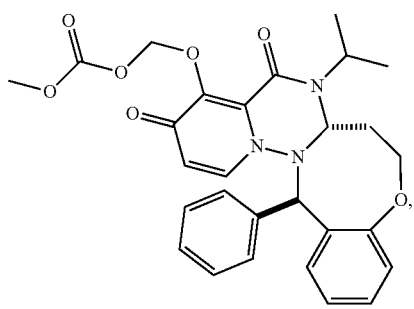
120
-continued
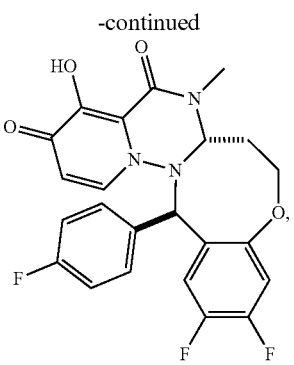
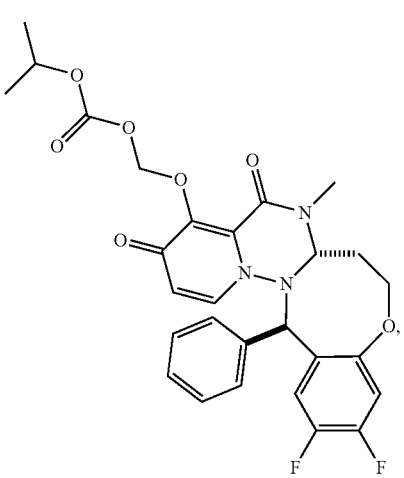
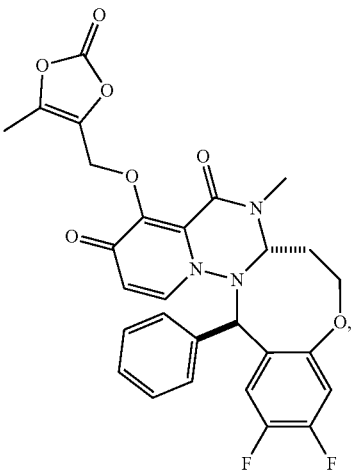
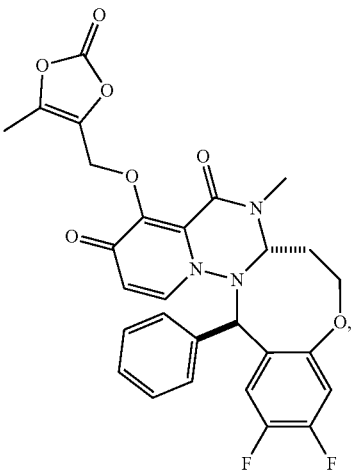

121
-continued
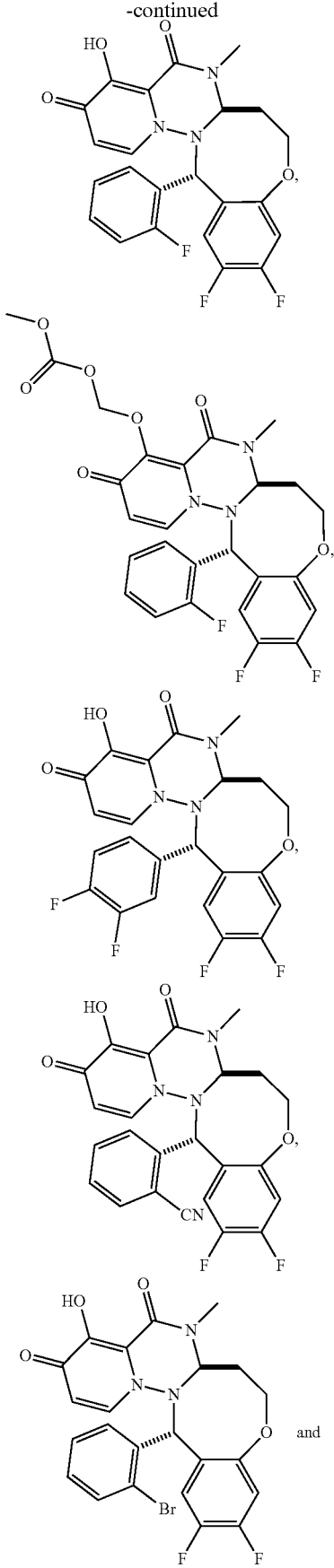
122
-continued
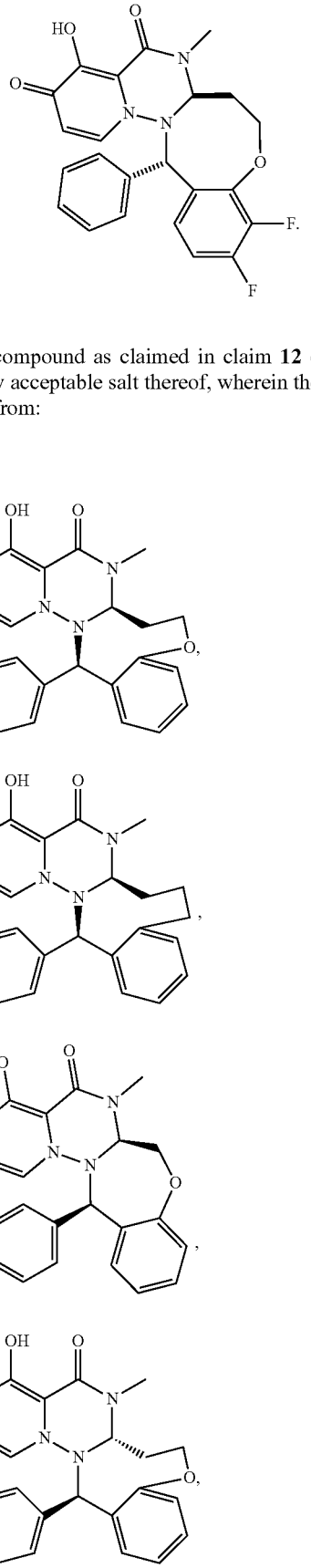
14. The compound as claimed in claim 12 or the pharmaceutically acceptable salt thereof, wherein the compound is selected from:
and 123
-continued
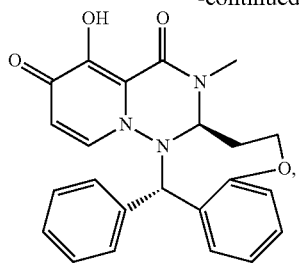
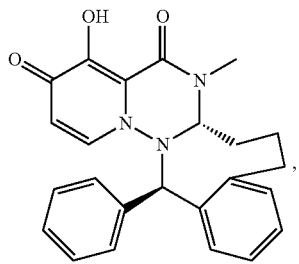
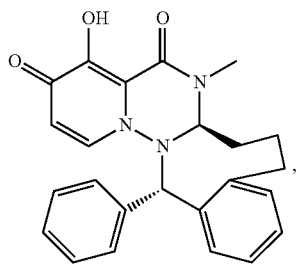
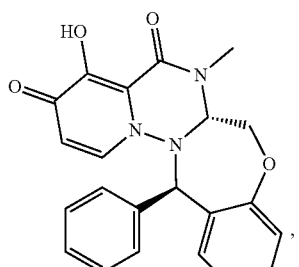
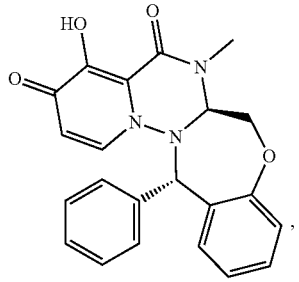
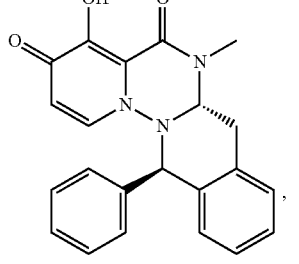
124
-continued
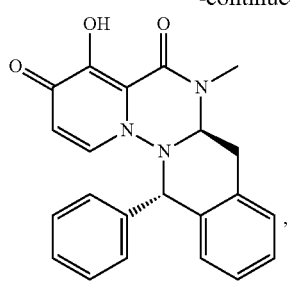
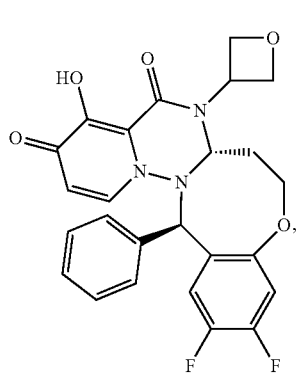
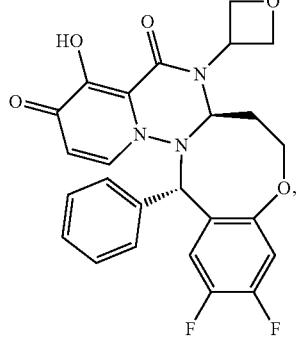
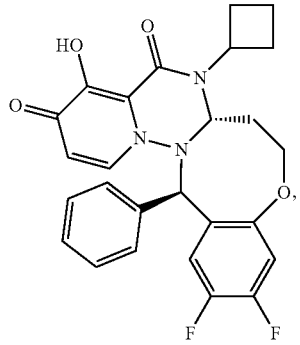
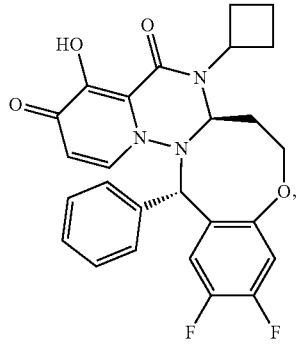

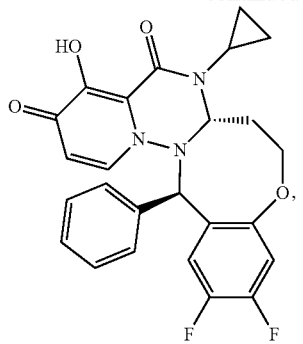
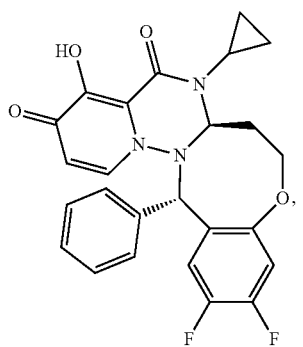
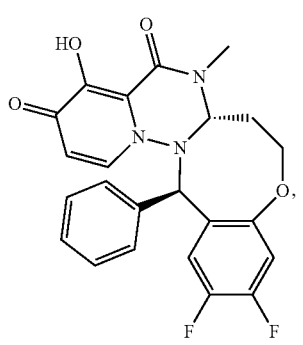
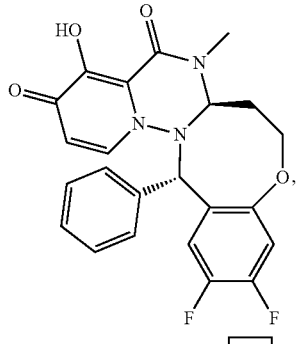
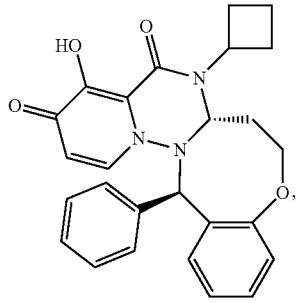
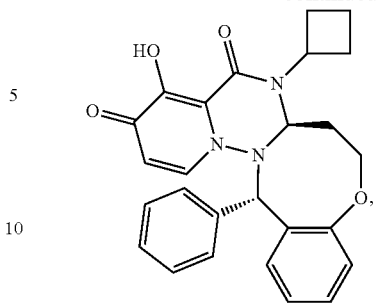
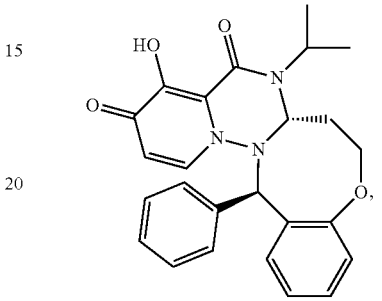
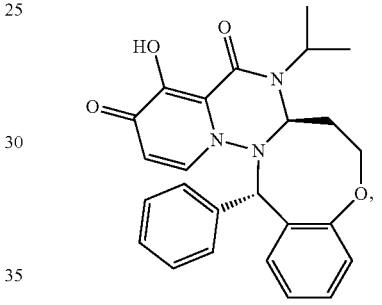
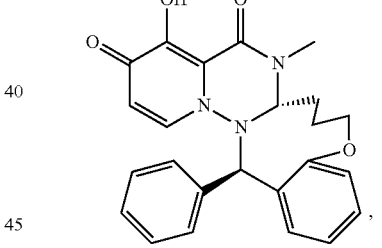
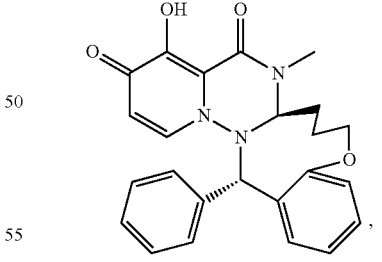
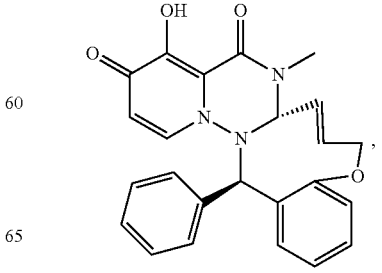

127
-continued
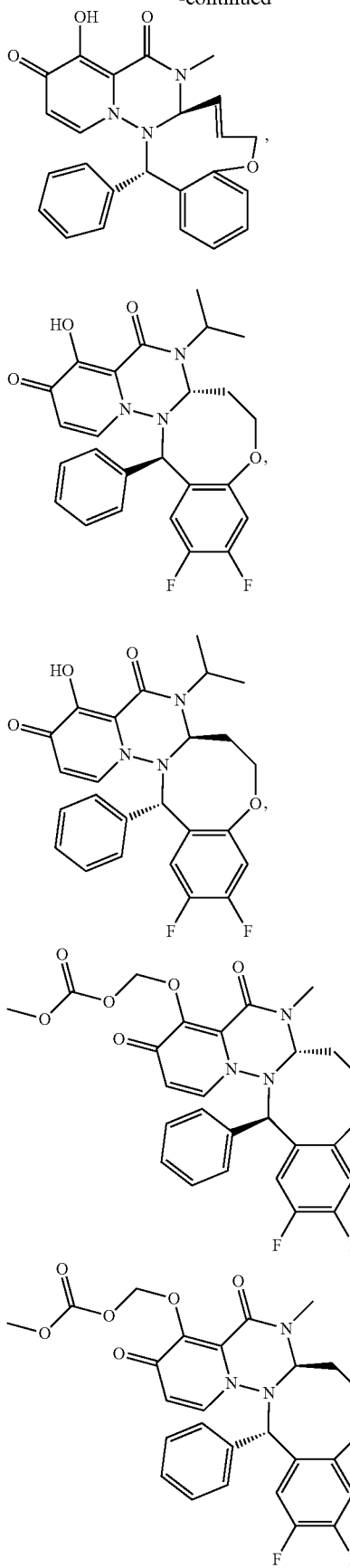
128
-continued
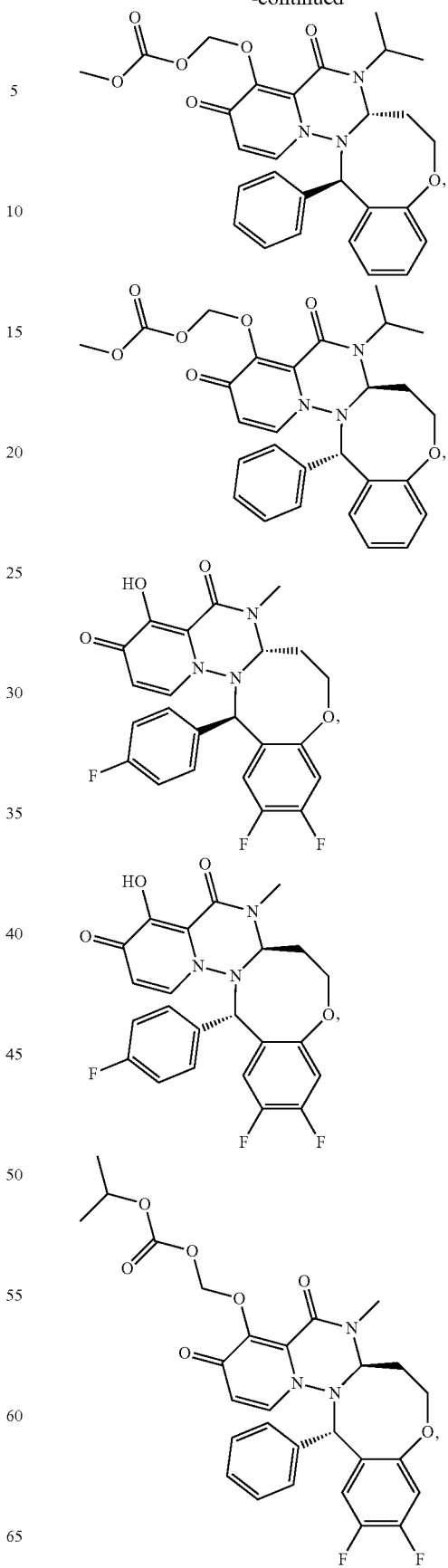

129
-continued
130
-continued
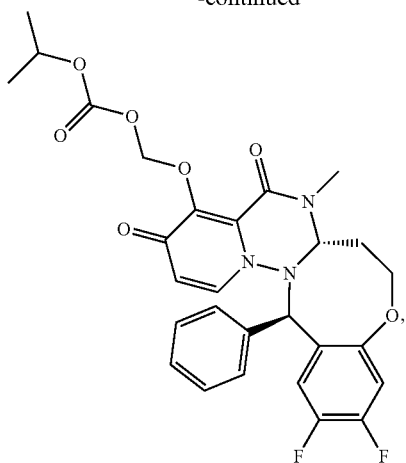
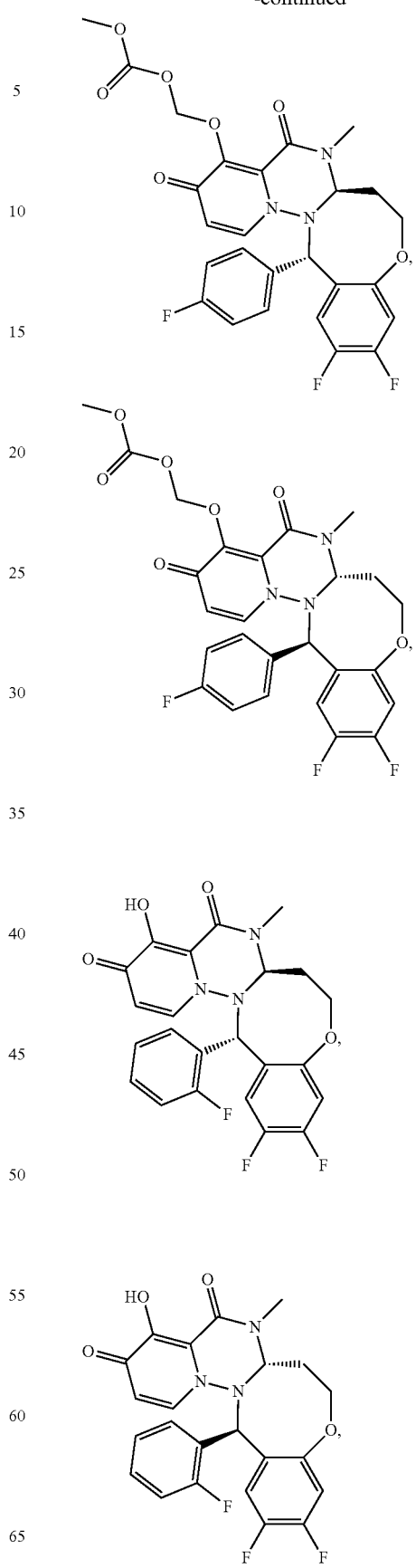

131
-continued
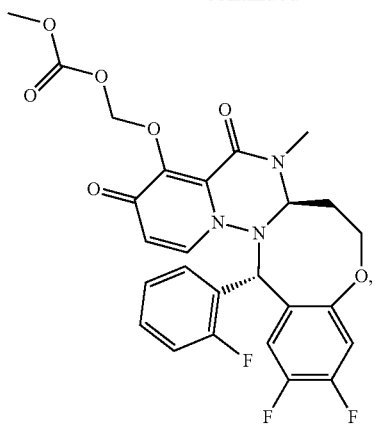
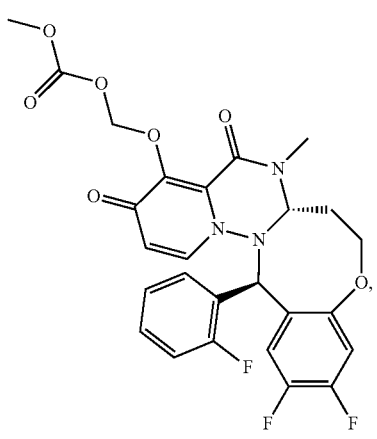
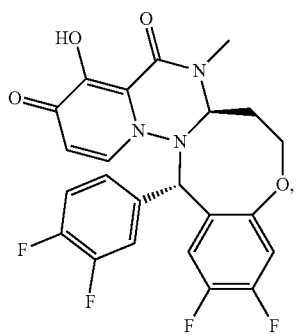
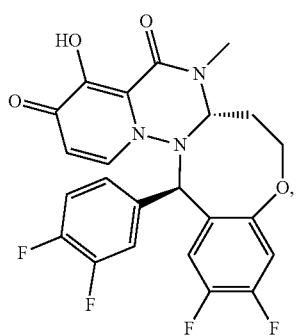
132
-continued
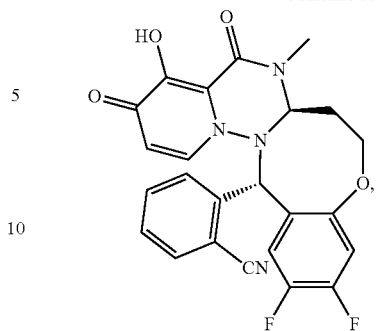
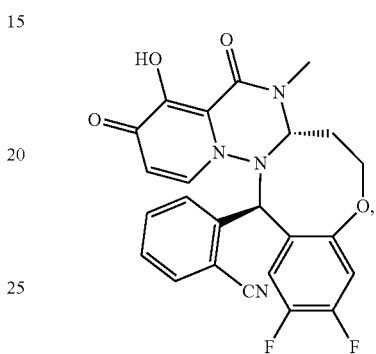
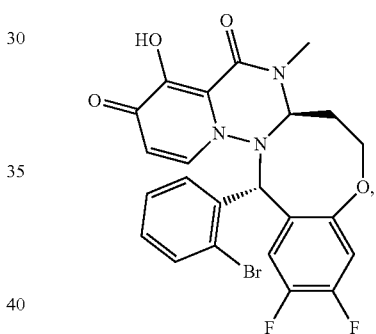
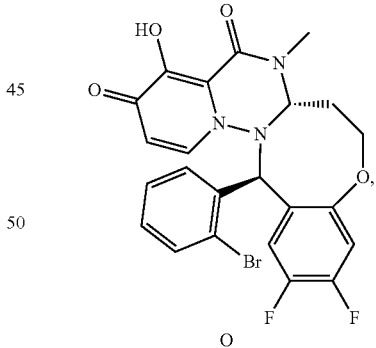
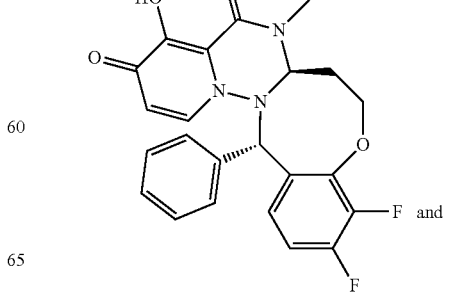

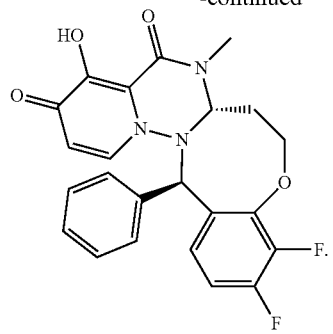

15. A method for inhibiting an influenza virus RNA endonuclease in a subject in need thereof, comprising: administering the compound as claimed in claim 1 or the pharmaceutically acceptable salt thereof to the subject.

16. A method for treating influenza virus in a subject in need thereof, comprising: administering the compound as claimed in claim 1 or the pharmaceutically acceptable salt thereof to the subject.

* * * * *